US011977215B2

(12) United States Patent
Jenoski et al.

(10) Patent No.: US 11,977,215 B2
(45) Date of Patent: May 7, 2024

(54) DIGITAL IMAGING SYSTEM AND METHOD

(71) Applicant: HOLOGIC, INC., Marlborough, MA (US)

(72) Inventors: Raymond Jenoski, Boylston, MA (US); Sid Mayer, Carlisle, MA (US); Robert Jennings, Andover, MA (US); Ryan P. Oliva, Mendon, MA (US); John A. McCrorey, Northborough, MA (US); Michael D. Quick, Lunenburg, MA (US); Sarah Margaret Harrington, Nashua, NH (US)

(73) Assignee: Hologic, Inc., Marlborough, MA (US)

( * ) Notice: Subject to any disclaimer, the term of this patent is extended or adjusted under 35 U.S.C. 154(b) by 491 days.

(21) Appl. No.: 17/282,380

(22) PCT Filed: Oct. 9, 2019

(86) PCT No.: PCT/US2019/055458
§ 371 (c)(1),
(2) Date: Apr. 1, 2021

(87) PCT Pub. No.: WO2020/091965
PCT Pub. Date: May 7, 2020

(65) Prior Publication Data
US 2021/0350112 A1   Nov. 11, 2021

Related U.S. Application Data

(60) Provisional application No. 62/755,151, filed on Nov. 2, 2018, provisional application No. 62/755,291, filed on Nov. 2, 2018.

(51) Int. Cl.
*G03B 21/34* (2006.01)
*B25J 18/00* (2006.01)
(Continued)

(52) U.S. Cl.
CPC ............ *G02B 21/367* (2013.01); *B25J 18/00* (2013.01); *G01N 35/00029* (2013.01);
(Continued)

(58) Field of Classification Search
USPC .......................................................... 348/47
See application file for complete search history.

(56) References Cited

U.S. PATENT DOCUMENTS 5,143,627 A   9/1992 Lapidus et al.
5,240,606 A   8/1993 Lapidus et al.
(Continued)

FOREIGN PATENT DOCUMENTS

DE   10 2016 110988   12/2017
JP      2016-099486 A    5/2016
(Continued)

OTHER PUBLICATIONS

Final Office Action for U.S. Appl. No. 17/228,497 dated Mar. 17, 2023.
(Continued)

*Primary Examiner* — Nigar Chowdhury
(74) *Attorney, Agent, or Firm* — Vista IP Law Group, LLP

(57) ABSTRACT

Automated systems and methods for evaluating specimens affixed to substrates, such as slides, an exemplary system including a slide imager configured for acquiring a plurality of micro images of a specimen affixed to an substrate, the specimen including a plurality of objects distributed within a three-dimensional volume, and for generating a whole specimen image of the specimen using the micro images, wherein objects contained in the specimen are depicted substantially in focus in the whole specimen image regardless of a z-depth of the respective objects within the specimen. The whole specimen image is stored on a storage
(Continued)

medium for subsequent review by a cytotechnologist using a computer-controlled review station including a display and a user interface, wherein the review station user interface is configured such that the cytotechnologist can review and classify the stored whole specimen images.

19 Claims, 60 Drawing Sheets

(51) Int. Cl.
  *G01N 35/00* (2006.01)
  *G02B 21/34* (2006.01)
  *G02B 21/36* (2006.01)
  *G06V 10/22* (2022.01)
  *G06V 20/69* (2022.01)

(52) U.S. Cl.
  CPC ......... *G01N 35/0099* (2013.01); *G02B 21/34* (2013.01); *G06V 10/22* (2022.01); *G06V 20/693* (2022.01)

(56) References Cited

U.S. PATENT DOCUMENTS

| | | | |
|---|---|---|---|
| 5,269,918 A | 12/1993 | Lapidus et al. |
| 5,282,978 A | 2/1994 | Polk, Jr. et al. |
| 5,677,966 A | 10/1997 | Doerrer et al. |
| 5,790,710 A | 8/1998 | Price et al. |
| 6,101,265 A | 8/2000 | Bacus et al. |
| 6,272,235 B1 | 8/2001 | Bacus et al. |
| 6,562,299 B1 | 5/2003 | Ostgaard et al. |
| 6,572,824 B1 | 6/2003 | Ostgaard et al. |
| 6,665,060 B1 | 12/2003 | Zahniser et al. |
| 6,674,881 B2 | 1/2004 | Bacus et al. |
| 6,711,283 B1 | 3/2004 | Soenksen |
| 6,847,729 B1 | 1/2005 | Clinch et al. |
| 6,917,696 B2 | 7/2005 | Soenksen |
| 7,006,674 B1 | 2/2006 | Zahniser et al. |
| 7,035,478 B2 | 4/2006 | Crandall et al. |
| 7,116,440 B2 | 10/2006 | Eichhorn et al. |
| 7,149,332 B2 | 12/2006 | Bacus et al. |
| 7,372,985 B2 | 5/2008 | So et al. |
| 7,457,446 B2 | 11/2008 | Soenksen |
| 7,463,761 B2 | 12/2008 | Eichhorn et al. |
| 7,518,652 B2 | 4/2009 | Olson et al. |
| 7,542,596 B2 | 6/2009 | Bacus et al. |
| 7,556,777 B2 | 7/2009 | Victor |
| 7,579,190 B2 | 8/2009 | Ostgaard et al. |
| 7,587,078 B2 | 9/2009 | Zahniser et al. |
| 7,590,492 B2 | 9/2009 | Zahniser et al. |
| 7,596,249 B2 | 9/2009 | Bacus et al. |
| 7,602,524 B2 | 10/2009 | Eichhorn et al. |
| 7,646,495 B2 | 1/2010 | Olsen et al. |
| 7,663,078 B2 | 2/2010 | Virag et al. |
| 7,666,362 B2 | 2/2010 | Shanler |
| 7,675,045 B1 | 3/2010 | Werner et al. |
| 7,689,024 B2 | 3/2010 | Eichhorn et al. |
| 7,724,937 B2 | 5/2010 | So et al. |
| 7,736,304 B2 | 6/2010 | Pecherer |
| 7,738,688 B2 | 6/2010 | Eichhorn et al. |
| 7,769,219 B2 | 8/2010 | Zahniser |
| 7,771,662 B2 | 8/2010 | Pressman et al. |
| 7,801,352 B2 | 9/2010 | Uchiyama et al. |
| 7,826,649 B2 | 11/2010 | Crandall et al. |
| 7,839,551 B2 | 11/2010 | Lee et al. |
| 7,856,131 B2 | 12/2010 | Bacus et al. |
| 7,869,642 B2 | 1/2011 | Dennison |
| 7,885,447 B2 | 2/2011 | Oshiro et al. |
| 7,893,988 B2 | 2/2011 | Olson et al. |
| 7,949,168 B2 | 5/2011 | Crandall et al. |
| 7,978,894 B2 | 7/2011 | Soenksen |
| 8,010,555 B2 | 8/2011 | Eichhorn |
| 8,041,147 B2 | 10/2011 | Molnar et al. |
| 8,055,042 B2 | 11/2011 | Soenksen |
| 8,059,336 B2 | 11/2011 | Ptitsyn et al. |
| 8,086,077 B2 | 12/2011 | Eichhorn |
| 8,094,902 B2 | 1/2012 | Crandall et al. |
| 8,103,082 B2 | 1/2012 | Olson et al. |
| 8,106,942 B2 | 1/2012 | Cooke et al. |
| 8,116,550 B2 | 2/2012 | Zahniser |
| 8,126,250 B2 | 2/2012 | Cooke et al. |
| 8,164,622 B2 | 4/2012 | Crandall |
| 8,165,363 B2 | 4/2012 | Soenksen et al. |
| 8,203,575 B2 | 6/2012 | Molnar et al. |
| 8,351,675 B2 | 1/2013 | So et al. |
| 8,463,741 B2 | 1/2013 | Ehlke et al. |
| 8,385,619 B2 | 2/2013 | Soenksen et al. |
| 8,456,522 B2 | 6/2013 | Olson et al. |
| 8,565,503 B2 | 10/2013 | Eichhorn et al. |
| 8,718,351 B2 | 5/2014 | So et al. |
| 8,743,195 B2 | 6/2014 | Najmabadi et al. |
| 8,774,477 B2 | 7/2014 | Eichhorn et al. |
| 8,995,790 B2 | 3/2015 | Mueller et al. |
| 9,008,378 B2 | 4/2015 | Micheva et al. |
| 9,041,791 B2 | 5/2015 | Zahniser |
| 9,279,973 B2 | 3/2016 | Takaya |
| 9,366,628 B2 | 6/2016 | Crandall et al. |
| 9,429,743 B2 | 8/2016 | Garsha et al. |
| 9,523,844 B2 | 12/2016 | Najmabadi et al. |
| 9,578,227 B2 | 2/2017 | Hulsken |
| 2003/0179445 A1 | 9/2003 | Maenle et al. |
| 2003/0210262 A1 | 11/2003 | Gahm et al. |
| 2006/0045388 A1 | 3/2006 | Zeineh et al. |
| 2007/0274585 A1 | 11/2007 | Zhang |
| 2009/0212242 A1* | 8/2009 | Yamada ................ G02B 21/18 250/580 |
| 2009/0231689 A1 | 9/2009 | Ptitsyn et al. |
| 2011/0141103 A1 | 6/2011 | Cohen et al. |
| 2012/0044342 A1 | 2/2012 | Hing et al. |
| 2012/0075695 A1* | 3/2012 | DeBlasis .................. B01L 9/52 359/391 |
| 2012/0082362 A1* | 4/2012 | Diem ..................... A61B 5/418 382/133 |
| 2012/0092477 A1* | 4/2012 | Kawano ............... G02B 21/365 348/79 |
| 2012/0218400 A1* | 8/2012 | Kurata ................. G02B 21/365 348/79 |
| 2013/0231957 A1 | 9/2013 | Lareau |
| 2014/0184778 A1 | 7/2014 | Takayama |
| 2014/0252200 A1 | 9/2014 | Garsha et al. |
| 2015/0309299 A1 | 10/2015 | Watanabe |
| 2016/0042511 A1 | 2/2016 | Chukka et al. |
| 2016/0170197 A1 | 6/2016 | Kenny et al. |
| 2016/0327779 A1 | 11/2016 | Hillman |
| 2017/0034659 A1 | 2/2017 | Shnitzer et al. |
| 2017/0161545 A1 | 6/2017 | Champlin et al. |
| 2018/0188517 A1* | 7/2018 | Zou ...................... G02B 21/002 |

FOREIGN PATENT DOCUMENTS

| | | |
|---|---|---|
| JP | 2017-107106 A | 6/2017 |
| JP | 2017-135437 A | 8/2017 |
| JP | 2017-168123 A | 9/2017 |
| JP | 2018-031798 A | 3/2018 |
| TW | 201710949 | 3/2017 |
| TW | 202036477 | 10/2020 |
| WO | WO 01/84209 | 11/2001 |
| WO | WO 2008/137746 | 11/2008 |
| WO | WO 2012/068142 | 5/2012 |
| WO | WO 2014/089494 | 6/2014 |
| WO | WO 2015/109323 A2 | 7/2015 |
| WO | WO 2016/102200 A1 | 6/2016 |
| WO | WO 2017/215707 | 12/2017 |
| WO | WO 2018/094290 | 5/2018 |
| WO | WO 2018/190055 | 10/2018 |

OTHER PUBLICATIONS

First Exam Report for EP Patent Appln. No. 19794829.2 dated Aug. 9, 2023.

(56) References Cited

OTHER PUBLICATIONS

Foreign OA for JP Patent Appln. No. 2021-523439 dated Sep. 21, 2023 (with English translation).
"High-throughput brightfield scanner", Ventana Medical Systems, Inc., copyright 2015 (4 pages).
The Yokohama System for reporting endometrial cytology: Diagnostic Cytopathology, May 2018; vol. 46(5), pp. 400-412).
Guidelines for the Reporting of Nongynecologic Cytopathology Specimens, Archives of Pathology & Laboratory Medicine: Nov. 2009, vol. 133, No. 11, pp. 1743-1756.
Foreign OA for Taiwanese Patent Appln. No. 108139798 dated Apr. 20, 2023.
Foreign Search Report for Taiwanese Patent Appln. No. 108139798 dated Apr. 17, 2023.
PCT International Report on Patentability for International Appln. No. PCT/US2019/055458, Applicant Hologic, Inc., dated May 14, 2021 (15 pages).
Foreign OA CN Patent Appln. No. 201980072461.0 dated Apr. 25, 2023 (with English translation).
Non-Final Office Action for U.S. Appl. No. 17/228,497 dated Jul. 10, 2023.
Foreign OA and Search Report for TW Patent Appln. No. 11221280470 dated Dec. 20, 2023 (with embedded English translations).
Foreign OA for CN Patent Appln. No. 201980072461.0 dated Oct. 9, 2023 (with English translation).
Foreign OA for IL Patent Appln. No. 282815 dated Jan. 16, 2024.
PCT International Search Report and Written Opinion for PCT/US2019/055458, Applicant: Hologic, Inc., dated May 6, 2020 (22 pages).
English translation of Foreign OA for CN Patent Appln. No. 11221280470 dated Dec. 20, 2023.
Foreign OA for CN Patent Appln. No. 201980072461,9 dated Jan. 22, 2024 (with English translation).

\* cited by examiner

SWATH DIRECTION

| MY WORKLIST (8) | | | | |
|---|---|---|---|---|
| FILTER ☑GYN ☑NON-GYN | | | SEARCH 🔍 | |
| ACCESSION NUMBER | CASE TYPE | STATUS | DEADLINE | |
| 21318708301 | GYN | ◯ NOT STARTED | DUE: TODAY 1:30PM | ⋯ |
| 21318708302 | NON-GYN | ◯ IN PROGRESS | DUE: TODAY 1:30PM | ⋯ |
| 21318708312 | GYN | ◯ NOT STARTED | DUE: TODAY 1:30PM | ⋯ |
| 21318708313 | GYN | ◯ IN PROGRESS SENT FOR REVIEW | DUE: TODAY 1:30PM | ⋯ |
| 21318708317 | GYN | ◯ NOT STARTED | DUE: TODAY 1:30PM | ⋯ |
| 21318708319 | NON-GYN | ◯ NOT STARTED | DUE: TODAY 1:30PM | ⋯ |
| 21318708337 | GYN | | | |

MY WORKLIST (8) — 346

REVIEWS COMPLETED TODAY (15) — 348

SEARCH — 350

+ ADD CASES — 344

362

FILTER ☑GYN ☑NON-GYN

| ACCESSION NUMBER | CASE TYPE | STATUS | DEADLINE | |
|---|---|---|---|---|
| 21318708301 — 352 | GYN | ○ NOT STARTED | DUE: TODAY 1:30PM | ⋮ |
| 21318708302  316 | NON-GYN | ◌ IN PROGRESS | DUE: TODAY 1:30PM | ⋮ |
| 21318708312 | GYN | ○ NOT STARTED | DUE: TODAY 1:30PM | ⋮ |
| 21318708313 | GYN | ○ NOT STARTED | DUE: TODAY 1:30PM | ⋮ |
| 21318708317 | GYN | ◌ IN PROGRESS ⊠ SENT FOR REVIEW | DUE: TODAY 1:30PM | ⋮ |
| 21318708319 | NON-GYN | ○ NOT STARTED | DUE: TODAY 1:30PM | ⋮ |
| 21318708337 | GYN | ○ NOT STARTED | DUE: TODAY 1:30PM | ⋮ |

*ThinPrep* DIGITAL CYTOLOGY — 318

☰ MY WORKLIST

☐ AWAITING CT REVIEW
☑ COMPLETED CASES — 354
⬇ MY SAVED CASES — 370

370

◉ JANE D. ▾

HOLOGIC™

DIGITAL IMAGING SYSTEM AND METHOD

CROSS-REFERENCE TO RELATED APPLICATIONS

The patent application is a National Phase entry under 35 U.S.C. § 371 of International Patent Application No. PCT/US2019/055458, filed Oct. 9, 2019, which claims priority to U.S. provisional application No. 62/755,151, entitled "DIGITAL IMAGING SYSTEM AND METHOD," filed on Nov. 2, 2018, and U.S. provisional application No. 62/755,291, entitled "DIGITAL IMAGING DISPLAY SYSTEMS AND METHODS," filed on Nov. 2, 2018.

FIELD OF THE DISCLOSURE

The present disclosure generally relates to digital imaging systems and methods, and more particularly, to digital imaging systems and methods for acquiring digital images of specimens, such as cytological (cellular) specimens and pathologic (solid) tissue specimens, which may be displayed and viewed on a computer monitor by cytotechnologists and/or cytopathologists.

BACKGROUND

Cytology is a branch of biology dealing with the study of the formation, structure, and function of cells. As applied in a laboratory setting, cytologists, cytotechnologists, and other medical professionals make medical diagnoses of a patient's condition based on visual examination of a sample of the patient's cells, such sample being referred to herein as a "cytological" specimen. A typical cytological technique is a "pap smear" test, in which cells are scraped from a woman's cervix and analyzed in order to detect the presence of abnormal cells, a precursor to the onset of cervical cancer. Cytological techniques are also used to detect abnormal cells and disease in other parts of the human body.

Cytological techniques are widely employed because collection of cell samples for analysis is generally less invasive than traditional surgical pathological procedures such as biopsies, whereby a solid tissue sample, referred to herein as a "pathologic" specimen, is excised from the patient using specialized biopsy needles having spring loaded translatable stylets, fixed cannulae, and the like. Cell samples may be obtained from the patient by a variety of techniques including, for example, by scraping or swabbing an area, or by using a needle to aspirate body liquids from the chest cavity, bladder, spinal canal, or other appropriate area. The acquired cell sample is typically placed in a preservative solution and subsequently extracted from the solution and transferred to a glass slide. A fixative is applied to the cell sample to ensure the cells remain in place on the glass slide for facilitating subsequent staining and examination.

It is generally desirable that the cells on the slide have a proper spatial distribution, so that individual cells can be examined. A single layer of cells is typically preferred. Accordingly, preparing a cytological specimen from a liquid sample containing many cells (e.g., tens of thousands) typically requires that the cells first be separated from each other by mechanical dispersion, liquidic shear, or other techniques so that a thin, monolayer of cells can be collected and deposited on the slide. In this manner, the cytotechnologist can more readily discern the presence of any abnormal cells in the patient sample. The cells are also able to be counted to ensure that an adequate number of cells have been evaluated.

Certain methods and apparatus for generating a thin monolayer of cells from a liquid sample container and then transferring this thin layer to a "specimen slide" that is advantageous for visual examination are disclosed in U.S. Pat. Nos. 5,143,627, 5,240,606, 5,269,918, 5,282,978, 6,562,299, 6,572,824 and 7,579,190. All publications cited herein are incorporated by reference in their entireties. According to one method disclosed in these patents, a patient's cells suspended in a preservative liquid and stored in a sample container are dispersed using a spinning sample collector inserted into the container. A controlled vacuum is applied to the sample collector to draw the liquid through a screen filter thereof until a desired quantity and spatial distribution of cells is collected against the filter. Thereafter, the sample collector is removed from the sample container and the filter portion impressed against a glass slide to transfer the collected cells to the slide in substantially the same spatial distribution as collected. Apparatus manufactured according to the teachings of one or more of these patents have been commercially successful, such as the ThinPrep® 2000 Processor (specimen slides processed from patient samples one at a time), and the ThinPrep® 5000 Processor (specimen slides batch processed from patient samples), which are manufactured and sold by Hologic, Inc., located in Marlborough, Massachusetts. Further reference is made to U.S. Pat. Nos. 7,556,777, and 7,771,662.

Once a specimen slide has been prepared, the specimen may be visually inspected by a cytotechnologist, typically under magnification, and with or without various sources of illumination. Additionally, or alternatively, automated slide imaging systems are used to aid in the cytological inspection process. For example, an automated slide imaging system may capture an image of all, or substantially all, of the individual cells within a cytological specimen fixed to the slide, and perform a preliminary assessment of the cells using image processing techniques in order to direct the cytotechnologist to potentially the most relevant cells on the slide for close inspection. Examples of such imaging systems are disclosed in U.S. Pat. Nos. 7,587,078, 6,665,060, 7,006,674, 7,369,304 and 7,590,492. Whether by inspection of the actual specimen slide under magnification, or of magnified images of the specimen, the specimen is typically classified by the cytotechnologist as either "normal" or "abnormal," where an abnormal sample normally falls in one of the major categories defined by The Bethesda System for Reporting Cervical/Vaginal Cytologic Diagnosis, which categories include Low-Grade Squamous Intraepithelial Lesions (LSIL), High-Grade Squamous Intraepithelial Lesions (HSIL), Squamous Cell Carcinoma, Adenocarcinoma, Atypical Glandular cells of Undetermined Significance (AGUS), Adenocarcinoma in situ (AIS), and Atypical Squamous Cell (ASC). Additional information regarding cell specimen classifications is widely available, such as The Yokohama System for reporting endometrial cytology: Diagnostic Cytopathology, 2018 May; Vol. 46(5), pp. 400-412); and Guidelines for the Reporting of Nongynecologic Cytopathology Specimens, Archives of Pathology & Laboratory Medicine: November 2009, Vol. 133, No. 11, pp. 1743-1756.

However, there are a number of shortcomings associated with prior systems and methods for acquiring digital images of biological specimens. For one, prior systems and methods suffer from slow acquisition times because of the time required to scan an entire specimen. In addition, prior systems and methods typically provide only a single plane of focus across the specimen. Biological specimens, including both cytological and pathologic specimens, are actually three-dimensional (i.e., having a depth). Therefore, due to the high magnification and the focal apertures required to obtain digital images of biological specimens, the depth of field of the images is very limited. Accordingly, portions of a specimen outside of the depth of field in the focal plane will be out of focus or not visible in the image. In order to obtain in-focus digital images at multiple, different depths of the specimen, the plane of focus must be adjusted, such as by moving the specimen or camera, or by adjusting a focusing lens. However, this requires an additional scan of the specimen for each plane of focus, which further slows the acquisition time.

SUMMARY OF THE DISCLOSURE

Embodiments of improved automated systems for evaluating specimens (e.g., cytological or pathologic specimens) affixed to substrates are disclosed and described herein. Typically, the substrates are microscope slides, and therefore, the embodiments are described with regard to using slides as the substrates with the understanding that the automated systems and methods disclosed herein are not limited to using slides, but may utilize any suitable substrate. The specimens may include any type of specimen to be digitally imaged under microscope magnification, such as a biological or chemical specimen, including cytological specimens, tissue specimens, etc. As used herein, the term "specimen" may apply to an entire specimen, or a portion therefor, depending on the context.

In an exemplary automated slide imaging system constructed according to the disclosed inventions includes an imager configured for acquiring images of a specimen affixed to a surface of a slide, the specimen comprising a plurality of objects distributed within a three-dimensional volume, and for generating a whole specimen image from the acquired images, wherein the objects are depicted in focus in the whole specimen image regardless of individual locations of the respective objects within the three-dimensional volume, and wherein the three-dimensional specimen volume has a length, a width and a thickness, the thickness defining a z-axis relative to the slide surface, wherein respective objects of the specimen (e.g., individual cells or tissue structures, as may be the case) are located at differing locations along the z-axis. The acquired images may include a macro image of the specimen, and a plurality of micro images of the specimen, wherein the macro image includes one or more fiducial markers located on the slide surface, and wherein the imager is configured to acquire the micro images based at least in part on the relative location and boundaries of the specimen on the slide surface determined from the macro image.

In an exemplary embodiment, the imager has a first imaging platform configured for seating the slide, and a first camera configured to acquire the macro image when the slide is seated on the first imaging platform, along with a second imaging platform configured for seating the slide, and a second camera configured to acquire the micro images of a specimen affixed to a slide seated on the second imaging platform. The imager is configured to automatically move at least one of the second camera and second imaging platform relative to the other for acquiring the micro images, wherein an optical axis of the second camera forms a non-orthogonal angle with the second imaging platform, and wherein the imager is configured to acquire the micro images of the specimen at a same z-axis of the three-dimensional specimen volume. Notably, the slide being imaged has a thickness, and the micro images may include at least a portion of the slide underlying the surface. The specimen may be covered with a coverslip that is sufficiently transparent to acquire the micro images of the specimen through the coverslip, the coverslip having a thickness, wherein the micro images each includes at least a portion of a depth of the coverslip. In the exemplary embodiment, the specimen slides have a width defining an x-axis, and a length defining a y-axis, and the imager is configured to translate the slide along the y-axis relative to the second camera as the second camera acquires the micro images at respective y-axis locations, each micro image including an entire x-axis width of the specimen based on the determined specimen boundaries on the slide surface.

In an exemplary embodiment, the imager has one or more slide holder receptacles, each slide holder receptacle configured to receive a slide holder comprising a plurality of slots, each slot configured to hold an individual slide, and a robotic arm assembly configured to (i) engage and remove the slide from a slot of a slide holder in the slide holder receptacle, (ii) transport and seat the slide on the first imaging platform for acquisition of the macro image, (iii) re-engage and remove the slide from the first imaging platform, (iv) transport and seat the slide on the second imaging platform for acquisition of the micro images, and (v) re-engage and remove the slide from the second imaging platform. The robotic arm assembly may be further configured to (vi) transport the slide to a same or a different slide holder from which the slide was removed, and (vii) release the slide into a slot of the respective same or different slide holder, wherein the slot of the respective same or different slide holder is the same slot from which the slide was removed by the robotic arm assembly.

In an exemplary embodiment, the imager includes an image processor configured to generate the whole specimen image from the micro images, wherein the image processor determines a respective best focus image for individual objects in the micro images, and wherein the best focus images of the objects are incorporated into the whole specimen image. The image processor is preferably further configured to identify objects (e.g., individual cells or tissue structures) of interest in the specimen, and to store images of said identified objects of interest with the whole specimen image. The macro image of the specimen may include an image of a bar code on the slide surface, in which case the imager is preferably configured to obtain information regarding the specimen from the bar code.

In an exemplary embodiment, the system further includes a review station including a display monitor, a user interface, and a processor operatively coupled with the respective display monitor and user interface, wherein the processor is configured to display the whole specimen image on the display monitor along with separate images of individual objects within the specimen image.

Without limitation, the review station may be configured to allow the system user to choose the whole specimen image from a listing of stored whole specimen images using the user interface.

Without limitation, the system may be configured to allow a system user to finally characterize or otherwise forward the whole specimen image for secondary review using the user interface.

Without limitation, a listing of stored whole specimen images that have not yet been finally characterized or otherwise forwarded for secondary review may be organized and displayed in a plurality of differing formats based on input received through the user interface. The system may be further configured to allow an authorized third party to populate, in whole or part, the listing of stored whole specimen images for a particular system user to review.

In an exemplary embodiment, the system is configured to allow annotations to be added by a system user to the whole specimen image and/or a data file associated with a whole specimen image, wherein the annotations are available to subsequent system users to review along with the whole specimen image. For example, the annotations may be associated with individual objects in the whole specimen image, and may be in the form of electronic markings made on the whole specimen image or on images of a portion of the whole specimen image.

In an exemplary embodiment, the system may be configured to display one or more additional objects that share one or more characteristics with the respective object in response to a system user prompt associated with a respective object in the whole specimen image, wherein the one or more additional objects (e.g., cells or tissue structures, as may be applicable) may be from the whole specimen image and/or from a library containing previously classified objects. Without limitation, the system may be configured to allow data regarding the whole specimen image or individual objects therein to be input through the user interface and stored in a data file associated with the whole specimen image.

In an exemplary embodiment, the system is be configured to display a magnified view of at least a portion of the whole specimen image, and to automatically scan said displayed at least a portion of the whole specimen image. In such embodiment, the system preferably automatically scans in scanning pattern, which may be user selected, including without limitation a serpentine pattern, a row by row pattern, and a column by column pattern. In such embodiment, the system is preferably configured to allow a system user, via the user interface, to set a magnification level at which the system displays said scanned at least portion of the whole specimen image. In such embodiments, the system is preferably configured to allow a system user, via the user interface, to stop and start the scanning at a displayed location of the scan, as well as to set a speed of the scanning. In such embodiments, the system is configured to allow a system user to pause the scanning at each object as the respective objects are displayed during the scanning.

In an exemplary embodiment, the system is configured to display a review screen on the display monitor, the review screen including a main image panel in which whole specimen image is displayed, and an object panel in which separate images of individual objects within the specimen image are displayed, wherein a system user may, via the user interface, zoom in/out and/or pan around the whole specimen image within the main image panel. Without limitation, the system may be configured to display an area of the whole specimen image containing a respective object within the main image panel upon a system user selecting, via the user interface, a separate image of the object in the object panel. Without limitation, the system may be configured to allow a system user to select, via the user interface, an object in the displayed whole specimen image, wherein the system displays an image of the selected object in a system user selected image panel.

In accordance with a further aspect of the inventions disclosed herein, a method of generating a whole specimen image of a specimen affixed to a surface of a slide is provided, the specimen comprising a plurality of objects distributed within a three-dimensional volume, the method including (i) acquiring a macro image of the specimen; (ii) acquiring a plurality of micro images of the specimen based at least in part on the macro image; and (iii) generating the whole specimen image by processing the micro images using an image processor, wherein the objects are depicted substantially in focus in the whole specimen image regardless of individual locations of the respective objects within the three-dimensional volume, the three-dimensional volume has a length, a width and a thickness, the thickness defining a z-axis relative to the slide surface, wherein respective objects (e.g., cells or tissue structures) of the specimen are located at differing locations along the z-axis.

Without limitation, the macro image may be acquired using a first camera, and the micro images are acquired using a second camera, wherein at least one of the second camera and slide are automatically moved relative to the other when acquiring the micro images, wherein an optical axis of the second camera forms a non-orthogonal angle with the slide, and wherein the micro images are acquired at a same z-axis of the three-dimensional volume. The whole specimen image may then be generated by processing the micro images using an image processor to determine a respective best focus image for individual objects in the micro images, and incorporate the respective best focus images of the objects into the whole specimen image.

The macro image preferably captures one or more fiducial markers located on the slide surface, the method further comprising determining a relative location and boundaries of the specimen on the slide surface based at least in part on the one or more fiducial markers, wherein the micro images are acquired based at least in part on the relative location and boundaries of the specimen on the slide surface determined from the macro image. The micro images may be acquired by translating the slide along a y-axis relative to the second camera as the second camera acquires the micro images at respective y-axis locations, each micro image including an entire x-axis width of the specimen based on the determined specimen boundaries on the slide surface.

The method may further include identifying objects (e.g., individual cells or tissue structures) of interest in the specimen, and storing images of the identified objects of interest with the whole specimen image.

The method may further include reviewing the whole specimen image including images of individual objects therein using a computer-controlled review station including a display and a user interface.

Other and further features and advantages of the disclosed embodiments of automated imaging and review systems are depicted in the accompanying figures and described in the below detailed description of the same.

BRIEF DESCRIPTION OF THE DRAWINGS

The foregoing and other aspects of embodiments are described in further detail with reference to the accompanying drawings, where like reference numerals refer to like elements and the description for like elements shall be applicable for all described embodiments wherever relevant:

FIG. 40 shows a worklist screen having a simple list format displayed by the digital imaging display system, according to one embodiment;

FIG. 41 shows a worklist screen having a tiles/grid format displayed by the digital imaging display system, according to one embodiment;

FIG. 44 shows a worklist screen having a graphical status indicator displayed by the digital imaging display system, according to one embodiment;

FIG. 51 shows a worklist screen after completion of a case with completed cases hidden from the worklist displayed by the digital imaging display system, according to one embodiment;

DETAILED DESCRIPTION OF THE ILLUSTRATED EMBODIMENTS

Figure 1:
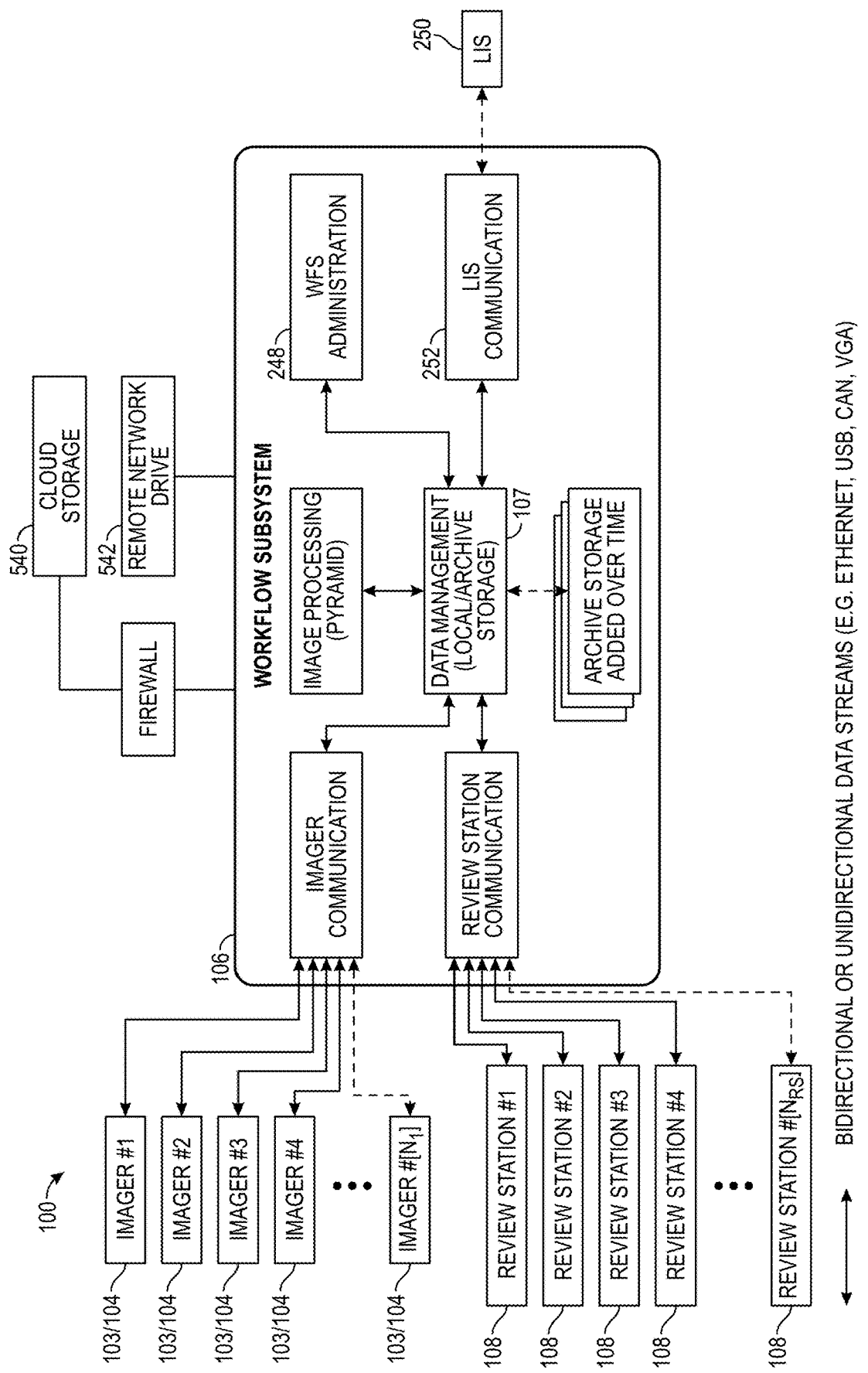
FIG. 1 is a block-diagram of an automated digital imaging system, according to one embodiment.
Figure 2:
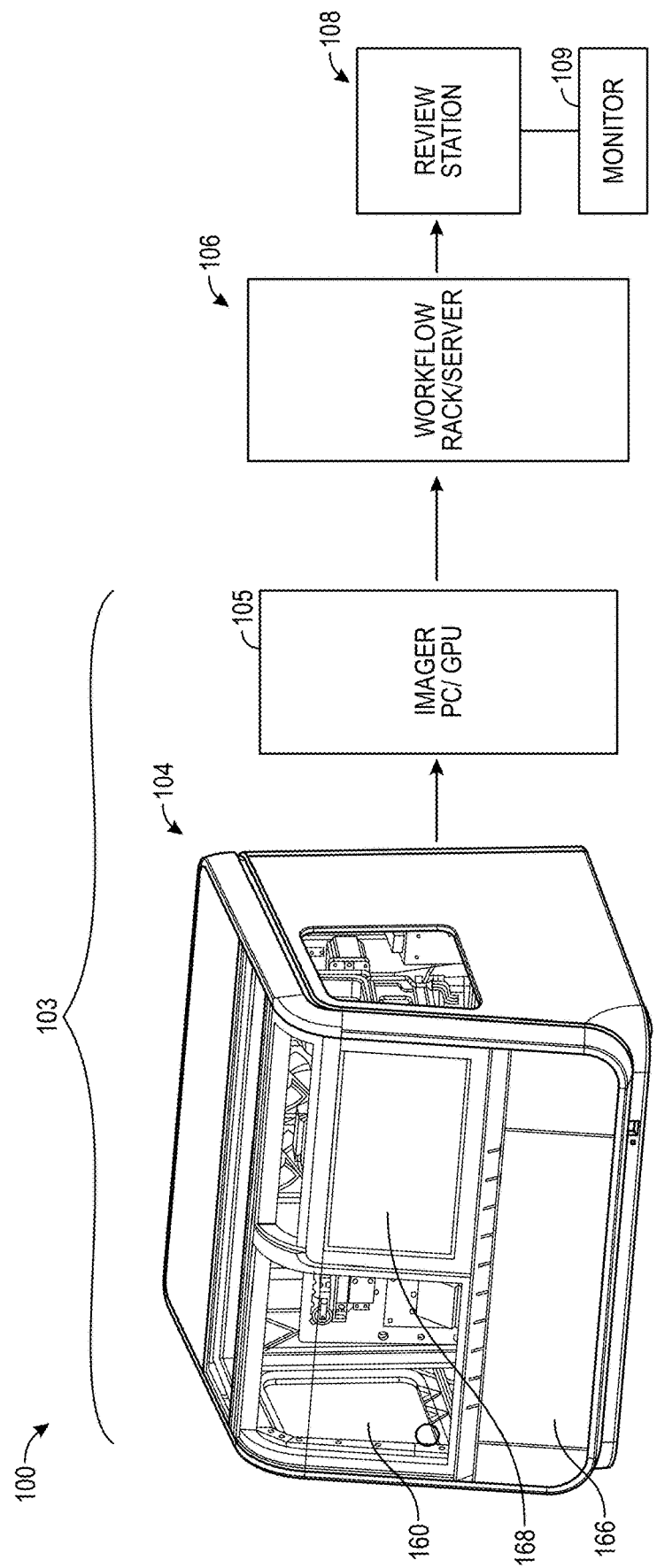
FIG. 2 is a block-diagram of the automated digital imaging system of FIG. 1, showing a single imager and review station, according to one embodiment.
Figure 3:
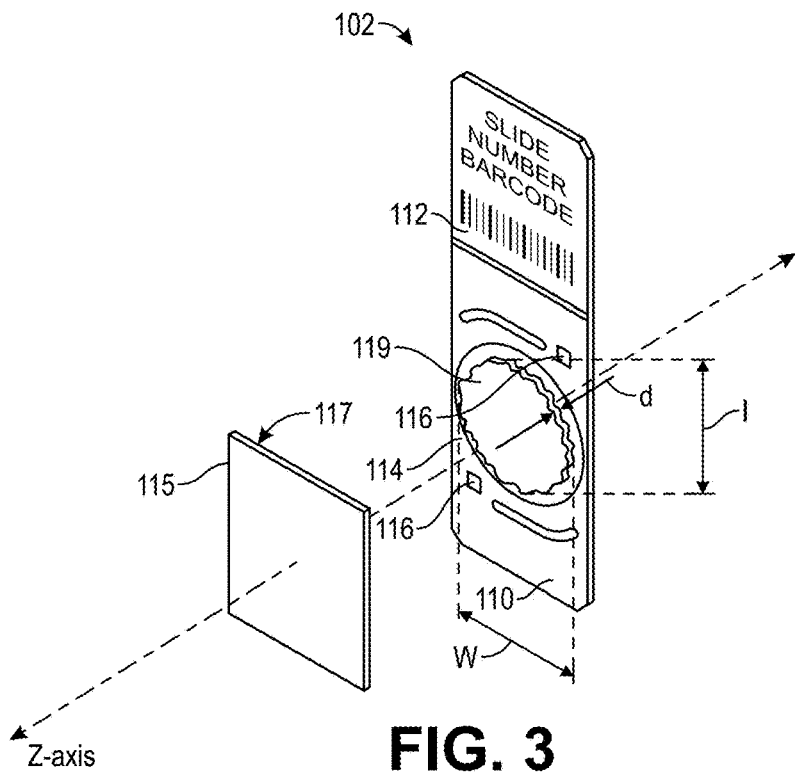
FIG. 3 shows a specimen slide for use in the automated digital imaging system of FIG. 1, according to one embodiment.

FIGS. 1 and 2 illustrate an automated digital imaging system 100 for digitally imaging a plurality of specimens on substrates 102 having specimen(s) disposed on the substrates 102 (see FIG. 3). For example, the substrates 102 may be microscope slides, as depicted in the described embodiment, or any other suitable substrate 102, such as a microplate, microarray, other suitable media. The described embodiment of the digital imaging system 100 utilizes microscope slides, and therefore, the substrates 102 will be referred to as slides, with the understanding that the digital imaging system 100 is not limited to using slides, but may utilize any suitable substrate 102. Thus, the term "slide" as used herein shall mean any suitable substrate for affixing a specimen thereon, including a microplate, microarray, or other suitable media. As used herein, the term "microscope slide" shall mean a thin, flat piece of glass or plastic used to hold objects for examination under a microscope. The specimens may include any type of specimen to be digitally imaged under microscope magnification, such as a biological or chemical specimen, including both cytological specimens, and pathological tissue specimens, etc. The case of the specimen being a cytological specimen containing individual cells dispersed within a dimensional volume is used for purposes of describing the imaging system 100. However, it is to be understood that the system may be used in the same manner for different types of specimens, such as pathological tissue specimens, as it used for cytological specimens.

The automated digital imaging system 100 is designed to acquire high resolution digital images of an entire specimen (or even multiple specimens) on a slide 102 and allow review of the specimen using the digital images of the specimen rather than the physical glass slide 102. Optical microscopes are not used in the normal review workflow of the digital imaging system 100. Instead, digital images of the entire specimen on a slide 102 are acquired and made available for viewing on a computer monitor 109 of a review station 108 (see FIG. 2). The digital imaging system 100 may also include an image processing software application 137 (installed on the imager computer 105 of the imager 104 and/or on the workflow subsystem 106) embodying an image processing algorithm configured to analyze the digital image of a slide specimen and identify objects of interest (OOI), i.e., individual cells in the case of a cytological specimen, or individual tissue structures in the case of a pathologic solid tissue specimen. The identified OOI can then be used to assist the user (e.g., a cytotechnologist or cytopathologist) in quickly and accurately reviewing the digital image of the slide specimen, as is described in the above-referenced U.S. Pat. Nos. 7,587,078, 6,665,060, 7,006,674 and 7,590,492. The term "OOI" means an object is determined to have characteristics which indicate the object (individual cell or tissue structure, a may be the case) may be useful for a cytotechnologist or cytopathologist to review in diagnosing or treating a patient, and does not necessarily mean that such object has been determined to be of real interest or actual significance to a cytotechnologist or cytopathologist.

The automated digital imaging system 100 includes one or more imager subsystems 103 (each including an imager 104 and an imager computer 105), operably connected to a workflow subsystem 106 (also referred to as a "workflow server 106") and one or more review stations 108. In general, each imager 104 is a benchtop system for capturing digital images of the slides 102. The imagers 104 handle batches of slides in an automated fashion. The workflow server 106 is a computer server functioning primarily as a large disk storage system for storing and managing the digital images and associated slide data. The workflow server 106 may also include software for image processing and data management and may also provide networking functionality. The review stations 108 are workstations including computers and monitors for accessing the digital images from the workflow server and displaying the digital images for diagnostic review of the images (OOI and/or whole specimen images).

As depicted in FIG. 1, the imager subsystems 103 are in data communication with the workflow subsystem 106 via a communication network which may include one or more of a local area network (LAN, e.g., Ethernet), wide area network (WAN), the internet (e.g., virtual private network (VPN)), or other suitable network. Similarly, the review stations 108 are in data communication with the workflow subsystem 106 via a communication network which may include one or more of a local area network (LAN, e.g., Ethernet), wide area network (WAN), the internet (e.g., virtual private network (VPN)), or other suitable network.

The imager 104 in the described embodiment is designed to operate with microscope slides 102. Referring to FIG. 3, an exemplary embodiment of a microscope slide 102 is shown. The microscope slide 102 is a rectangular glass plate 110 (or other suitable material) having a slide identification area 112, a specimen area 114, and fiducial marks 116. The microscope slide 102 may be a standard size microscope slide which is about 75 mm by 25 mm, or other suitable size. The microscope slide 102 may have beveled corners to facilitate handling and positioning of the slide 102. The specimen area 114 may be a circle having a diameter up to approximately 22 mm. The entire specimen area on the microscope slide 102 may also be imaged. The slide identification area 112 may be up to approximately 25-28 mm in length. The slide identification portion 112 may be printed with a barcode, ID number, and/or other information. The specimen area 114 is left as a clear area of the glass slide. The fiducial marks 116 may be used by the imager 104 as reference points on the slide 102 to determine the location and/or orientation of the slide 102 and its features relative to the imager 104. A specimen 119 including a plurality of objects distributed within a three-dimensional volume is affixed to the slide 102, usually within the specimen area 114, but in some cases the specimen can extend outside the specimen area 114. The three-dimensional volume has a length (l), a width (w) and a thickness or depth (d). The thickness (d) defines a z-axis relative to the surface of the slide 102. The three-dimensional volume may be substantially uniform in shape, including thickness, length, and/or width, or it may be non-uniform. A volume of a specimen 119 is uniform where one or more of the dimensions of specimen varies less than 10%, or less than 15%, or less than 20%. The specimen 119 may be any suitable specimen, such as a cytological specimen in which the objects are cells, a solid tissue sample in which the objects are tissue structures, etc.

As depicted in FIG. 3, a coverslip 115 may be used to cover the specimen 119 in the specimen area 114. The specimen coverslip 115 is sufficiently transparent to acquire the micro images of the specimen through the coverslip 115. In other words, the coverslip 115 does not impede the imager 104 from acquiring micro images and/or macro images through coverslip 115 using the imaging station 190 and/or the macrovision station 232. The coverslip 115 functions to preserve the specimen 119 and protect it from contamination and from contaminating other objects, and also holds the specimen 119 flat and in place. The coverslip 115 has a thickness 117.

Figure 4:
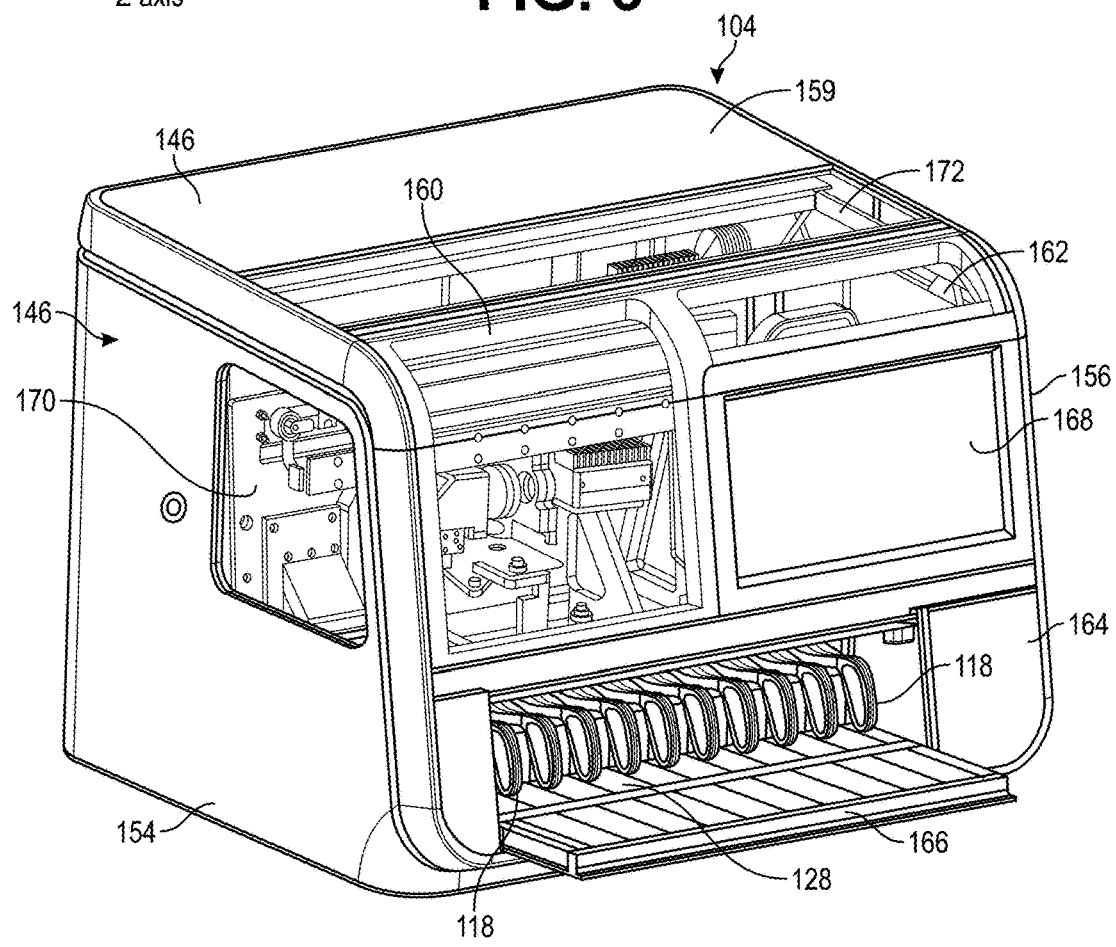
FIG. 4 is a front, perspective view of the digital imager of the digital imaging system of FIG. 2, according to one embodiment.
Figure 5:
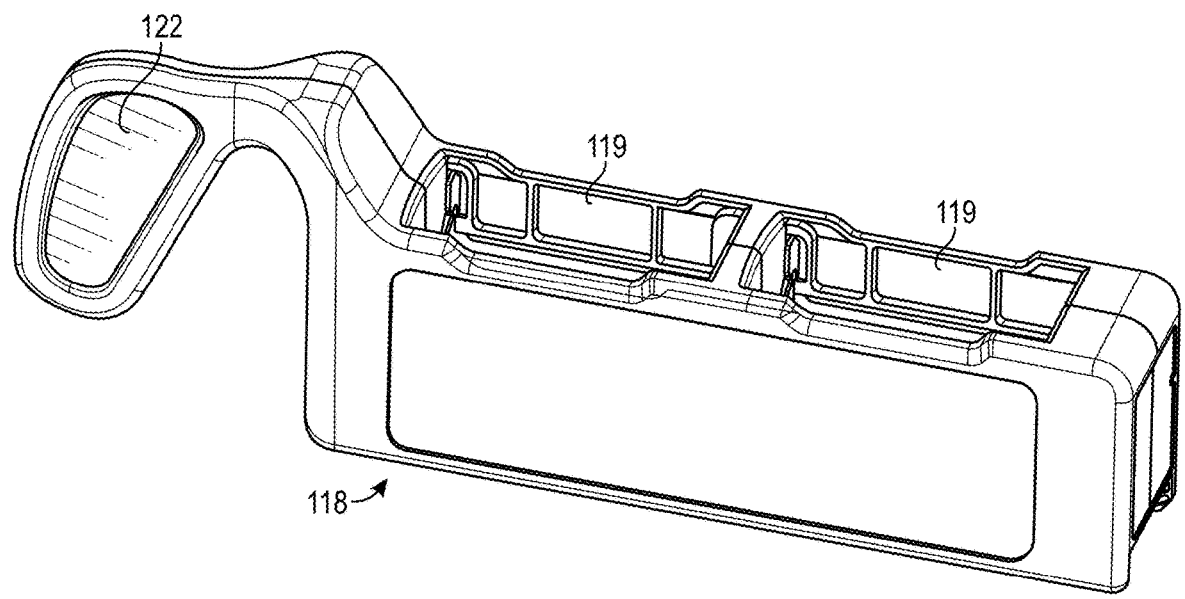
FIG. 5 is a side, perspective view of a slide carrier of the digital imager of FIG. 4, according to one embodiment.
Figure 6:
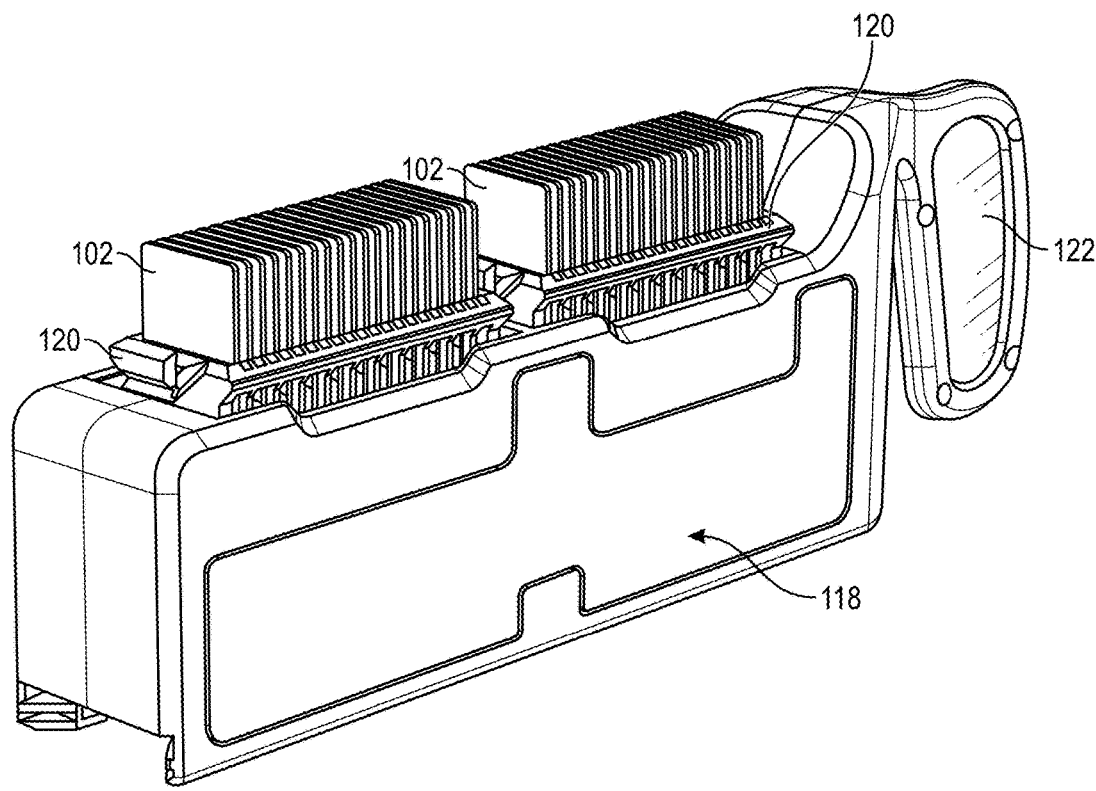
FIG. 6 is a side, perspective view of the slide carrier of FIG. 5 with slide racks filled with slides installed in the slide carrier, according to one embodiment.
Figure 7:
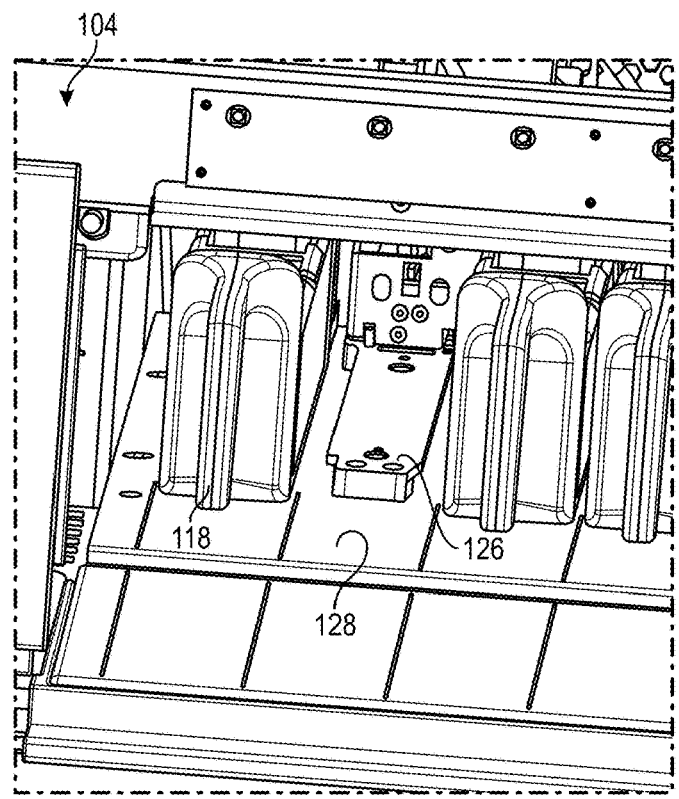
FIG. 7 is an enlarged, front perspective view of the slide carrier bay of the digital imager of FIG. 4, according to one embodiment.
Figure 8:
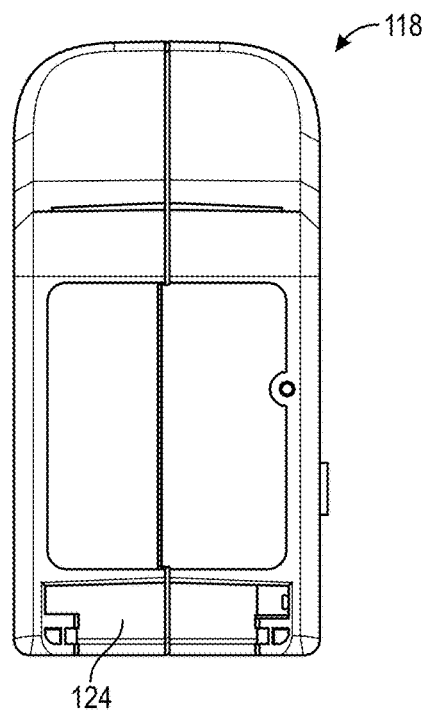
FIG. 8 is an end view of the slide carrier of FIGS. 5 and 6, according to one embodiment.

Referring to FIGS. 4 and 5, slide carriers 118 are used to load a plurality of slides 102 into the imager 104. As shown in FIG. 4, the imager 104 has a capacity of ten (10) slide carriers 118, but may be configured to hold any suitable number of slide carriers 118. Each slide carrier 118 has two rack holders 202, which each receive a slide rack 120. Each slide rack 120 may holds a plurality of slides 102, such as twenty (20) slides 102, or forty (40) slides 102, or other suitable number. The slide racks 120 may be standard, off-the-shelf racks, such as Sakura® racks or Leica® racks. Accordingly, each slide carrier 118 holds 40 slides, and the total capacity of the imager 104 is 400 slides (10 slide carriers 118×40 slides per carrier 118). The slide carrier 118 has a handle 122 for carrying the slide carrier 118 and inserting and removing the slide carrier 118 from the imager 104. As shown in FIGS. 7 and 8, the slide carrier 118 has a T-slot 124 which is slidingly received on a T-rail 126 mounted on the slide carrier deck 128. The slide carriers 118 are installed in the imager 104 by aligning the T-slot 124 with the T-rail 126 and sliding the slide carriers 118 on to the slide carrier deck 128. The slide carriers 118 are removed from the imager 104 by pulling the slide carriers 118 straight out of the slide carrier deck 128.

Figure 11:
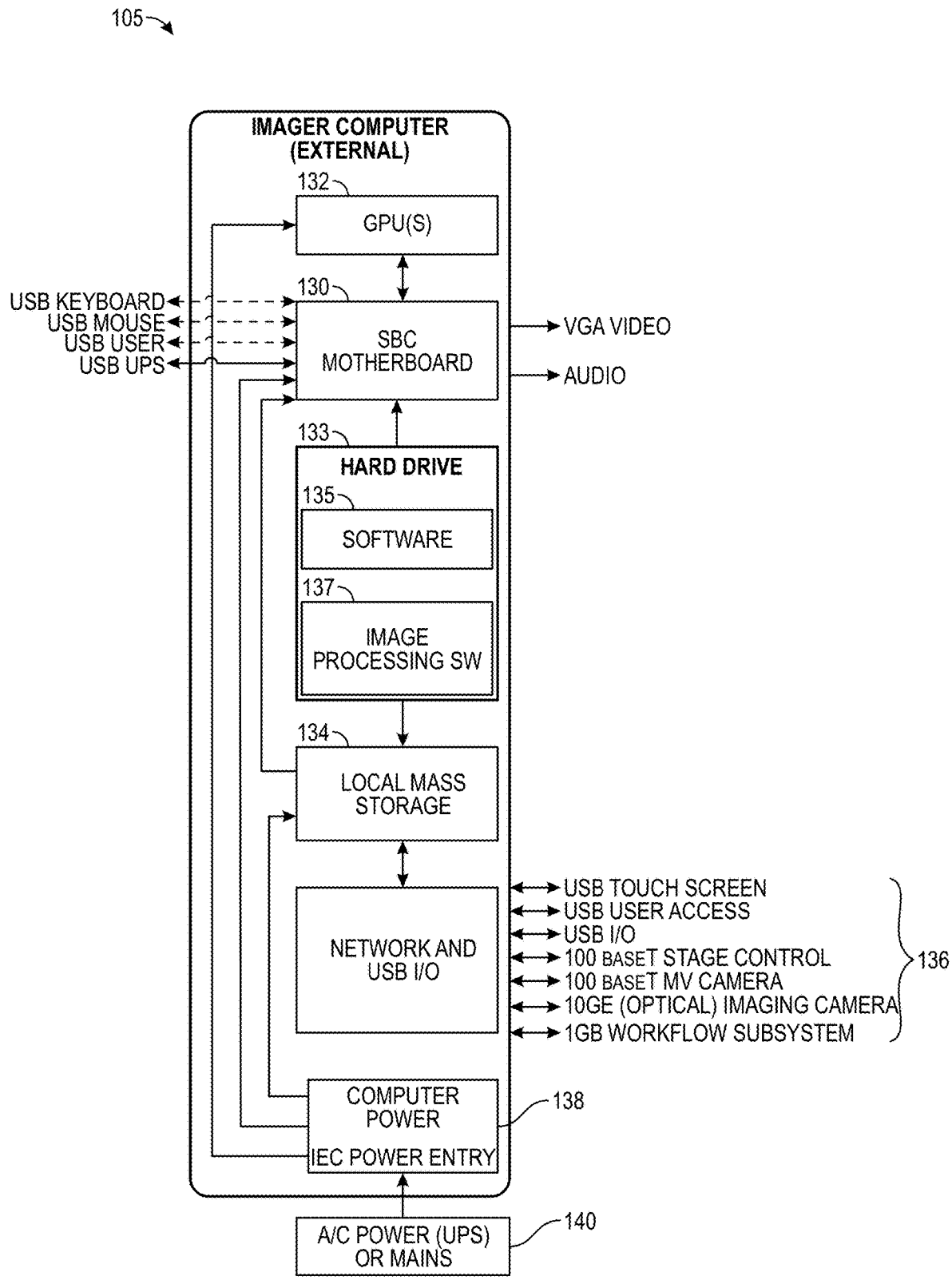
FIG. 11 is a schematic diagram of the imager computer of the digital imager of FIG. 4, according to one embodiment.

Referring now to FIGS. 2 and 11, the imaging subsystem 103 includes an imager 104 and an imager computer 105. The imager 104 and imager computer 105 are in data communication with each other via a network connection, such as an Ethernet connection (e.g., a 10GE optical connection). The imager computer 105 may be any suitable computer, such as a personal computer having one or more computer processors (CPU) and a graphics processor (GPU). For example, one suitable computer for the imager computer 105 is schematically shown in FIG. 11. The imager computer 105 may have one or more of the following specifications:

a. Motherboard 130—dual processor server class. The dual processor configuration is understood to be adequate for the software intended to run on the imager subsystem 103:
b. CPUs—Intel® Xeon® class or better;
c. At least 64 Gb of DRAM;
d. Dedicated GPUs 132, such as two Nvidia® RTX-5000 or better. Ensures sufficient processing speed for image capture and generating a slide data set (SDS 304, see FIG. 34) for each slide imaged by the imager subsystem 103;
e. Local hard drive 133 for storing software program(s) 135, including an image processing software application 137 (described in more detail below);
f. Local mass data storage 134, such as a hard drive, solid state drive, or the like;
g. Network and USB input/outputs (I/O) 136;
h. Power supply 138;
i. Uninterruptible power supply (UPS) 140.

The input/outputs 136 include one or more of the following:

a. Imager VGA video, touchscreen USB, and computer audio are provided to the imager 104. The imager 104 receives VGA video from the imager computer 105, and drives the imager display monitor 168. A dedicated imager computer USB port provides the I/O with the touchscreen of the imager display monitor 168. The imager computer 105 provides audio to the imager 104, where it is amplified. The imager speaker is connected to the audio amplifier.
b. USB ports are provided for manufacturing and service support for keyboard and mouse. In normal operation, keyboard and mouse are not connected, and are not required for Imager normal system operation. An additional USB port is provided on the imager front to allow for easy user access.

c. Imager computer power is obtained through the imager IEC entry connector, from the main power source, or the external Smart UPS 140 (if attached).

d. A dedicated USB port is provided to communicate with the Smart UPS. In the event of a main power failure, the UPS will communicate the event to the imager computer 105, and the imager computer 105 will initiate a controlled power down so that computer software, data, and configuration integrity are maintained.

As described above, the imager computer 105 is in data communication with the workflow subsystem 106 via a communication network, such as a 1 Gb Ethernet wired network connection.

Figure 9:
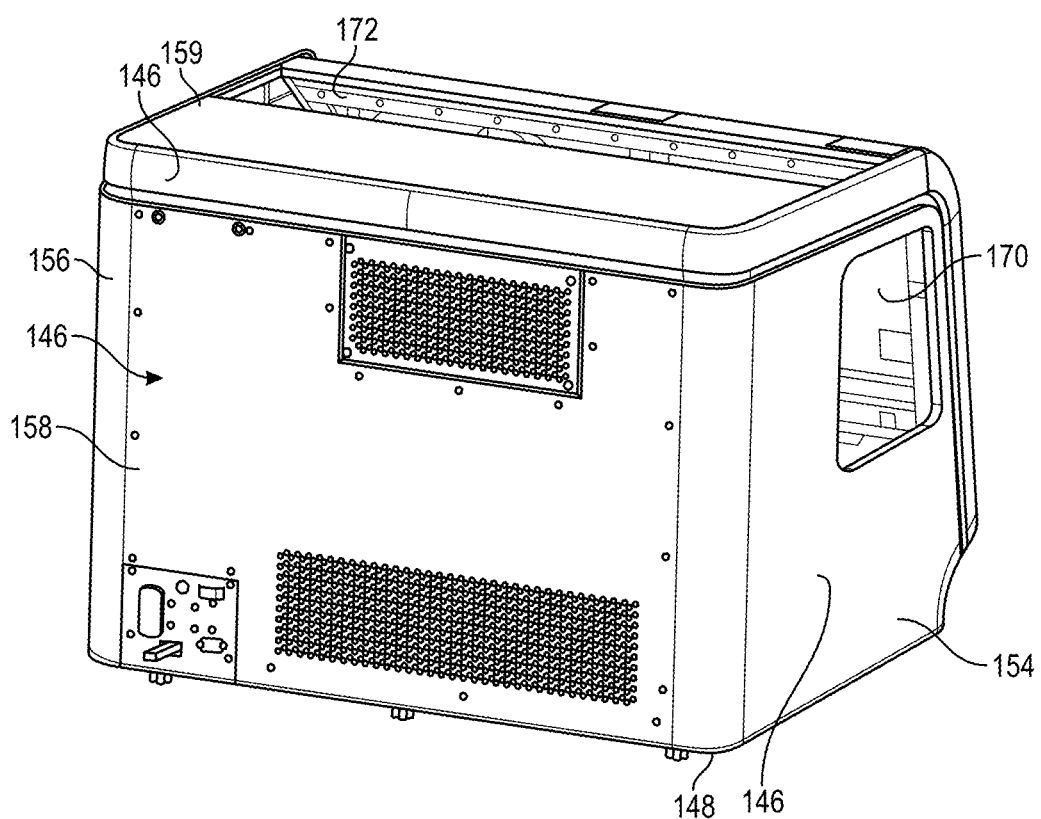
FIG. 9 is a rear, perspective view of the digital imager of FIG. 4, according to one embodiment.
Figure 10:
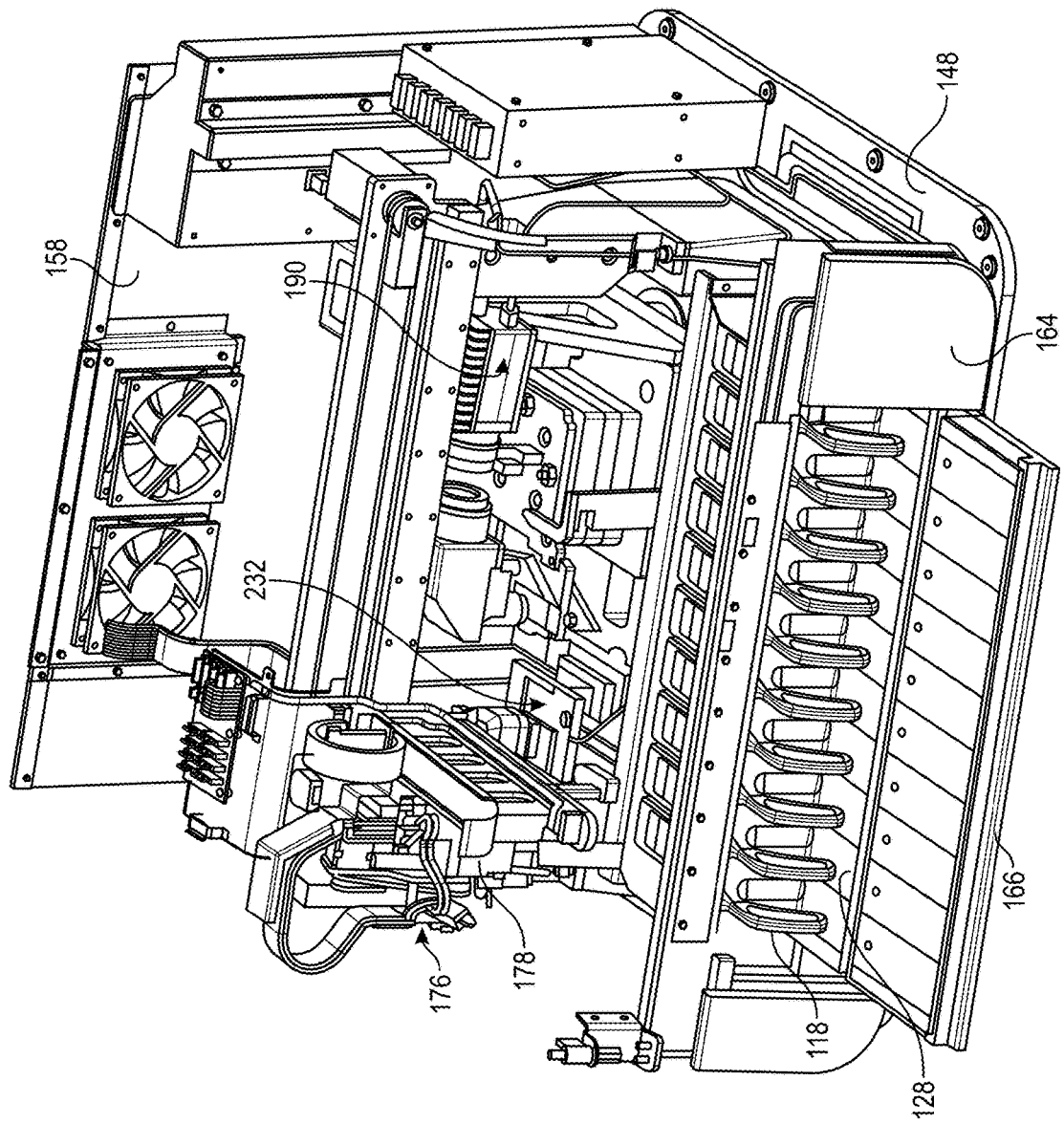
FIG. 10 is a front, perspective view of the digital imager of FIG. 4, with the enclosure panels removed to show the internal components, according to one embodiment.

Turning to FIGS. 4, 9 and 10, the imager 104 is a benchtop digital imaging device and serves as the input device for the overall digital imaging system 100. The imager 104 captures digital images of batches of slides 102 loaded into the imager 104 in slide carriers 118 in an automated fashion with no, or very little, user intervention. The imager 104 comprises a chassis assembly 142, a base assembly 148 and an enclosure assembly which provide the framework on which the imager components are mounted and which house the imager components. The chassis/enclosure assembly 142 may be configured to be a benchtop instrument with dimensions equal to or less than 36 inches wide by 28 inches deep by 25 inches tall. The imager 104 may have a weight equal to or less than 200 pounds, without the slides 102 or slide carriers 118 loaded. These are only preferred dimensions and weight, and are not necessarily limiting on the imager 104, except as specified in the claims. Accordingly, the imager 104 may have other maximum dimensions and weight consistent with the intended use.

Figure 19:
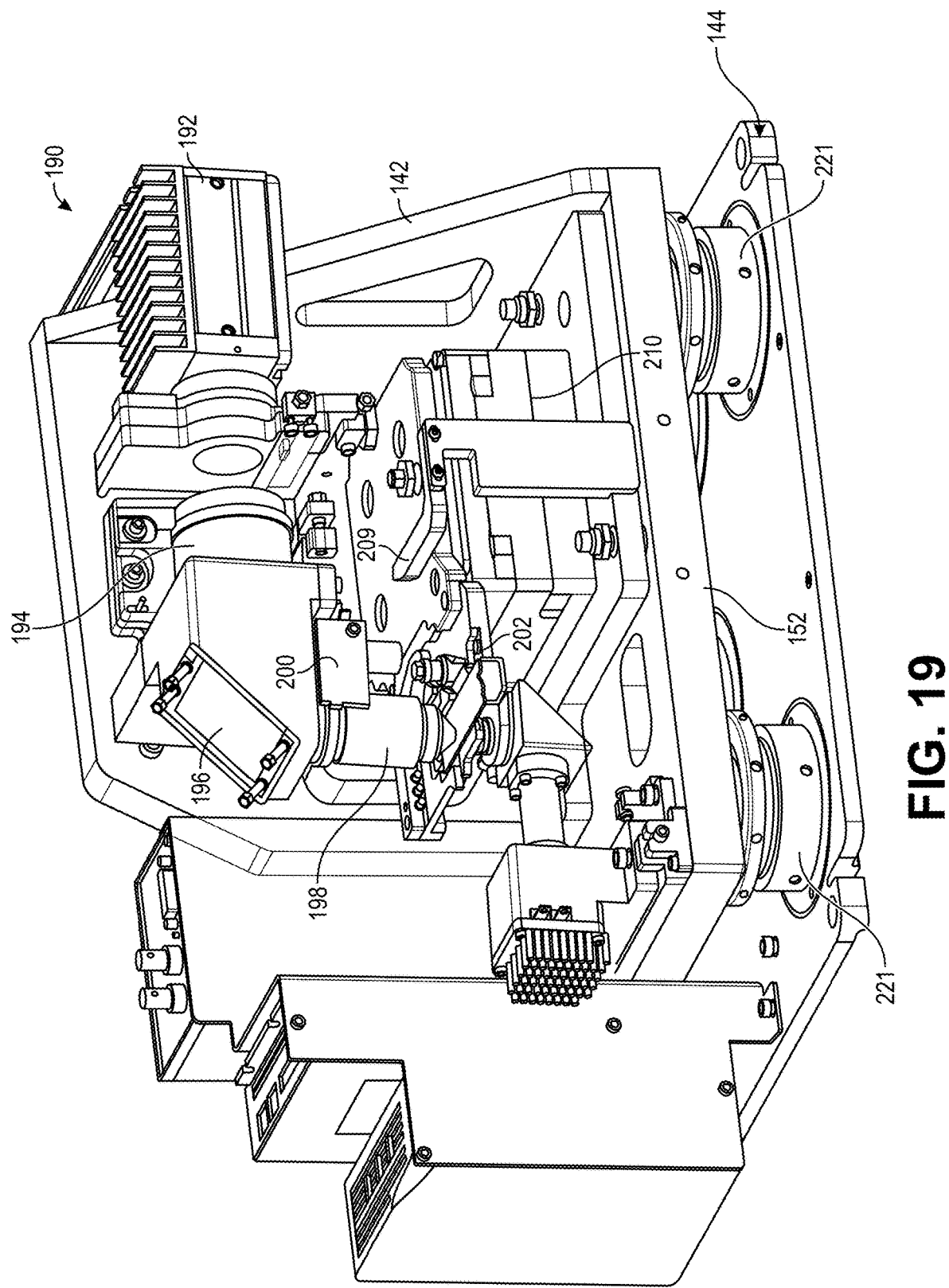
FIG. 19 is a front, perspective view of the digital imager of FIG. 4, with the panels, slide handler, and slide carrier deck removed to show the imaging station, according to one embodiment.

The imager 104 includes a chassis assembly 142 mounted to the base assembly 148 and an enclosure assembly 146. The imaging station 190 includes a base 144 and a vibration isolated imager base plate 152 (see FIG. 19) on which the imager components are mounted. The imaging station 190 is mounted to the base assembly 148. The enclosure assembly 146 includes an enclosure left panel 154, an enclosure right panel 156, an enclosure rear panel 158, an enclosure top panel 159, an enclosure left front window 160, an enclosure right front window 162, an enclosure right panel 164, and a slide carrier deck door 166. Each of the enclosure components is mounted to the chassis assembly 142 and/or to another enclosure component. The enclosure left front window 160 is transparent or semi-transparent so that the internal imager components are visible through the enclosure left front window 160. The enclosure left front window 160 is pivotally mounted such that it can be opened and closed to provide access to the internal imager components. The enclosure right front window 162 is transparent or semi-transparent so that other internal imager components are visible through the enclosure right front window 162. The enclosure left panel 154 may have a left window 170 so that the internal imager components are visible through the left window 170. The enclosure top panel 159 may also have a top window 172 so that the internal imager components are visible through the top window 172. The enclosure display panel 168 is pivotally mounted so that it can be opened and closed to provide access to the internal imager components. The slide carrier deck door 166 is pivotally mounted so that it can be opened and closed to provide access to the slide carrier deck 128 in order (see FIGS. 4 and 10) to load and remove slide carriers 118 from the slide carrier deck 128.

Figure 12:
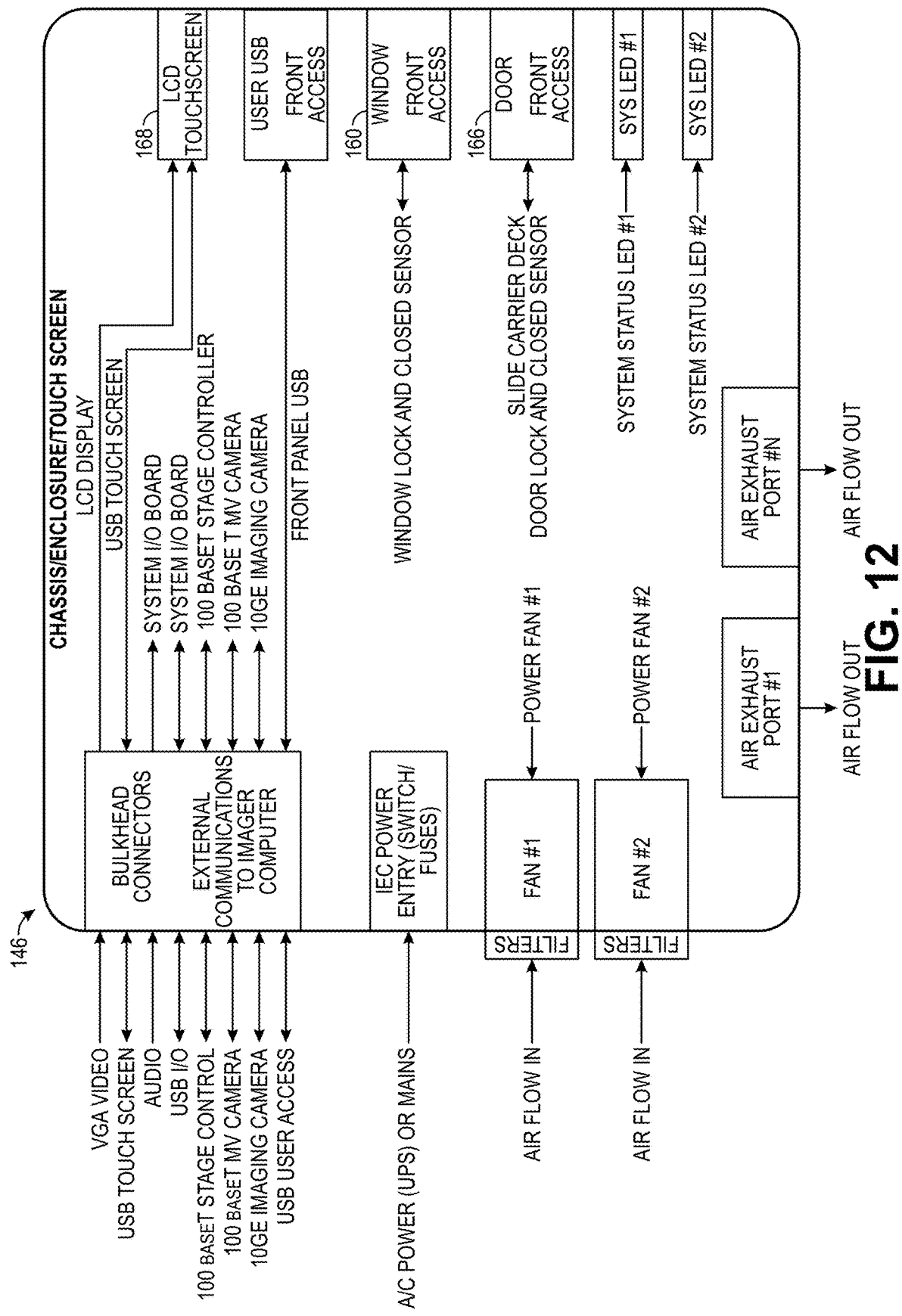
FIG. 12 is a schematic diagram of the chassis/enclosure assembly of the digital imager of FIG. 4, according to one embodiment.

The enclosure assembly 146 also provides inputs and outputs for imager 104, user access, and environmental controls. FIG. 12 is a block diagram of the enclosure assembly 146. The enclosure assembly 146 provides air management to ensure sufficient airflow exists inside the imager 104, to maintain the internal operating temperature below a maximum (e.g., less than 40° C.), and to maintain an internal positive pressure (when the slide carrier deck door 166 is closed). The enclosure assembly 146 provides external signal and power connections.

The imager display monitor 168 may be an LCD touchscreen display or other suitable display. The imager display monitor 168 shows the operations and status of the imager 104 and also provides operator controls through the touchscreen (or other input device(s)). As shown in FIG. 12, the imager display monitor 168 is connected to the imager computer 105 via bulkhead connectors of the enclosure assembly 146. The imager computer 105 provides VGA video, touchscreen USB, and computer audio to the imager 104. The imager 104 receives VGA video from the imager computer 105, and drives the imager display monitor 168. A dedicated imager computer USB port provides the I/O with the touchscreen of the imager display monitor 168. The imager computer 105 also provides audio to the imager 104, where it is amplified. The imager speaker is connected to the audio amplifier.

Still referring to FIG. 12, the enclosure assembly 146 also has a window sensor for detecting the open/closed status of the enclosure left front window 160 and a window lock to lock the enclosure left front window 160 in the closed position during imaging operations of the imager 104. The enclosure assembly 146 also has a door sensor for detecting the open/closed status of the slide carrier deck door 166 and a door lock to lock the slide carrier deck door 166 in the closed position during imaging operations of the imager 104.

Turning now to the internal components of the imager 104, the slide carrier deck 128 is disposed proximate the bottom of the imager on the base 148. The slide carrier deck 128 has a plurality of slide carrier bays, such as ten (10) slide carrier bays, or twenty (20) slide carrier bays, or other suitable number of slide carrier bays, where each slide carrier bay is configured to receive a respective slide carrier 118. The slide carrier deck 128 is open on top to provide access to the slides 102 contained in the slide carriers 118 loaded in the slide carrier deck 128 by the slide handler 176. The slide handler 176 removes slides 102 from the slide carriers 118, moves the slides 102 to various stations of the imager 104, and inserts the slides 102 back into the slide carriers 118.

Figure 13:
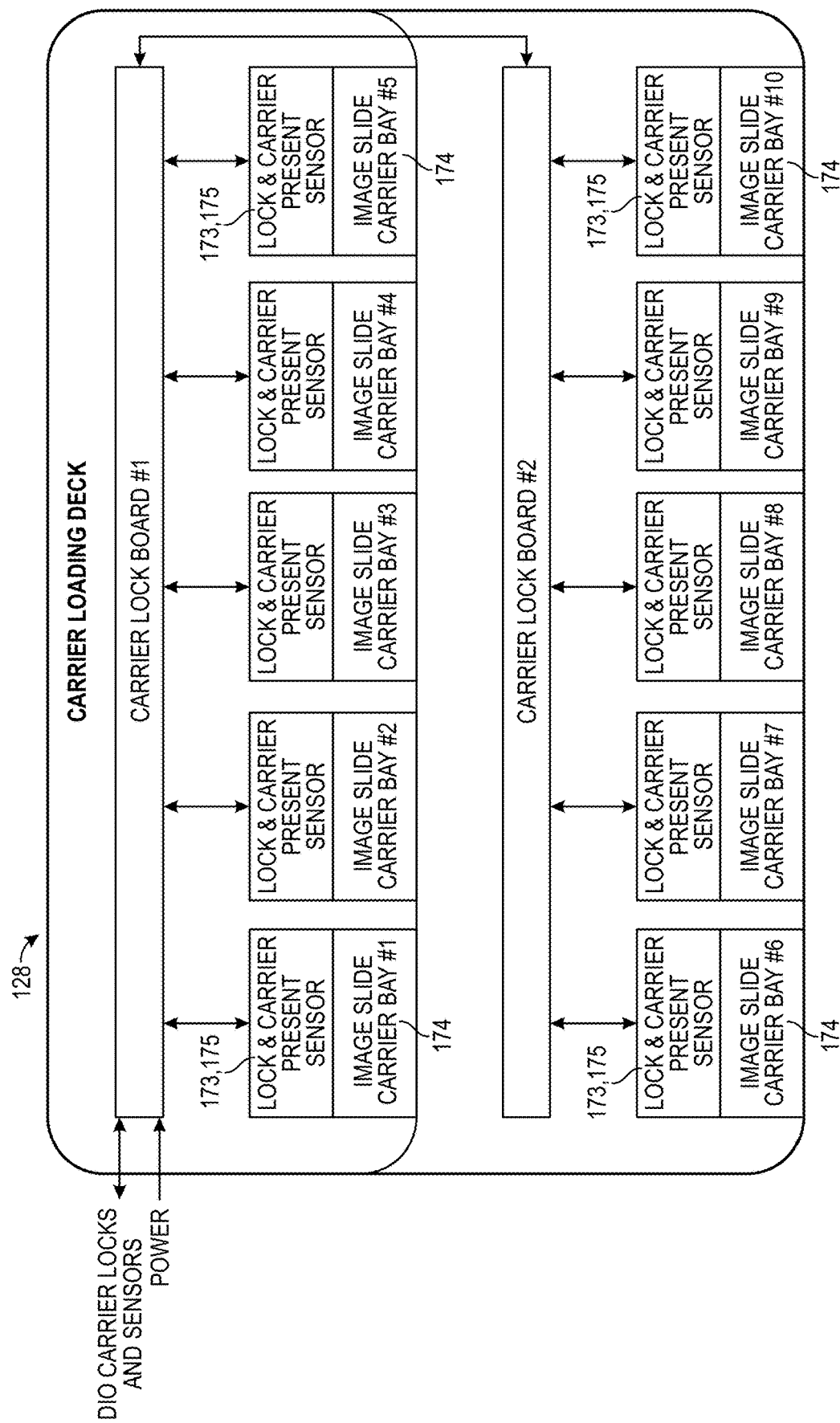
FIG. 13 is a schematic diagram of the slide carrier loading deck of the digital imager of FIG. 4, according to one embodiment.

Referring to FIG. 13, the slide carrier deck 128 has a carrier lock 173 and carrier presence sensor 175 for each slide carrier bay 174. The carrier locks 173 may be solenoid actuated locks or other suitable powered locking mechanism, and the carrier present sensors may be optical sensors or other suitable sensors for detecting the presence of a slide carrier 118 in the respective slide carrier bay 174. The carrier locks 173 and carrier present sensors 175 are in data communication with the imager computer 105 via a system interface board 182 (see FIG. 29, SIB, described below).

Figure 14:
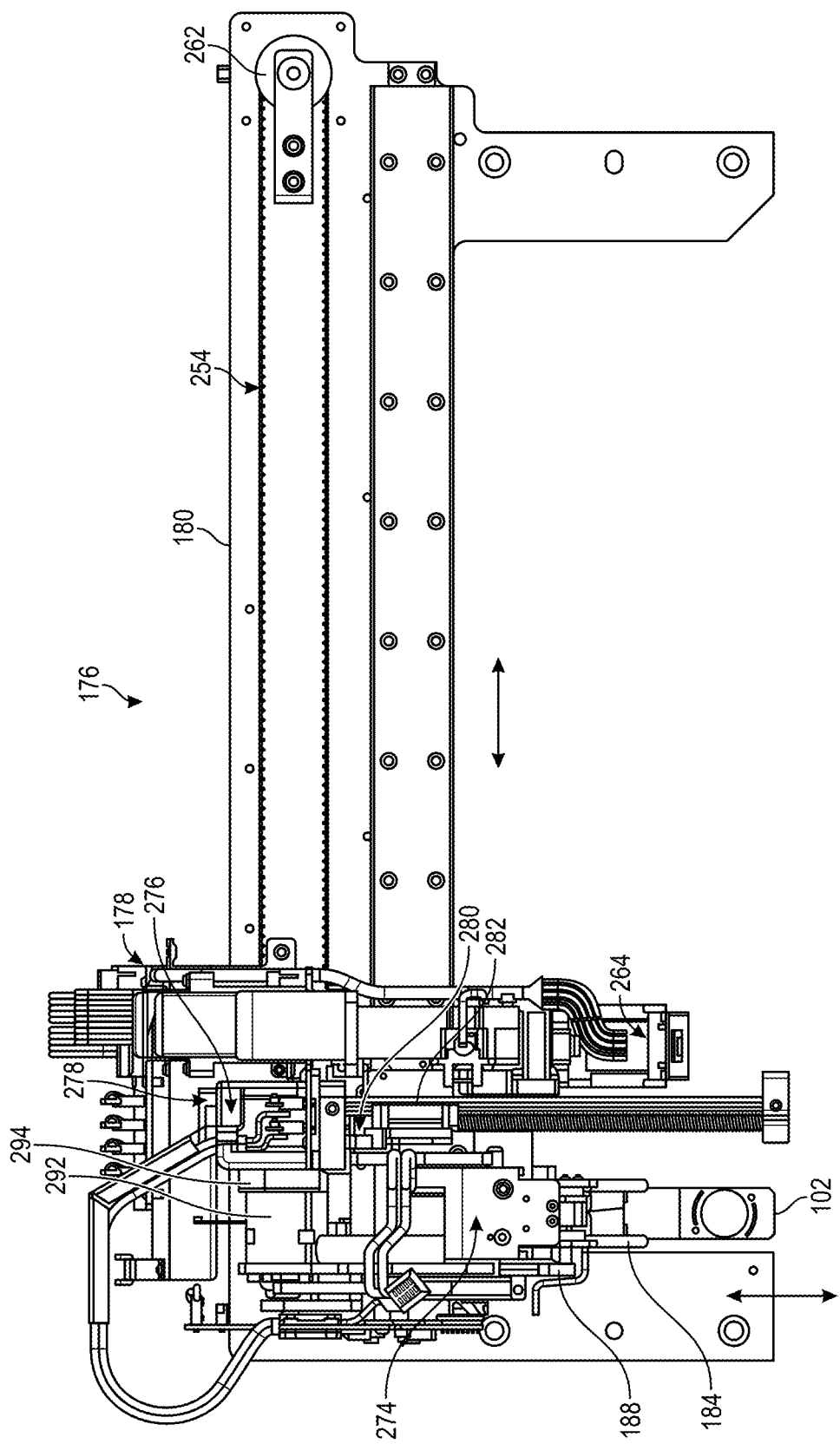
FIG. 14 is an enlarged, front view of the slide handler of the digital imager of FIG. 4, according to one embodiment.
Figure 15:
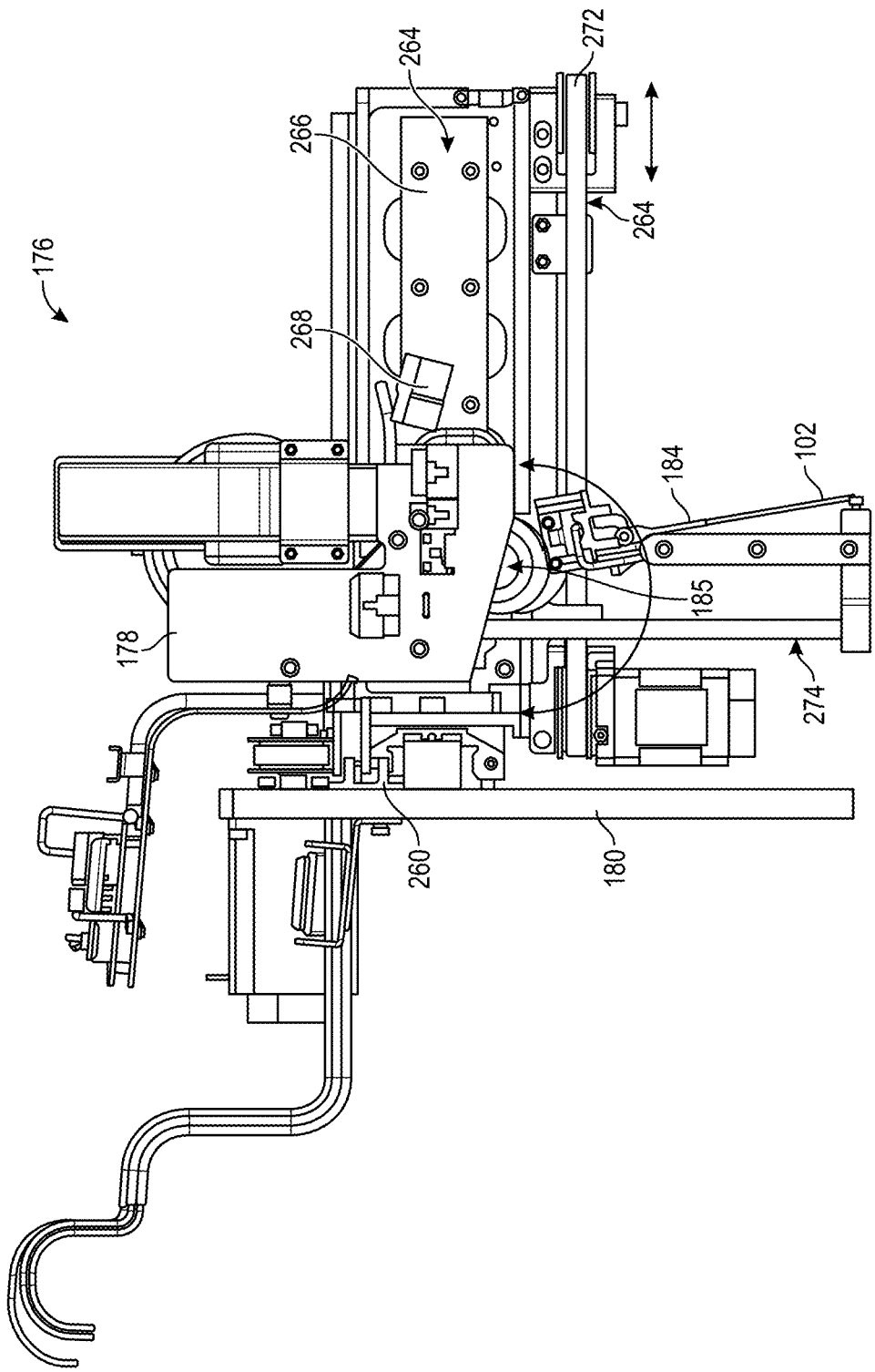
FIG. 15 is a side view of the slide handler of FIG. 14, according to one embodiment.
Figure 16:
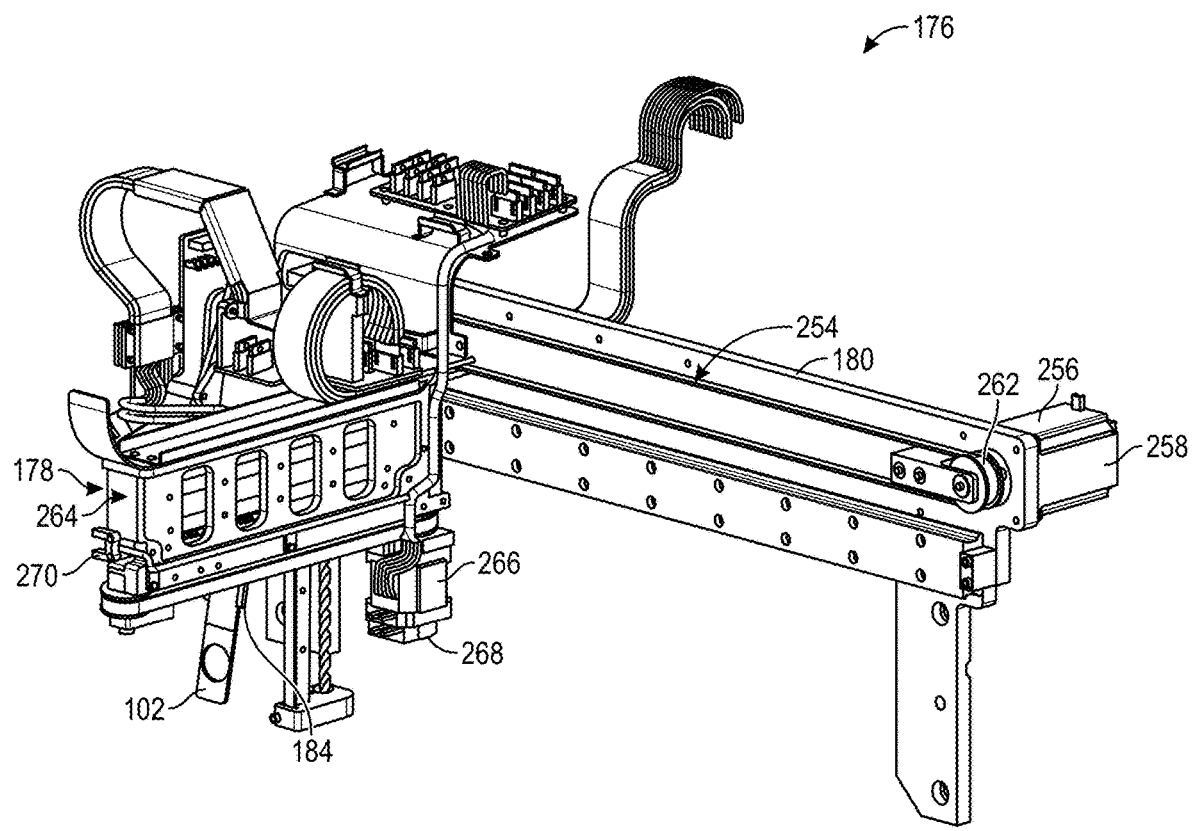
FIG. 16 is a front, perspective view of the slide handler of FIG. 14, according to one embodiment.

Referring to FIGS. 10, and 14-16, the slide handler 176 automatically moves the slides 102 between the various stations of the imager 104, including to and from the slide carriers 118, the imaging station 190 and the macrovision station 232. The slide handler 176 includes a support platform 180 and a slide handling gantry 178 movably coupled to the support platform 180. The slide handling gantry 178 is a pick-and-place robot which can move a slide gripper 184 in three degrees of motion, namely, lateral motion (X-axis) and vertical motion (Z-axis) (as shown in FIG. 14), and front/back motion (Y-axis) (as shown in FIG. 15). The slide handling gantry 178 can also rotate the slide gripper 184 about a Theta axis (see FIG. 15), and close and open the slide gripper 184 to grip and release slides 102. The slide handling gantry 178 has a motion mechanism for providing the movement and/or actuations of the slide handling gantry, including an X-axis mechanism 254, a Y-axis mechanism 264, a Z-axis mechanism 274, a theta-axis mechanism 290 and a gripper mechanism 185. The X-axis mechanism 254 includes a motor 256, encoder 258, home sensor 260, and drive mechanics 262. The Y-axis mechanism 264 includes a motor 266, encoder 268, a home sensor 270, and drive mechanics 272. The Z-axis mechanism 274 includes a motor 276, encoder 278, a home sensor 280, and drive mechanics 282. The theta axis mechanism 290 includes a theta motor 292, theta encoder 294, theta home sensor (not shown), and theta drive mechanics (not shown). Each of the motion mechanisms includes a motor, encoder, a home sensor, and drive mechanics, and is capable of satisfying the motion envelop travel, transit acceleration and velocity and payload requirements. The gripper 184 also has an optical sensor 188 (slide inventory sensor 188) used to detect the presence or absence (inventory) of slides 102 in the slide carriers 118, and the presence or absence of slide racks 120 in the slide carriers 118. The gripper 184 may be an off-the-shelf part designed to grip slides 102 from the slide edges, such as made by the SMC™ Electric Gripper™, Los Angeles, California.

Figure 17:
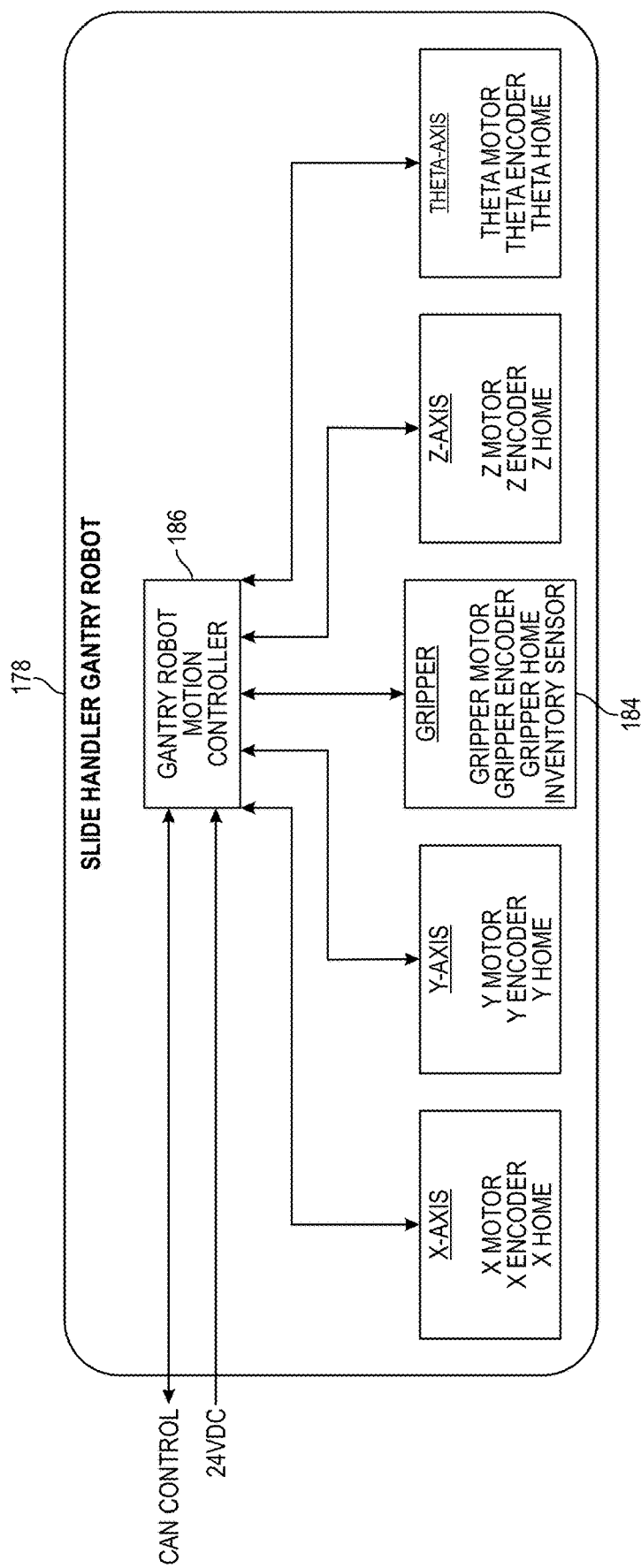
FIG. 17 is a schematic diagram of the slide handling gantry of the slide handler of FIG. 14, according to one embodiment.
Figure 18:
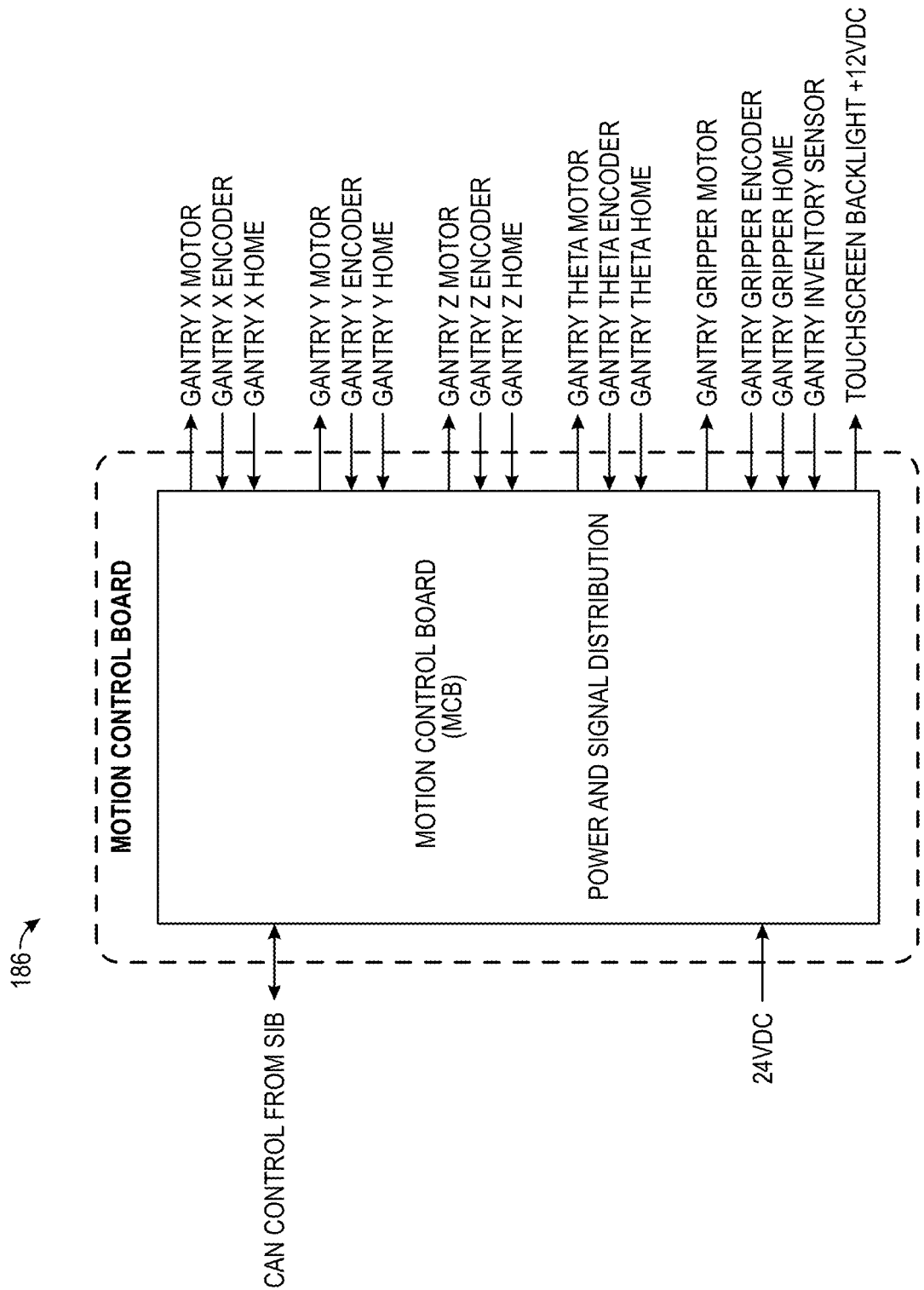
FIG. 18 is a schematic diagram of the gantry robot motion controller for the slide handler of FIG. 14, according to one embodiment.

As depicted in FIG. 17, the slide handling gantry 178 is operably connected to a gantry robot motion controller 186, which controls the motion of each of the motion mechanisms. The gantry robot motion controller 186 is in data communication with the imager computer 105 via a controller area network (CAN), which sends data and commands to the gantry robot motion controller 186 to control the operation of the slide handling gantry 178. FIG. 18 shows a schematic diagram of the gantry robot motion controller 186.

Referring now to FIGS. 10 and 19-26, the imager 104 has an imaging station 190 to capture digital micro images of the slides 102 (i.e., a specimen 119 on each of the slides 102) using a digital camera 192, tube lens assembly 194, mirror 196, and objective lens 198. The camera 192 uses the Sony CMOS Pregius Gen II sensor and has a 4096×2160 pixel resolution. The optical path produces an optical resolution of 0.255 µm/pixel. The field of view of the camera ("FOV") is much smaller than the entire specimen area 114 of a slide 102, and therefore the imager 104 must take many micro images to capture the entire specimen area 114. For instance, the field of view of the camera 192 may be 1044 µm×550 µm, or about 1 mm×0.5 mm, whereas the specimen area 114 of the slide 102 may have a diameter of 21-22 mm. Based on these specifications, the camera 192 needs about 885 non-overlapping images to image the entire specimen area 114. However, in order to obtain in focus images of all objects within the three-dimensional volume of the specimen 119, a step size equal to an image sub-region equal to the depth of field of the imaging station 190 is used, which results in overlapping images, so many more frames are captured. For instance, as explained below, a micro image may be taken every 38.25 µm=~1/14 of the frame height, so the actual number of images captured during a scan of an entire specimen area is about 11,000, or more than 10,000 or more than 5,000, or between 5000 and 15000. The camera 192 acquires micro images while the XY slide stage 210 is moving the specimen 119 at a constant velocity. In this example, the camera 192 takes an image approximately every 38 µm of stage travel in the scan direction, therefore every camera field of view contains 14 images per FOV. The XY slide stage 210 provides relative motion between the field of view of the camera 192 and the slide 102 so that the camera 192 can scan the entire specimen area 114 of a slide 102 and take a plurality of discrete digital images which combined cover the entire specimen area 114.

As described herein, the discrete micro images may be combined using an image processing software application 137 (see FIG. 11) to create a composite image of the entire specimen area 114.

As shown in FIGS. 19-22, the imaging station 190 includes a high-resolution, digital camera 192 which is part of the image acquisition assembly 191 (which is a microscope camera). The image acquisition assembly 191 may be angled in a range from 0° to 3°, or from 0° to 10°, or from 0° to 5°. The camera 192 is in network data communication with the imager computer 105 via a high-speed network, such as 10GE Ethernet optical network, or other suitable high-speed network capable of transmitting high-resolution micro images from the camera 192 to the imager computer 105 at sufficient throughput during the image scanning process.

A tube lens 194 is disposed in the optical path of the camera 192. The tube lens 194, combined with the objective lens 198, set the optical magnification of the camera 192. A first folding mirror 196 is disposed in the optical path of the camera 192 after the tube lens 194, and is angled at about 45° to the camera optical imaging axis. The angle and position of the first folding mirror 196 can change the co-linearity of the objective optical axis and the center of the camera 192. The first folding mirror 196 is in the imaging path, and must be of sufficient quality (e.g., reflectivity greater than 90% and precision flatness greater than λ/4), or it can impact image quality directly by blurring the light at the detectors in all or part of the field of view, and/or causing distortion.

The objective lens 198 is next in the optical path after the first folding mirror 196. The optical axis of the objective lens 198 is angled about 90° from the camera optical axis due to the first folding mirror 196. The objective lens 198 is mounted to an imaging Z-stage 200. The Z-stage 200 has threads to mount the objective lens 198. The Z-stage 200 can controllably move the objective lens 198 to adjust the focus of the camera 192 on the slide 102 (i.e., adjust the focal plane relative to the slide 102). The Z-stage position may be set through a Z-stage controller. The slide 102 (i.e., a specimen 119 on the slide 102) is placed at the front focal plane of the objective lens 198, which projects an image of the slide 102 to the camera 192 via the first folding mirror 196 and tube lens 194.

Figure 21:
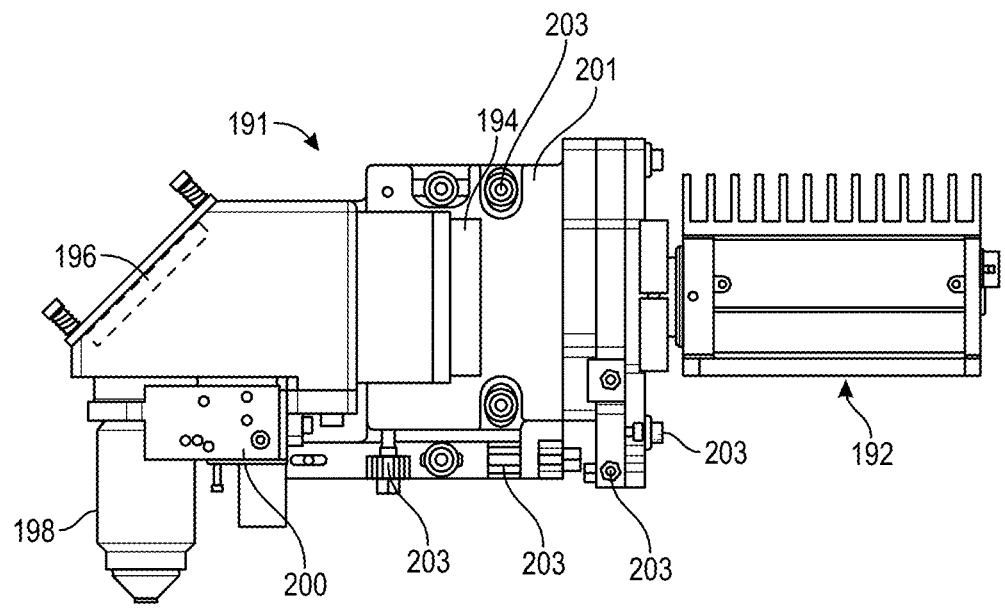
FIG. 21 is a front view of the image acquisition subassembly of the imaging station for the digital imager of FIG. 4, according to one embodiment.
Figure 22:
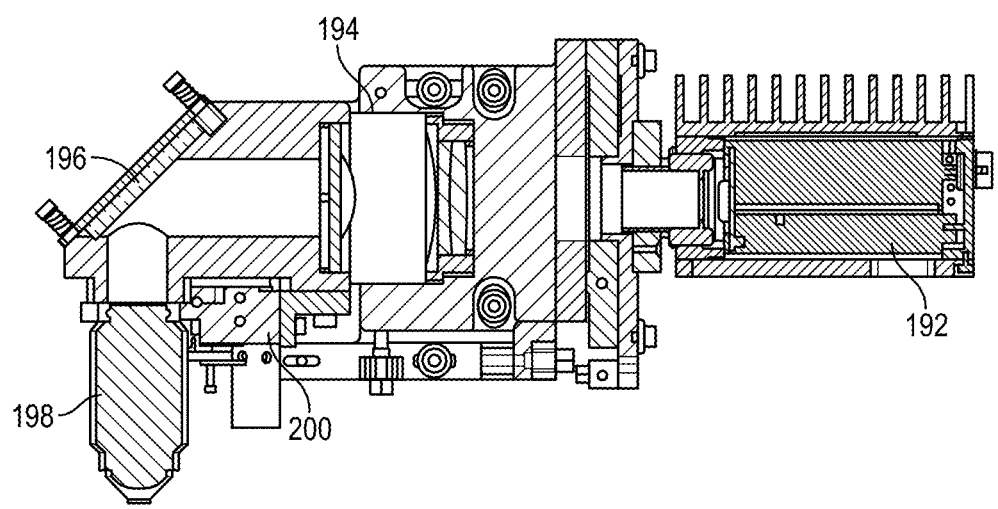
FIG. 22 is a front, cross-sectional view of the image acquisition subassembly of FIG. 21, according to one embodiment.

As shown in FIGS. 21 and 22, the components of the image acquisition subassembly 191 comprising the digital camera 192, tube lens 194, first folding mirror 196, objective lens 198 and Z-stage 200, are all mounted to an image acquisition baseplate 201. The image acquisition baseplate 201 has a plurality of imaging subassembly alignment adjustments 203, which allow positional and/or angular adjustment of the image acquisition subassembly 191 relative to the other components of the imaging station 190, as well as relative positional and/or angular adjustment of the components of the image acquisition subassembly 191.

With reference to FIGS. 19-20, and 23-24, the slide 102 is in the optical path of the camera 192 after the objective lens 198. The slide 102 is held on a slide holder 202. The slide holder 202 has a slide recess 204 for holding the slide 102 in a horizontal position on the slide holder 202. The slide holder 202 has a first slide justifier arm 206, which is spring loaded to bias the slide 102 in the Y-direction within the slide recess 204. The slide holder 202 has a second slide justifier arm 208, which is spring loaded to bias the slide 102 in the X-direction within the slide recess 204. The first and second slide justifier arms 206, 208 firmly hold the slide 102 in the proper position on the slide holder 202 so that the slide 102 does not move during the scanning operation. The image station 190 has a slide release bracket 209 which is mounted to the X-Y stage platform 214, which is stationary relative to the slide holder 202. The slide holder 202 is moved relative to the slide release bracket 209 to actuate the first and second slide justifier arms 206, 208 to release or engage the first and second slide justifier arms 206, 208 to hold or release a slide 102 in the slide holder 202.

Figure 20:
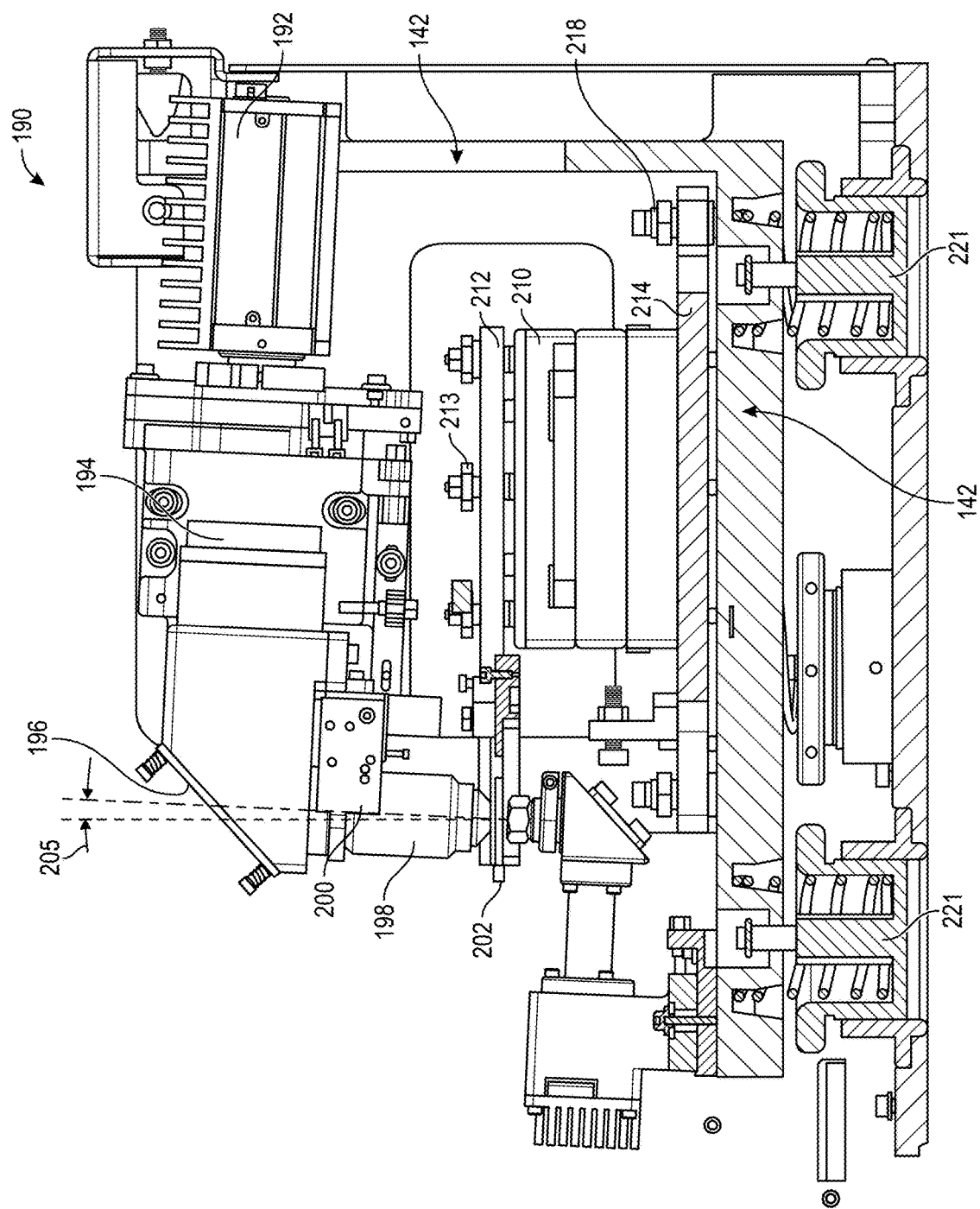
FIG. 20 is a partial front view (and front, cross-sectional view of the vibration absorbers) of the digital imager of FIG. 4, with the panels, slide handler, and slide carrier deck removed to show the imaging station, according to one embodiment.
Figure 33:
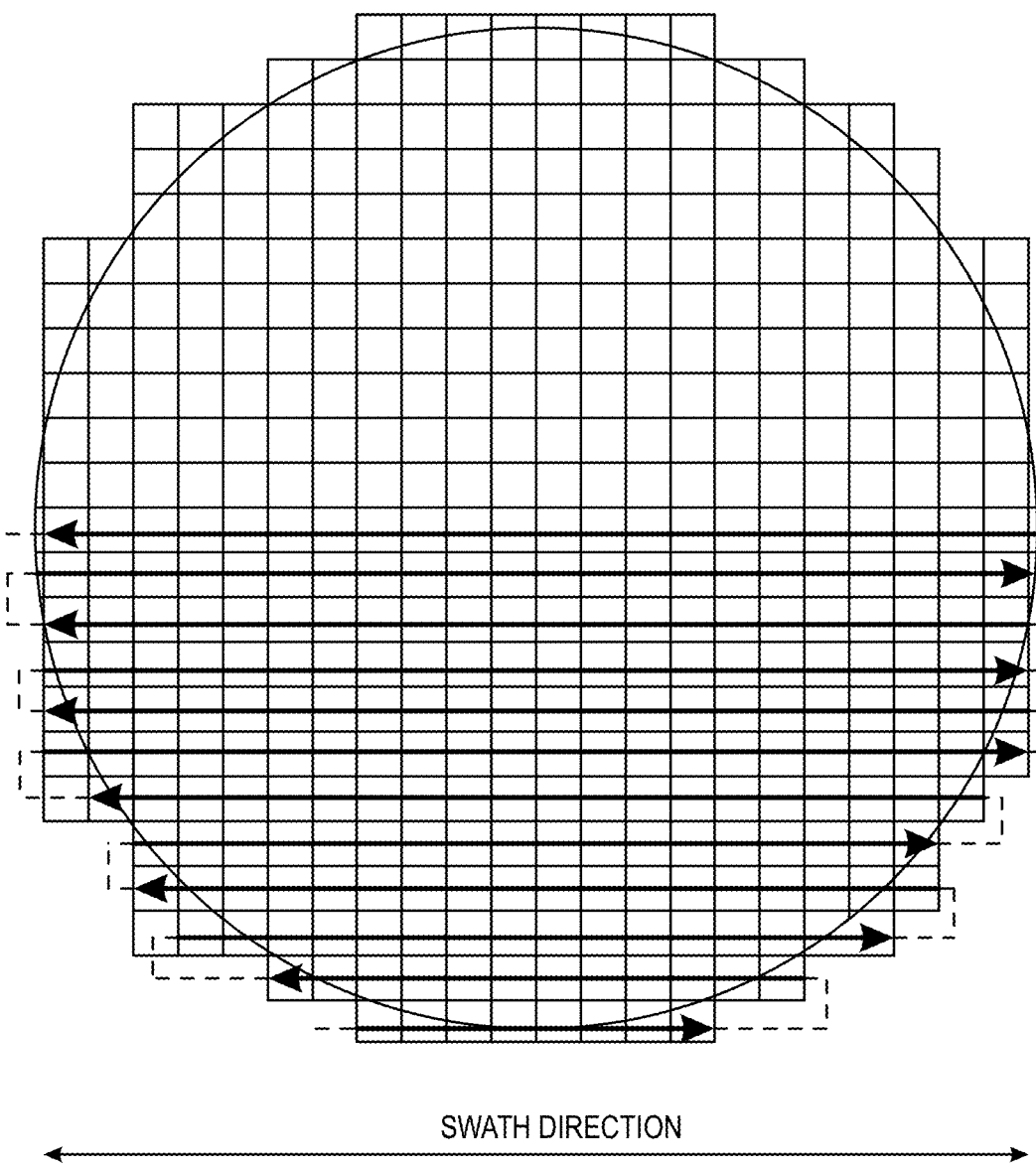
FIG. 33 is a schematic diagram illustrating a serpentine scan pattern used by the digital imager of FIG. 4 to scan a specimen slide, according to one embodiment.

As best shown in FIG. 20, the optical axis of the objective lens 198 is tilted at a tilt angle 205 to the orthogonal of the plane of the slide 102 (and the slide recess 204) in the scanning direction (see FIG. 33). In other words, the resulting optical axis of the camera 192 and optics at the surface of the slide (also referred to simply as "the optical axis of the camera 192") is non-orthogonal to the plane of the slide 102. As described in more detail herein, the tilt angle 205 allows the imager 104 to obtain volumetric images of the specimen 119 on the slide 102 (i.e., images that extend into the depth of a specimen 119). In other words, the micro images include an in-focus image of features at different depths of the specimen 119 on the slide 102, instead of only a single plane of focus in the case of an image taken at an orthogonal angle of the specimen 119. The imaging station 190 may be configured to acquire micro images in which each of the micro images includes at least a portion of a depth of the slide 102 underlying the surface of the slide 102. If a coverslip 115 is used on slide 102, the imaging station 190 may be configured to acquire micro images in which each of the micro images includes at least a portion of a depth of the coverslip 115.

As described herein, these micro images may then be processed by the image processing software application 137 (see FIG. 11) to stitch the micro images together and flatten the images into a two-dimensional composite image in which all of the image of the specimen 119 is in focus at all depths of the specimen 119. For example, U.S. Patent Application Publication No. 2009/0295963, describes a method of stitching images together to form a single digital image 302 (e.g., see FIG. 34 which shows a block diagram of a digital image 302). As depicted in FIG. 25, the appropriate tilt angle 205 to image the full depth (Z-dimension) of a specimen 119 on a slide 102 is a function of the thickness of the specimen (d), and the projected field of view ($d_1$) of the camera 192 at the slide 102. The projected field of view ($d_1$) is the in-plane field of view of the camera sensor divided by the combined optical magnification of the camera 192 (e.g., including the magnification of the tube lens 194, the objective lens 198, and any other magnification in the optical path). As shown in FIG. 25C, the tilt angle 205 is the arcsin ($d/d_1$). As an example, for a specimen depth (d) of 10 micrometers, a camera sensor having an in-plane field of view of 8 millimeters, and a combined optical magnification of 40× (i.e., $d_1$=8 millimeters/40=0.20 mm), the tilt angle 205 is arcsin [0.01 mm/(8 mm/40)] which is about 2.86 degrees. In another example as depicted in FIG. 25C, for a specimen depth (d) of 24 micrometers, an effective in-plane field of view ($d_1$) of 0.5 millimeters (e.g., sensor field of view of 20 millimeters and optical magnification of 40×), the tilt angle 205 is 2.75 degrees. In general, for typical specimen depths, camera sensor dimensions and magnification, the tilt angle 205 is typically between about 2 degrees and about 10 degrees.

The slide holder 202 has a slide holder baseplate 212 which is mounted to an XY slide stage 210. The slide holder baseplate 212 has a slide holder angle adjustment 213 to allow adjustment of the orientation of the slide holder baseplate 212 relative to the XY slide stage 210 (and also relative to the optical axis of the objective lens 198).

Figure 26:
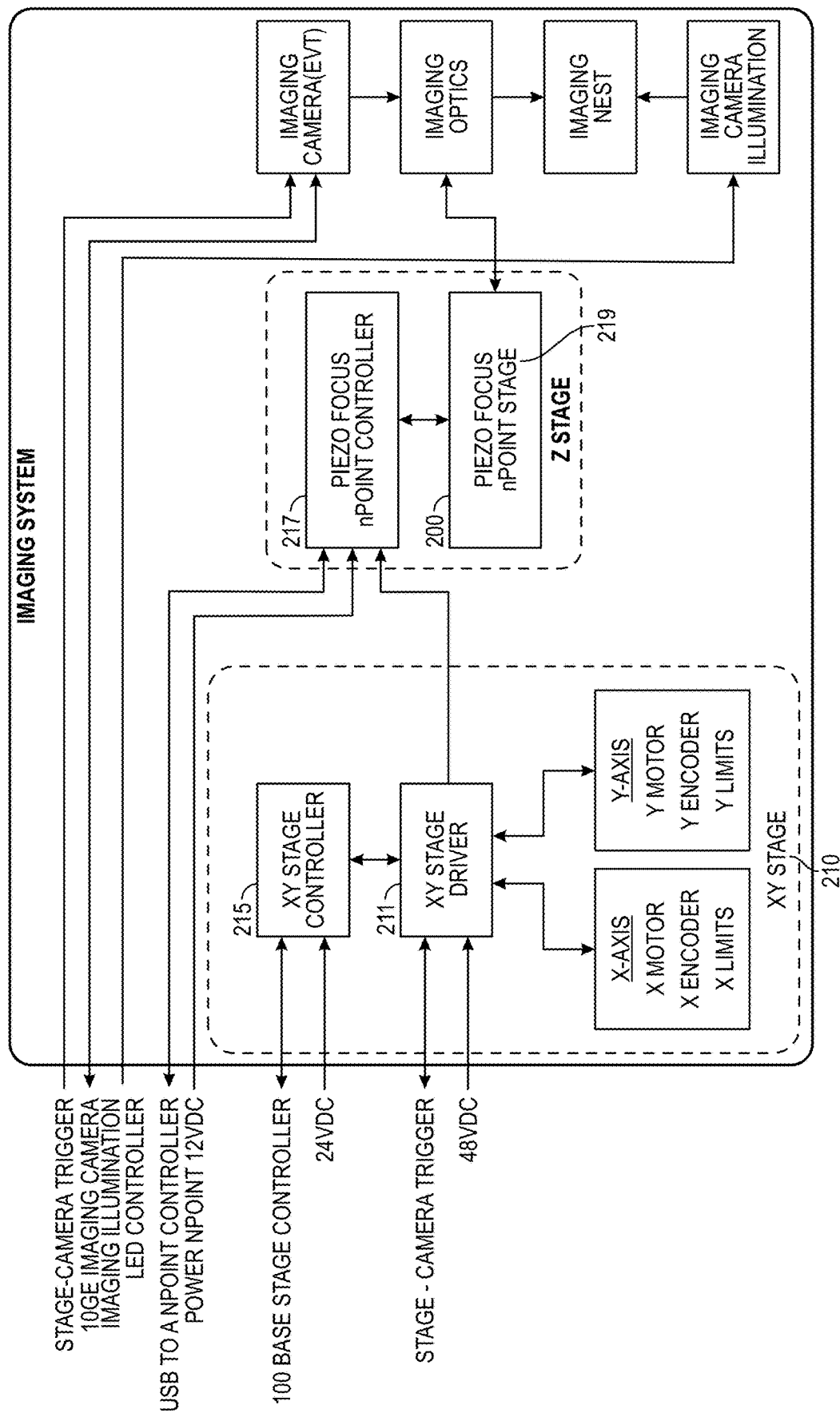
FIG. 26 is a schematic diagram of the imaging station of the digital imager of FIG. 4, according to one embodiment.

The XY slide stage 210 moves the slide holder 202 and slide 102 in a scanning pattern during the imaging procedure to obtain images which cover the entire specimen area 114 (or other area of interest) of the slide 102. As shown in FIG. 26, the XY slide stage 210 includes a motor, encoder and limits for motion in each of the X-axis and Y-axis. The XY slide stage 210 is connected to an X-Y stage driver 211, which is in turn connected to an X-Y stage controller 215 for controlling the movement of the XY slide stage 210. The X-Y stage controller 215 is in data communication with the imager computer 105 via an Ethernet network connection to allow the imager computer 105 to control the operation of the XY slide stage 210.

The XY slide stage 210 is mounted to an X-Y stage platform 214 which is in turn mounted to an imager baseplate 152. The X-Y stage platform 214 has an X-Y stage angle adjustment 218 to allow adjustment of the orientation of the X-Y stage platform 214 relative to the imager baseplate 152.

Accordingly, the slide holder angle adjustment 213 and X-Y stage angle adjustment 218 can be adjusted to properly align the slide holder 202 and the motion of the XY slide stage 210 to be horizontal, or at a desired angle relative to the optical axis of the objective lens 198 (i.e., the optical axis of the camera 192). Typically, the slide holder 202 and motion of the slide stage 210 will be aligned to be parallel in order to provide a constant focal height of the micro images during scanning, such that the image acquisition assembly 191 acquires the micro images of the specimen 119 at a same height (e.g., a single z-axis focal height) relative to the surface of the slide 102.

The imager baseplate 152 is isolated from the scanner chassis 144 via a plurality (in this case, four) vibration isolation mounts 221. The vibration isolation mounts 221 provide vibration isolation for the imaging station 190.

The objective lens 198 is focused relative to a slide 102 held in the slide holder 202 using a Z stage 200, as shown in FIGS. 19-22 and 24. As shown in FIG. 26, the Z stage 200 includes a piezo focus nPoint controller 217 and a piezo focus nPoint stage 219 for controlling the Z stage, and in turn, controlling the focus of the objective lens 198.

Figure 23:
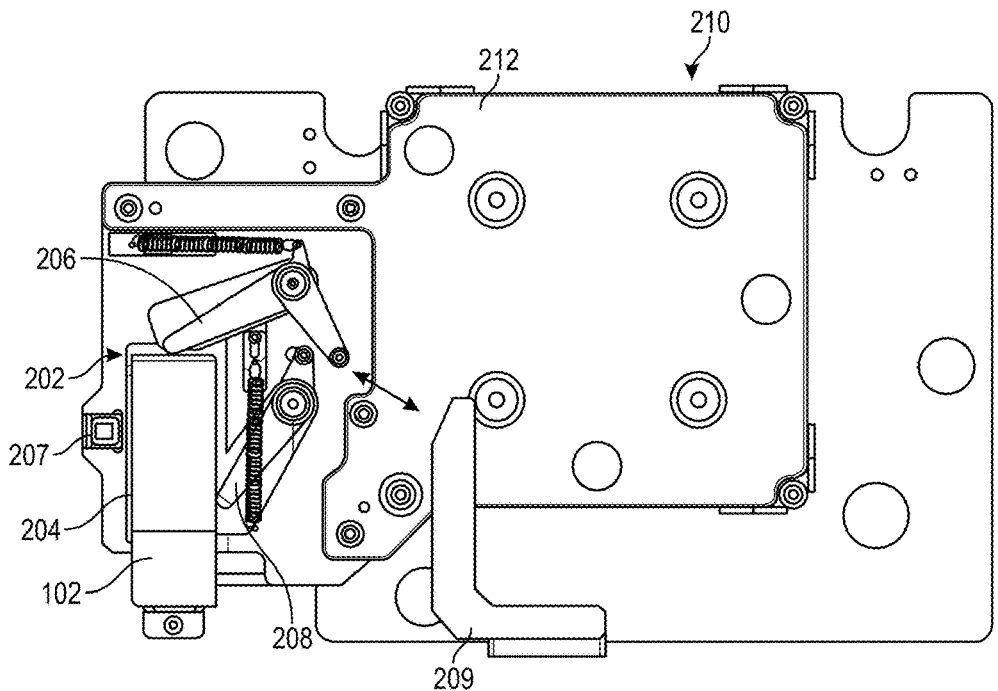
FIG. 23 is an enlarged, top view of the slide imaging station of the digital imager of FIG. 4, according to one embodiment.
Figure 24:
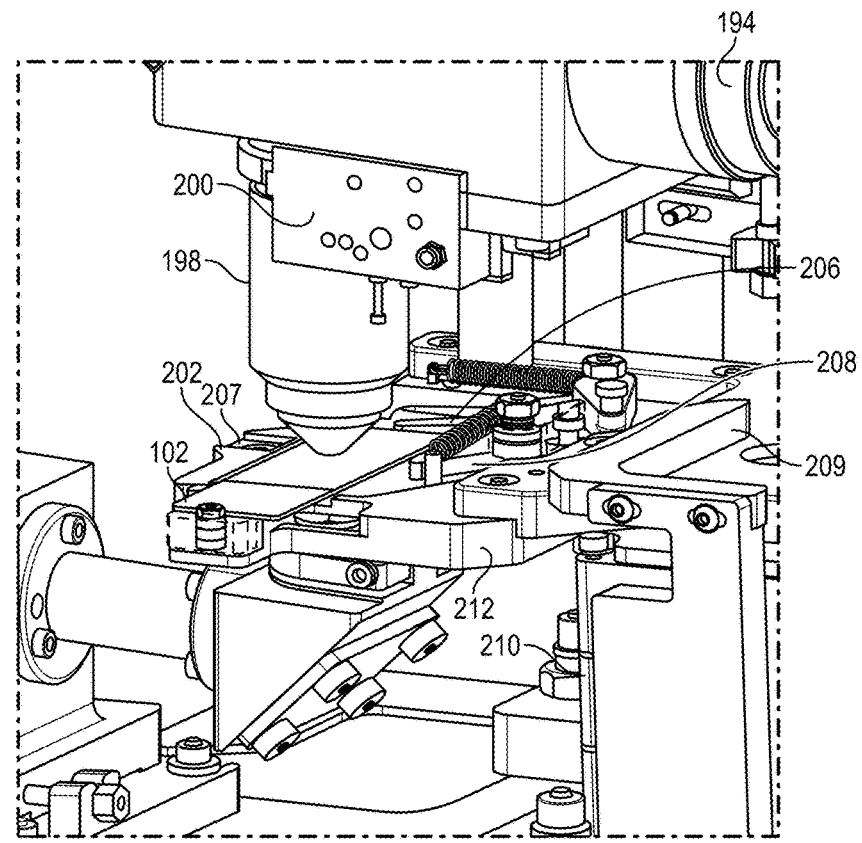
FIG. 24 is an enlarged, perspective view of the slide imaging station of the digital imager of FIG. 4, according to one embodiment.

As shown in FIGS. 23 and 24, a microscope calibration component 207 (also referred to as a "microscope calibration target") is disposed in the slide holder baseplate 212, such that the microscope calibration component 207 moves with the movement of the XY slide stage 210. The microscope calibration component 207 may be integral with the slide holder baseplate 212 such that it is attached directly to or defined by the slide holder baseplate 212 and not removable from the slide holder baseplate 212. For instance, the microscope calibration component 207 may be formed or etched into or through the slide holder baseplate 212. Alternatively, the microscope calibration component 207 may be a separate component from the slide holder baseplate 212 which is mounted on the slide holder baseplate 212, such as being mounted in a cavity defined by the slide holder baseplate 212. The microscope calibration component 207 may be configured to perform both positional and optical calibration of the microscope camera assembly 191 (also referred to as the image acquisition subassembly 191). Alternatively, the microscope calibration component 207 may be configured to perform just optical calibration of the microscope camera subassembly 191. For positional calibration, the calibration component 207 is configured for measuring or determining positional calibration parameters including one or more of "X" position of the XY slide stage 210, a "Y" position of the XY slide stage 210, a "Z" position of the XY slide stage 210, a camera-to-stage alignment, changes in one or both of "X" and "Y" positions of the XY slide stage 210 during micro imaging of a slide 102, and/or review and changes in "Z" position of the XY slide stage 210 during micro imaging of a slide 102. For optical calibration, the calibration component 207 is configured to measure or determine optical calibration parameters of the microscope camera subassembly 191 including, for example, one or more grey scale linearity, magnification, signal-to-noise ratio, changes in illumination, Modulation Transfer Function (MTF), checking for stuck pixels or elements of the digital camera 192 (e.g., a CMOS or a charge coupled device (CCD)), the evenness or uniformity of illumination, detecting artifacts such as dust and smudges that degrade signal-to-noise ratios. The microscope camera subassembly 191 may then be calibrated and adjusted as necessary based on the positional and/or optical calibration parameters measured or determined using the calibration component 207. An example of a suitable microscope calibration component 207 is disclosed in U.S. Pat. No. 7,848,019 B2.

Figure 27:
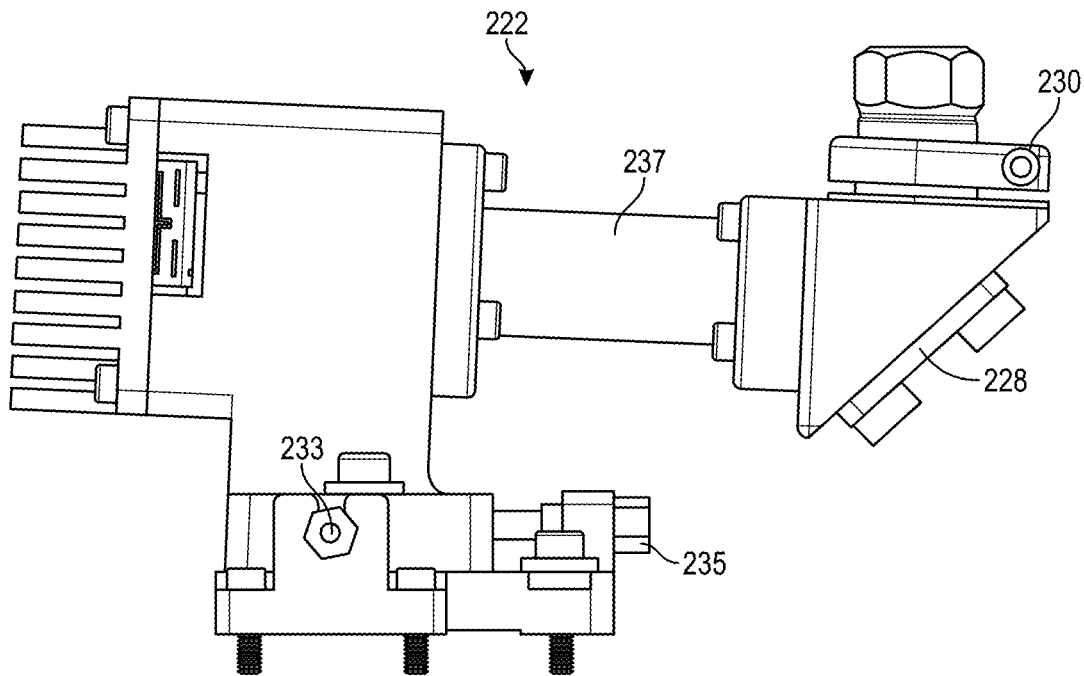
FIG. 27 is a front view of the illumination subsystem of the digital imager of FIG. 4, according to one embodiment.
Figure 28:
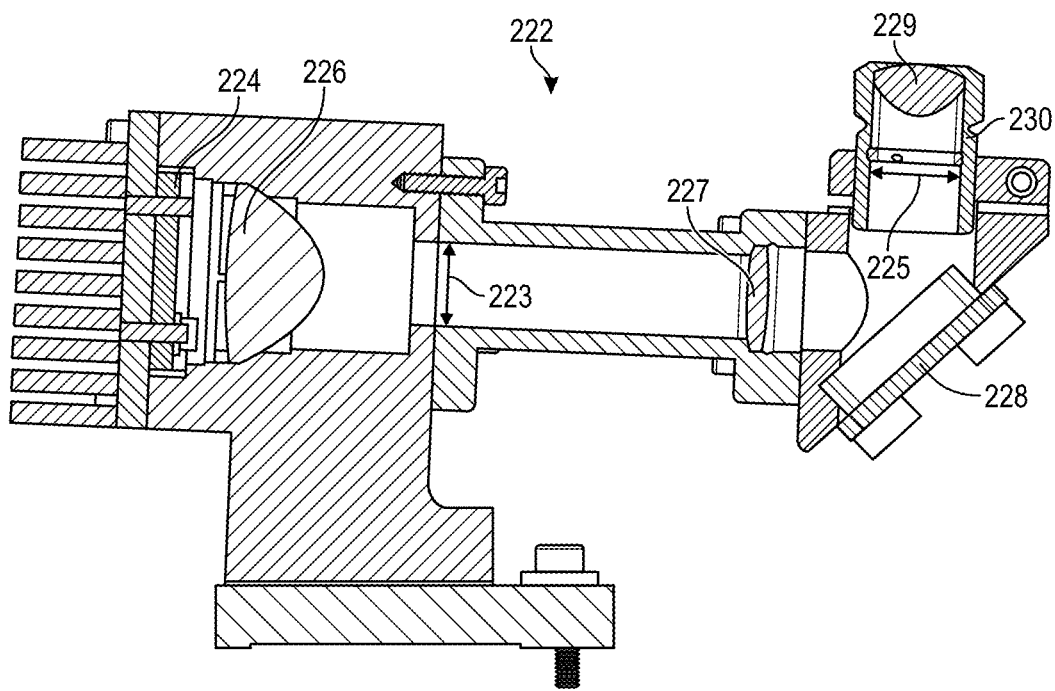
FIG. 28 is a front, cross-sectional view of the illumination subsystem of FIG. 27, according to one embodiment.

Referring to FIGS. 27 and 28, the imaging station 190 also includes an illumination module 222 for providing enough uniform light to the slide 102 for the objective lens 198 to collect in order for the camera 192 to create quality images. The illumination module 222 includes a light source 224 (e.g., an LED 224), a first lens 226, a second lens 227, a third lens 229, a first aperture 223, a second aperture 225, a second folding mirror 228, a tube lens mount 237, and an adjustable focusing lens 230, necessary to project the LED light to the bottom of the slide 102. The illumination module 222 projects uniform light to allow uniform illumination at the specimen focal plane. The term "uniform light" means light that is a substantially uniform color and brightness. The term "uniform illumination" means that the specimen 119 is illuminated substantially with a substantially uniform color and brightness of light. The illumination module 222 is powered by the main power supply wired through the SIB. The illumination module 222 light level is set with feedback from the camera to achieve a target background brightness. The illumination module 222 interfaces with the illumination interface on the SIB 182 (described below). The illumination module 222 has a Y adjustment screw to adjust the illumination in a Y direction in the XY plane relative to the image acquisition assembly 191, and an X adjustment screw 235 to adjust the illumination in an X direction in the XY plane relative to the image acquisition assembly 191.

The illumination module 222 contains the light source 224 (e.g., an LED), which, by its power, spectral distribution and radiance profile is the start of all illumination uniformity, quality, and quantity necessary to produce quality micro images.

The scanning process for using the scanning station 190 to obtain micro images of a slide 102 which include an in-focus image of features at different depths of the specimen 119 on the slide 102 will now be described. As explained above, and depicted in FIG. 25, the imaging station 190 captures micro images of the specimen 119 on slide 102 with the focal plane of the camera 192 tilted relative to the surface of the specimen 119 on the slide 102 such that the focal plane extends through the depth of the slide 102. Thus, each micro image captured by the camera 192 includes an image of the depth of the specimen 119 on the slide 102 as it is taken at an angle relative to the surface of the specimen 119 (i.e., at an angle to the plane of the slide 102). As depicted in the FIG. 33, the slide 102 is moved by the XY slide stage 210 to scan the field of view of the camera 192 over the entire specimen area 114 (or a predetermined area of the entire actual specimen 119, e.g., if the actual specimen 119 covers a different area than the specimen area 114 and the boundary of the actual specimen 119 is previously determined). The XY slide stage 210 moves the slide 102 in a back and forth serpentine path to capture micro images of a swath of the specimen 119 on each pass. To capture a swath, the XY slide stage 210 continuously moves the slide 102 and the camera 192 is triggered by the XY slide stage 210 to capture an image when each trigger point is reached according to the stage encoder position. A serpentine path, such that the start of each successive swath is close to the end of the previous swath, is used to minimize the time required to scan the entire specimen 119. As the slide 102 is moved along a swath, the camera 192 captures micro images of the specimen 119.

To maintain acceptable focus during the imaging scan, the best focus plane may be estimated for the slide 102 using measurements of the printed fiducial marks 116 on the slide 102 along with an offset defined by the measurement of the best focus offset of the specimen 119 from the fiducial plane. The coefficients defining the offset plane are then uploaded to the X-Y stage controller 215, which maintains the position of the Z-stage 200 according to those coefficients during the scan. During the imaging scan, the scan quality is monitored through various methods, including focus quality metrics, stage following error, and image quality metrics. Image quality metrics may include one or more of sharpness, noise, dynamic range, tone reproduction, contrast, color accuracy, distortion, vignetting, etc., which may be measured by digital image algorithms known by those of skill in the art.

Figure 25A:
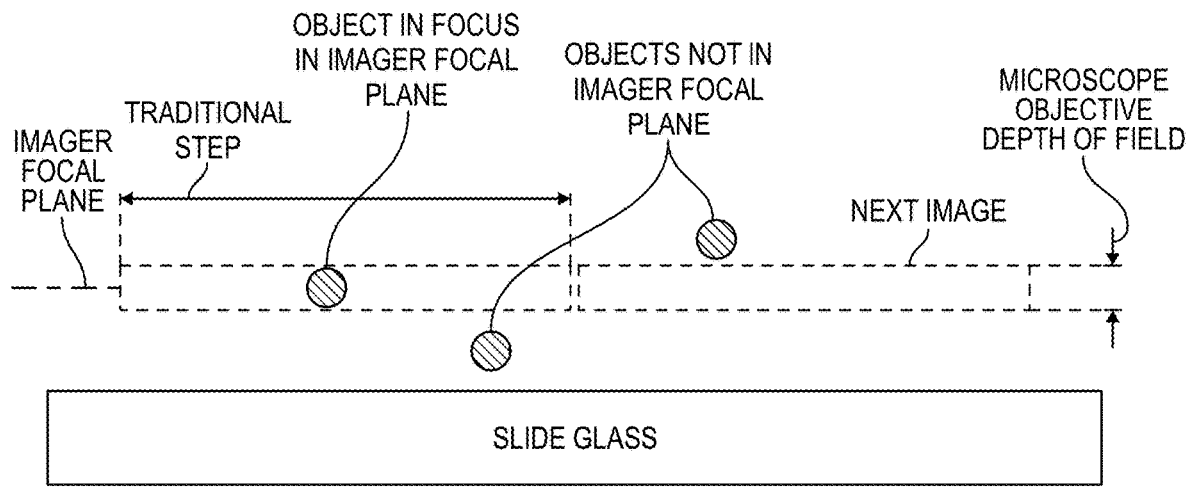
FIG. 25A is an illustration showing the imaging plane for previous imaging systems in which the imaging plane is nominally parallel plane of the slide (and specimen on the slide)

As shown in FIG. 25A, in previous imaging systems, the imaging plane is nominally parallel (i.e., parallel within manufacturing tolerance) to the plane of the slide (and specimen 119 on the slide). A single plane of best focus is captured for each adjacent field of view taken at intervals of about the length of the field of view of the camera (the micro images may have some overlap to assist in stitching the images). The micro images are then stitched together to make a composite image of the entire specimen 119. Note that, because of the differing heights of objects above the slide glass within a three-dimensional volume of the specimen 119, not all objects will be captured in focus with a single pass of imaging.

Figure 25B:
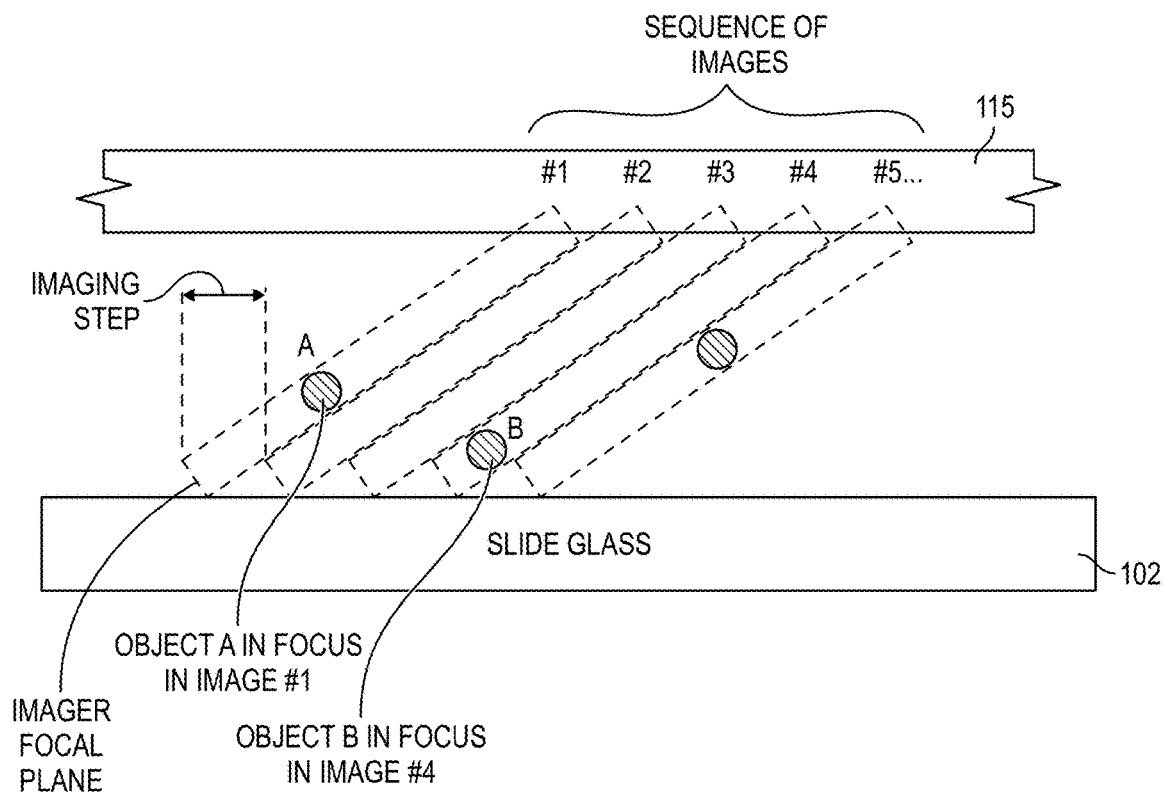
FIG. 25B is an illustration showing the tilted imaging plane of the digital imager of FIG. 4, according to one embodiment.
Figure 25C:
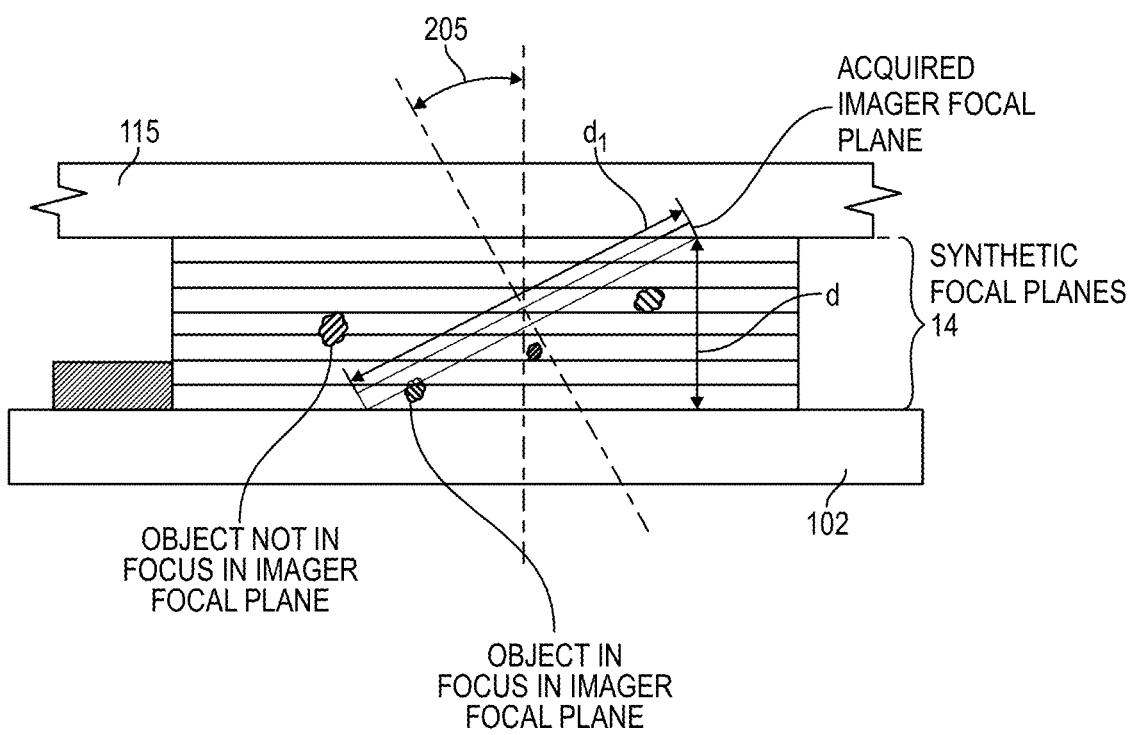
FIG. 25C is an illustration showing the tilted imaging plane of the digital imager of FIG. 4 to image the full depth (Z-dimension) of a specimen on a slide, and showing the dimensions for determining the proper camera tilt angle, according to one embodiment.

In contrast, as shown in FIG. 25B, the method of image capture for the imager 104 utilizes an imaging plane that is tilted relative to the specimen 119 on the slide 102. Because the imaging plane is tilted relative to the specimen 119 on the slide 102, different sub-regions of the camera pixel array capture images of the specimen at different heights. Accordingly, object A is captured in focus by the camera in imaging position #1, but in that same camera frame, object B is near the right edge of the frame and well out of focus. Instead of stepping the camera position by the length of the field of view in the scan direction between images, a step size equal to the image sub-region matching the depth of field of the imaging optics is used. The sequence of images overlaps. While object A is in focus with the camera in position #1, object B is captured in focus when the camera reaches position #4. In this way, all objects within the height equal to the difference between the left and right edges of the imager focal plane are captured in focus in some image.

Referring to FIG. 25C, in one example, the camera pixel array may be divided into 14 sub-regions representing different focal planes across a specimen depth of 24 µm. Once the same sample region (tile) is captured in each camera sub-region, those sub-regions are reassembled vertically to make a through-focus stack of the tile. The stack is then converted into a single plane merged focus image by comparing each pixel with adjacent pixels in the same plane, and selecting the pixel of the plane with the best focus quality using an algorithm for determining pixel focus having a focus metric, such as that taught in U.S. Pat. No. 7,769,219. Examples of determining best focused pixels and other objects are also described in the above-incorporated U.S. Pat. No. 7,736,304. Techniques for determining a best focus of slide fiducial marks are taught in U.S. Pat. No. 8,116,550. The number of sub-regions is just an example, and the digital imaging system 100 may use any suitable number of sub-regions for the image processing.

Figure 65:
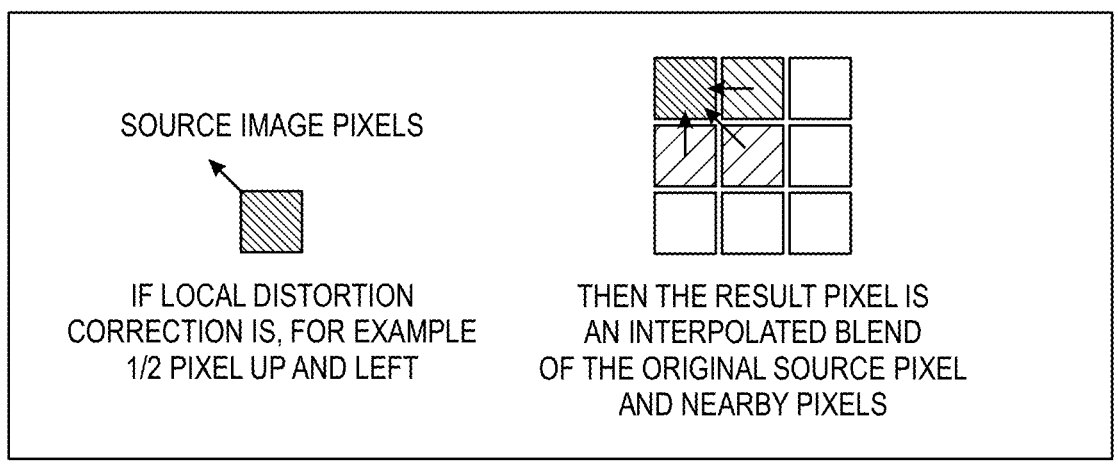
FIG. 65 illustrates an example of a calibration table for performing distortion correction of a digital image, according to one embodiment.

The following describes an exemplary method of processing the images by the GPU 132 to obtain a merged image of the entire specimen 119 on a slide 102. Image processing involves many steps to take the raw images and convert them into the final merged, compressed image. The color camera 192 may utilize a Bayer mask (a color filter array for arranging RGB color filters on a grid of photosensors. In such case, the first step in the image processing algorithm, is to de-Bayer and convert the images to RGB images (a bitmap image holding red/green/blue values for each pixel). The images are then uniformity and distortion corrected through a pre-mapped calibration table. In one example, the calibration table is an array the size of the camera image. The table contains entries for each pixel position in the corrected image result. Each entry indicates a 2×2 pixel subregion of the source image and weighting factors to be applied to those source pixels and summed to obtain the resulting pixel value. This allows for the corrected image to represent (by interpolation) the sub-pixel shifts required to correct for small optical distortions measured during the calibration process. FIG. 65 depicts one example of a pre-mapped calibration table in the case that location distortion correction is ½ pixel up and left.

Once all of the sub-region images (e.g., 14 sub-regions) for a tile have been captured, the merged image is calculated. The difference between each pixel and certain pixels in its neighboring region is calculated. This difference is then weighted based on the pixel's value to determine the relative merit of that particular plane for that particular pixel, producing a tile of plane values (e.g., 0 through 13). A moving average is then applied to the tile of plane values to provide a better transition between objects in the final image. The pixels of the merged image are then selected based on the associated plane values. The merged images are then tiled together to generate a swath. Once the complete swath is assembled, it is stitched onto the prior swaths. Once the images of the entire specimen 119 have been stitched together, the full image is compressed in an approximate 20:1 ratio using JPEG, JPEG 2000, or other suitable compression algorithms. A pyramid is then created for the image, and this, along with the slide metadata, is transferred to the workflow subsystem 106 where it can be accessed by the review stations 108 for review. Slide metadata refers to non-image information associated with a whole specimen image, such as a slide identifier, which may be a barcode read from the slide, time and date of imaging, etc. Slide metadata may also include the list of locations of OOI 308 identified by the image analysis algorithm. One example of a "pyramid" is a set of lower-resolution images derived from the original full whole specimen image by repeatedly reducing it in size by 50% until it reaches a preset minimum size. The purpose of this pyramid is to support more efficient rendering on a review screen. When the reviewer is looking at a zoomed-out lower resolution version of the image, the data can be supplied by accessing the appropriate level of pyramid image data, which involves less data transfer than sending the full resolution image and then reducing it in size at the review station 108.

Figure 30:
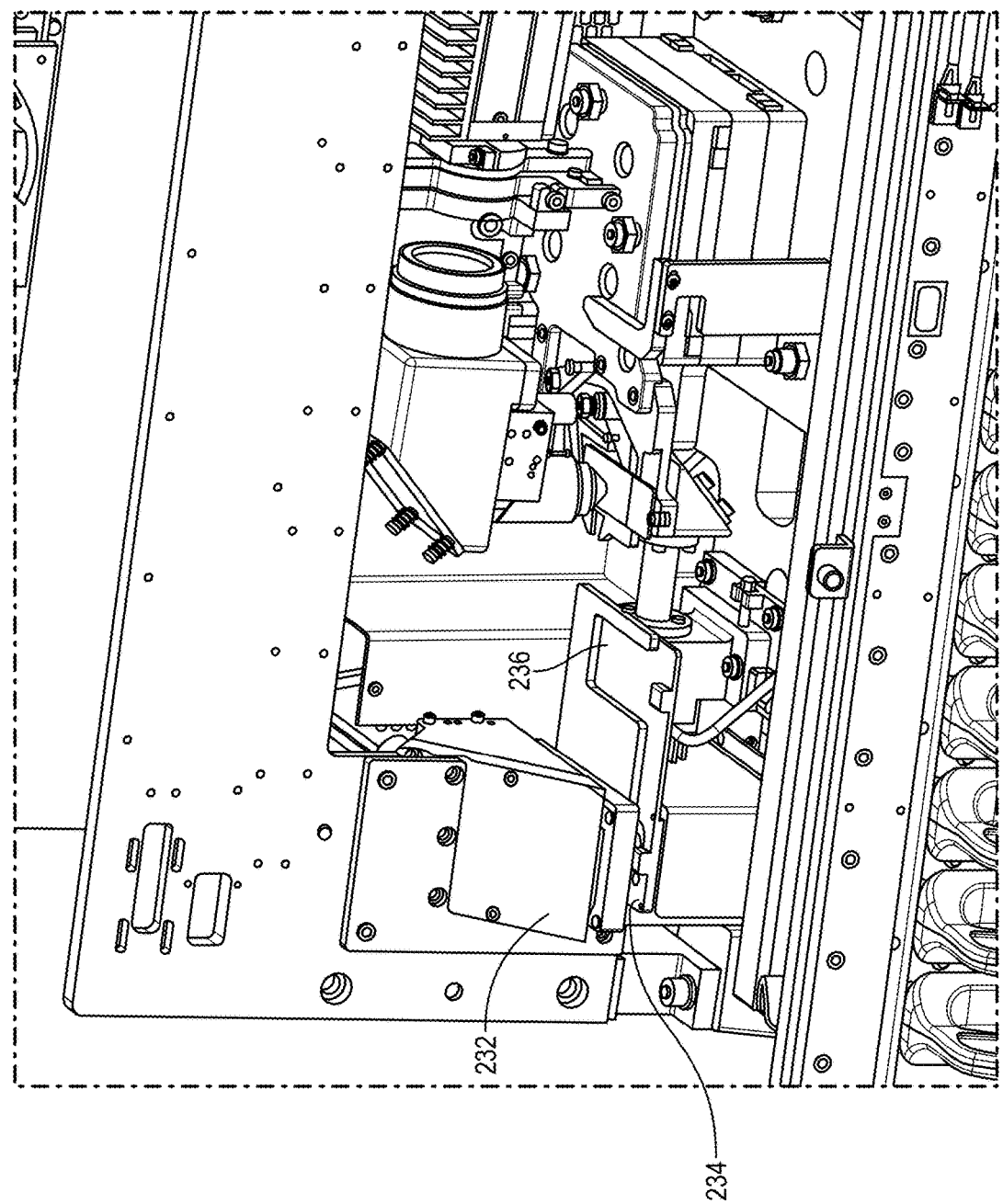
FIG. 30 is an enlarged, perspective view of the macrovision station of the digital imager of FIG. 4, according to one embodiment.
Figure 31:
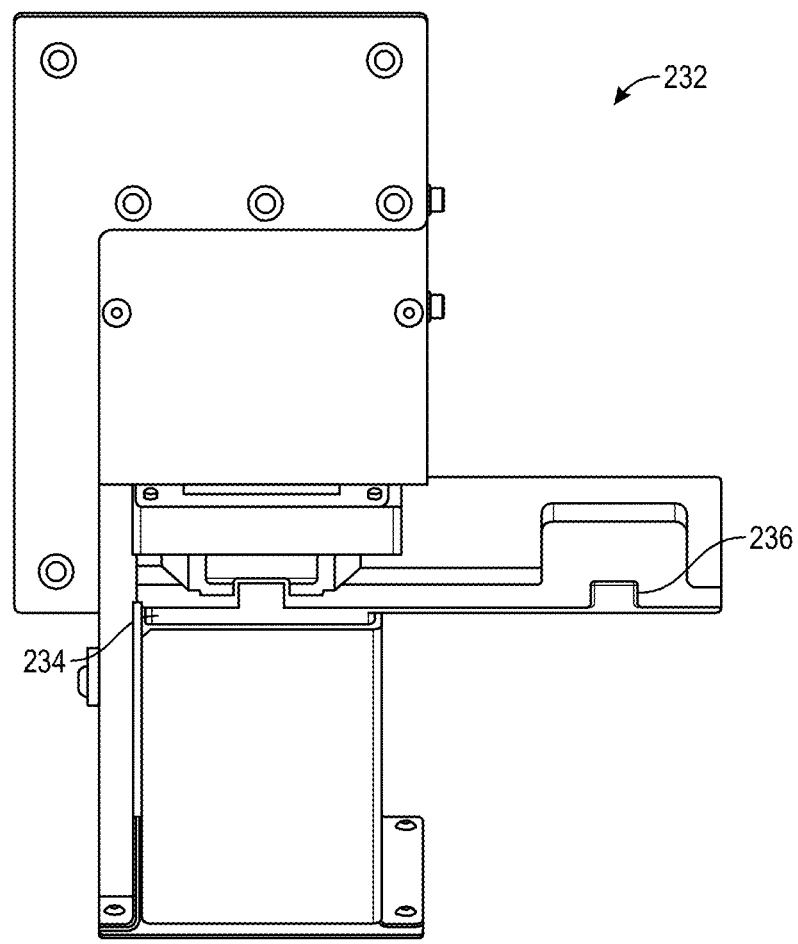
FIG. 31 is a front view of the macrovision station of the digital imager of FIG. 4, according to one embodiment.
Figure 32:
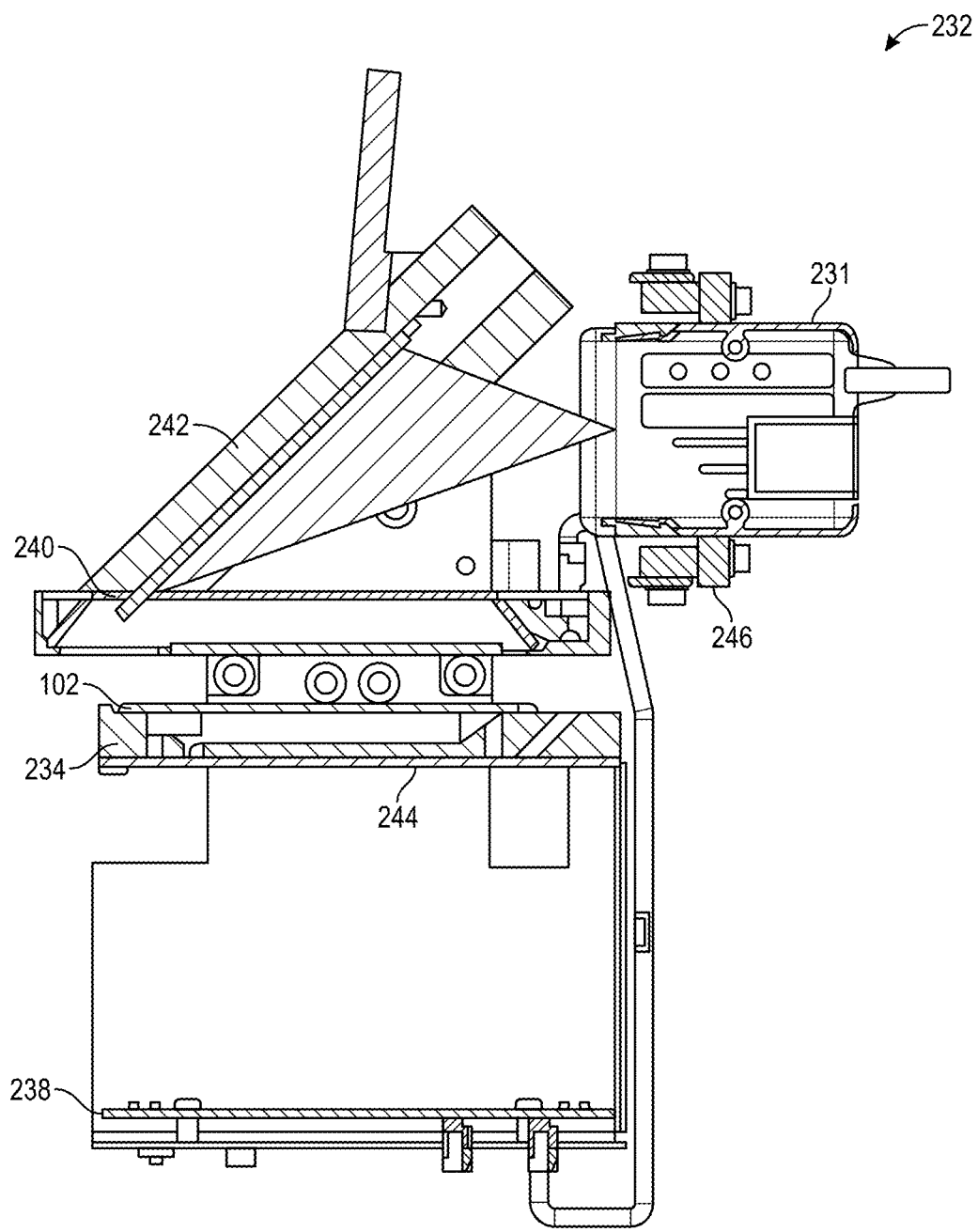
FIG. 32 is a side, cross-sectional view of the macrovision station of the digital imager of FIG. 4, according to one embodiment.

Referring to FIGS. 30-32, the imager 104 also has a macrovision station 232 for obtaining identification information for each slide 102, and for obtaining unmagnified macro images of the full slide (e.g., to obtain information outside the specimen area 114) and/or the specimen area 114. The macrovision station 232 includes a first slide holder 234 in the imaging position in the imaging area of a macro camera 231 (e.g., a digital camera having a CCD or other imaging sensor) of the macrovision station 232 and a second slide holder 236 in a queue position outside of the imaging area of the macrovision station 232. A lower illumination module 238 having a PCB and LEDs is positioned below the first slide holder 234 to illuminate the bottom of a slide 102 positioned in the first slide holder 234. A diffuser 244 may be positioned between the lower illumination module 238 and the first slide holder 234. An upper illumination module 240 having a PCB and LEDs is positioned below the first slide holder 234 to illuminate the top of a slide 102 positioned in the first slide holder 234. The macrovision station 232 has a macro camera 231 and a second folding mirror 242 to reflect the optical axis of the macro camera 231 onto the slide 102 in the first slide holder 234. The macro camera 231 is mounted using camera adjustments 246 to allow for adjusting the orientation of the macro camera 231.

The macrovision station 232 takes macro images of the slides 102, including the barcode identification and/or other information on the slides 102, and images of the full slide 102 and/or the specimen area 114, and transmits the macro images to the imager computer 105. The macro image includes one or more of the fiducial marks 116 and the specimen area 114 and/or specimen 119. The imager computer 105 is configured to determine a relative location and boundaries of the specimen area 114 and/or specimen 119 on the surface of the slide 102 based at least in part on the one or more fiducial marks 116. The relative location and boundaries of the specimen area 114 and/or specimen 119 are provided to the imaging station 190. The imaging station 190 (e.g., the image acquisition subassembly 191) is configured to acquire the micro images based at least in part on the relative location and boundaries of the specimen area 114 and/or specimen 119 on the slide 102. In other words, the imaging station 190 utilizes the relative location and boundaries specimen area 114 and/or specimen 119 to determine the scanning location of the camera 192 when acquiring the micro images so that there is no time and storage wasted overscanning past the edges of the specimen area 114 and/or specimen 119. The macrovision station 232 also interfaces with the SIB 182, which in turn interfaces with the imager computer 105 to control the operation of the macrovision station. The macro camera 231 is in data communication with the imager computer 105 via a communication network, such as a 100 baseT Ethernet network.

Figure 29:
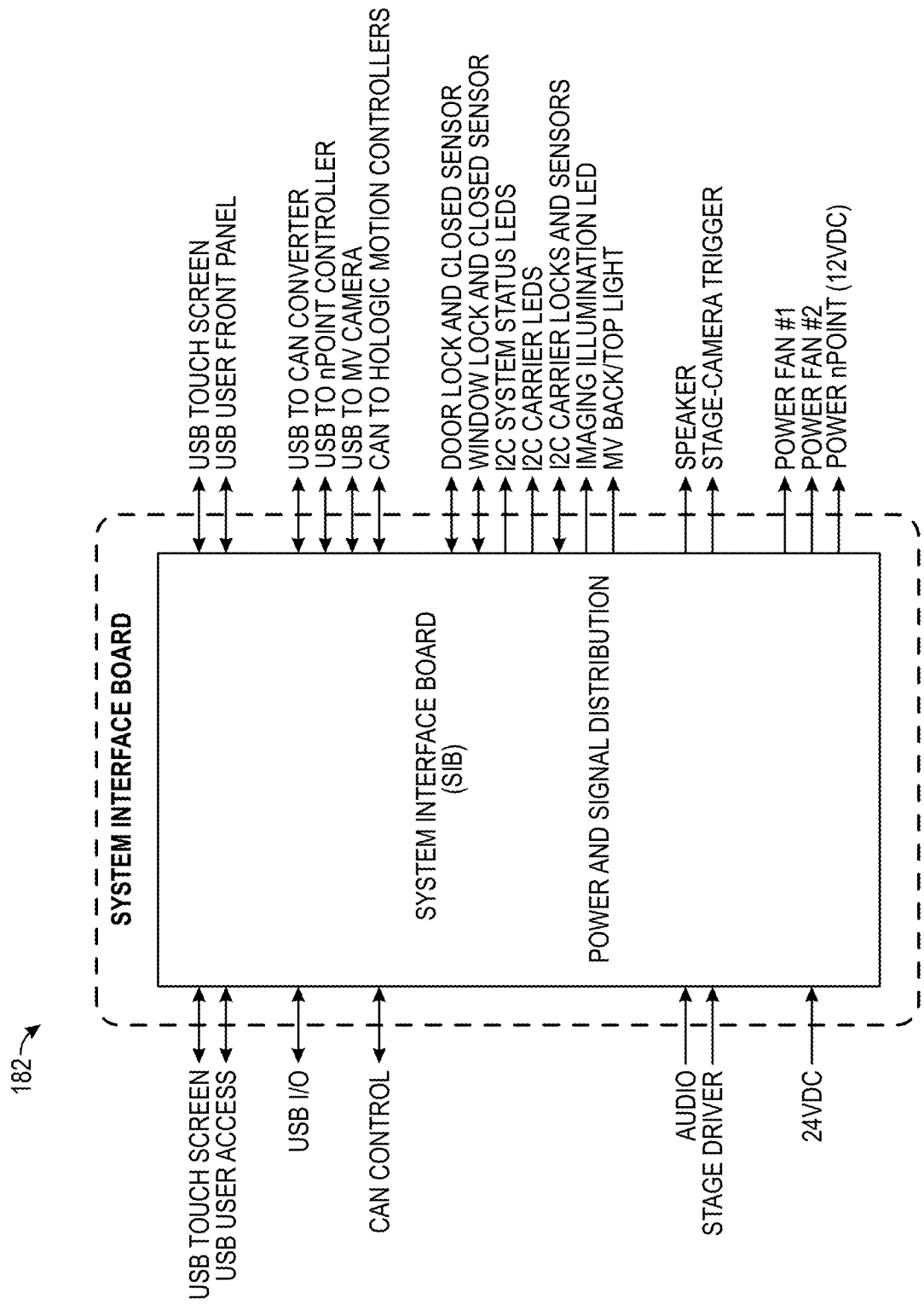
FIG. 29 is a schematic diagram of the system interface board of the digital imager of FIG. 4, according to one embodiment.

A schematic of the SIB 182 is illustrated in FIG. 29. The SIB consolidates external signals transmitted between the imager computer 105 and the imager 104, and re-distributes them to the appropriate components and subassemblies of the imager 104 and the appropriate inputs of the imager computer 105.

The complete operation of the imaging subsystem 103 to image slides 102 and create a single, merged image of the entire specimen 119 on each slide 102 will now be described. The operator manually loads each of the slide carriers 118 with the slides 102 to be scanned. If the slides 102 are provided in slide racks 120, then this simply involves inserting the slide racks 120 into the slide carriers 118. If the slides 102 are not in slide racks 120, then the operator first loads the slides 102 into slide racks 120, and then inserts the slide racks 120 into the slide carriers 118. The slide carriers 118 may be used as a repository for the slides 102 before and after imaging, as well as for transporting and loading the slides 102 into the imager 104.

The slides 102 in the slide carriers 118 are manually inspected to verify the slides 102 are properly oriented in the slide carriers 118 with the printed sides of the slide identification portion 112 all facing away (toward the back of the slide carrier 118). With the imager 104 in idle or pause mode, the operator opens the slide carrier deck door 166 and manually inserts the slide carriers 118, loaded with up to 40 slides each, into a respective one the slide carrier bays 174. Each of the carrier present sensors 175 in the respective slide carrier bays 174 detects whether a slide carrier 118 is installed, and signals the imager computer 105, accordingly. The carrier lock 173 for the slide carrier 118 which is currently being actively imaged by the imager 104 is actuated to lock the active slide carrier 118 in place when the imager 104 is removing and imaging slides 102 from the active slide carrier 118. The other slide carriers 118 which are not being actively imaged by the imager 104 are not locked (deemed inactive).

When a new slide carrier 118 is inserted into a slide carrier bay 174 and its carrier present sensor 175 signals that a slide carrier 118 is present, the imager 104 schedules an inventory of such slide carrier 118. The imager 104 performs an inventory on each of the slide carriers 118 installed in the imager 104 using the optical slide inventory sensor 188. The slide handling gantry 178 scans the sensor 188 over each of the slide carriers 118 and determines which of the possible slide slots in the slide racks 120 has slides 102 inserted. This slide inventory information is provided to the imager computer 105 and is used when the respective slide carrier 118 becomes active and ready for scanning, so the slide handling gantry 178 only traverses to slots in the slide carrier 118 in which there are slides 102.

When a respective one of the slide carriers 118 is scheduled for imaging, the slide handling gantry 178 moves to the first slide 102 in the slide carrier 118, actuates the gripper 184 to grip it, and moves the slide 102 to the macrovision station 232, and places the first slide 102 onto the first slide holder 234 in the imaging position of the macrovision station 232. The macrovision station 232 takes multiple macro images of the first slide 102 using the macro camera 231, creates a full specimen image (i.e., a macro image, comprising a single image of the entire specimen 119), and reads the printed identification information (e.g., barcode(s)). This information becomes part of the Slide Data Set (SDS) record for the first slide 102. As described herein, the macro image also includes one or more of the fiducial marks 116 and the specimen area 114 and/or specimen 119. The imager computer 105 uses the macro image to determine a relative location and boundaries of the specimen area 114 and/or specimen 119 on the surface of the slide 102 based at least in part on the one or more fiducial marks 116. The relative location and boundaries of the specimen area 114 and/or specimen 119 are provided to the imaging station 190.

When the imaging station 190 is ready to receive a new slide 102, the slide handling gantry 178 moves the first slide from the first slide holder 234 in the imaging position of the macrovision station 232 to the imaging station 190 and places the first slide 102 on the slide holder 202 of the imaging station 190. During loading of the first slide 102 on the slide holder 202, the XY slide stage 210 may be positioned such that the slide release bracket 209 actuates the first and second slide justifier arms 206, 208 to the release position to allow the first slide 102 to be placed on the slide holder 202. Once the first slide 102 is placed on the slide holder 202, the XY slide stage 210 moves the slide holder 202 such that the first and second slide justifier arms 206, 208 bias to their respective engaged positions, thereby biasing and holding the first slide 102 in place in the slide holder 202 during scanning.

After the first slide 102 is moved from the first slide holder 234 in the imaging position of the macrovision station 232 to the slide holder 202 of the imaging station 190, the slide handling gantry 178 is available to move the next slide 102 (i.e., the second slide 102) in the slide carrier 118 to the first slide holder 234 in the imaging position of the macrovision station 232. The macrovision station 232 may perform the process of obtaining the macro images, same as described for the first slide 102 in parallel (i.e., at the same time) that the imaging station 190 is obtaining micro images of the specimen 119, as described below. The loading of the second slide onto the first slide holder 234 of the macrovision station 232 and the macro imaging of the second slide 102 may be done while the imaging station 190 is imaging the first slide 102. After the macrovision station 232 completes macro imaging of the second slide 102, typically, the second slide 102 must wait in the macrovision station 232 until the imaging station 190 finishes micro imaging the first slide 102, and the slide handling gantry 178 has moved the first slide 102 from the slide holder 202 to the second slide holder 236 in the queue position, as further described below.

The imaging station 190 then scans the first slide 102 to capture a plurality of micro images of the specimen 119 on the first slide 102. As described above, the first slide 102 is continuously moved in a serpentine path by the XY slide stage 210 to move the first slide 102 under the objective lens 198 while the digital camera 192 takes a plurality of micro images. The imager 104 coordinates XY slide stage 210 movement, and Z-axis motion (focus) to image the slide 102. As the first slide 102 is being scanned, image data from the camera 192 is streamed to the imager computer 105. The micro images are reassembled into the segmented image data from the camera 192 and streamed to the imager computer 105. The imaging station 190 acquires the micro images based at least in part on the relative location and boundaries of the specimen area 114 and/or specimen 119 on the slide 102, so that it minimizes the wasted time and storage caused by scanning and imaging outside the edges of the specimen area 114 and/or specimen 119.

After the first slide 102 is imaged, the slide handling gantry 178 moves the first slide 102 to the second slide holder 236 in the queue position. The queue position is the queue point for the completed imaging operation. This function is used to optimize the throughput of the slide handling gantry 178, by placing a slide 102 that has completed the imaging process proximate the slide holder 202 of the imaging station 190, rather than replacing the first slide 102 back into the slide carrier 118. The first slide 102 remains in the queue position while the slide handling gantry 178 is moving the next slide 102 (e.g., the second slide 102) to be micro imaged by the imaging station 190 from the first slide holder 234 in the imaging position of the macrovision station 232 to the slide holder 202 of the imaging station 190. If not for the que position, the first slide 102 would need to be moved back into the slide carrier 118 before the next slide 102 could be placed in the slide holder 202 of the imaging station 190, which would slow the process because the slide carrier 118 is farther away from the slide holder 202 than the second slide holder 236. After the next slide 102 to be micro imaged by the imaging station 190 has been moved to the slide holder 202, the slide handling gantry 178 is available to move the first slide 102 from the second slide holder 236 back into the slide carrier 118 (i.e., while the imaging station 190 is imaging the next slide 102). Once the second slide 102 has been moved onto the imaging station 190, the slide handling gantry 178 moves a third slide 102 from the active slide carrier 118 to the macrovision station 232 and places it on the first slide holder 234, and the macrovision station 232 images the third slide 102. This process is repeated for all of the slides 102 in the active slide carrier 118. Thus, the use of the queue position of the second slide holder 202 increases the overall throughput of the imager 104.

The imager computer 105 receives the camera micro images from the imaging station 190, and reassembles them which are reassembled into focal plane images as described earlier and combined into a single best-focus plane as described earlier. This is all done in the GPU, along with stitching/alignment of adjacent swaths. The resulting image is streamed from the GPU to the CPU and then compressed and stored on a disk.

The imager computer 105 also utilizes the image analysis algorithm (described below) to scan the image data to identify Objects of Interest (OOI) and generate OOI location data. The OOI location data identifies the locations of the OOI in the image. This data also becomes part of the SDS 304. Each SDS 304 is processed to generate an optimized data set (the 'pyramid') to be used for image viewing at the review station 108. The pyramid data (subset of the compressed SDS) is designed to allow faster slide data access for a recorded OOI. The pyramid data is also added to the SDS. Once image processing and pyramid generation is complete, the compressed SDS is sent to the workflow subsystem 106, and moved to an Active Storage partition on the NAS disk array dedicated for active data only (see FIG. 1).

The image analysis algorithm may identify OOI using any suitable process. As one example, the image analysis algorithm analyzes the digital image 302, such as by scanning the digital image 302, and performing primary and secondary segmentation. The primary and second segmentation measures, determines and/or extracts various characteristics for each of the individual objects and clustered objects in the digital image 302. The specific characteristics may be utilized because they are known to be related to classifying the object, such as being classified as normal, abnormal, diseased, healthy, pre-cancerous, cancerous, etc. For instance, for digital images 302 of cytological samples, the characteristics may include cell size, nucleus to cytoplasm area ratio, nuclear corrected integrated optical density, cytoplasmic vacuolization, darkness, etc., which can be used to classify cells as being pre-cancerous, cancerous, normal, and/or abnormal. Primary and secondary segmentation are described in U.S. Patent Application Publication No. 2004/0253616. Then, the algorithm calculates an object score for each object based on measured values of the respective characteristics. Based on this score, the algorithm identifies or selects objects and clustered objects that are considered OOIs 308 (e.g., see FIG. 34).

The imager computer 105 may also analyze the determined characteristics of each OOI 308 and identify OOI 308 on the same digital image 302 (i.e., the same sample) which are similar using an OOI matching algorithm. The OOI matching algorithm compares the respective determined characteristics of the OOI 308 to identify OOI 308 having determined characteristics which are similar, such as having one or more characteristics which are within respective predetermined ranges of each other. The OOI matching algorithm may also be utilized to determine if an OOI 308 on a digital image 302 is similar to an OOI 308 in a library of OOI 308. The library of OOI 308 may be stored in a database of the laboratory information system (LIS) 408 (see FIG. 1) or a database stored on another data storage device or system in network communication with the imager computer 105. The database of OOI 308 includes a library of OOI images and/or digital images 302 of previously classified and characterized objects (e.g., cells). Each of the objects in the library of OOI images and/or digital images 302 has previously determined characteristics which can be compared to the respective characteristics of the OOI 308 on the digital image 302 being analyzed by the imager computer 105. The objects in the library images may also be previously classified, such as being classified as abnormal, normal, pre-cancerous, cancerous, malignant, pre-malignant, benign, etc.

Figure 62:
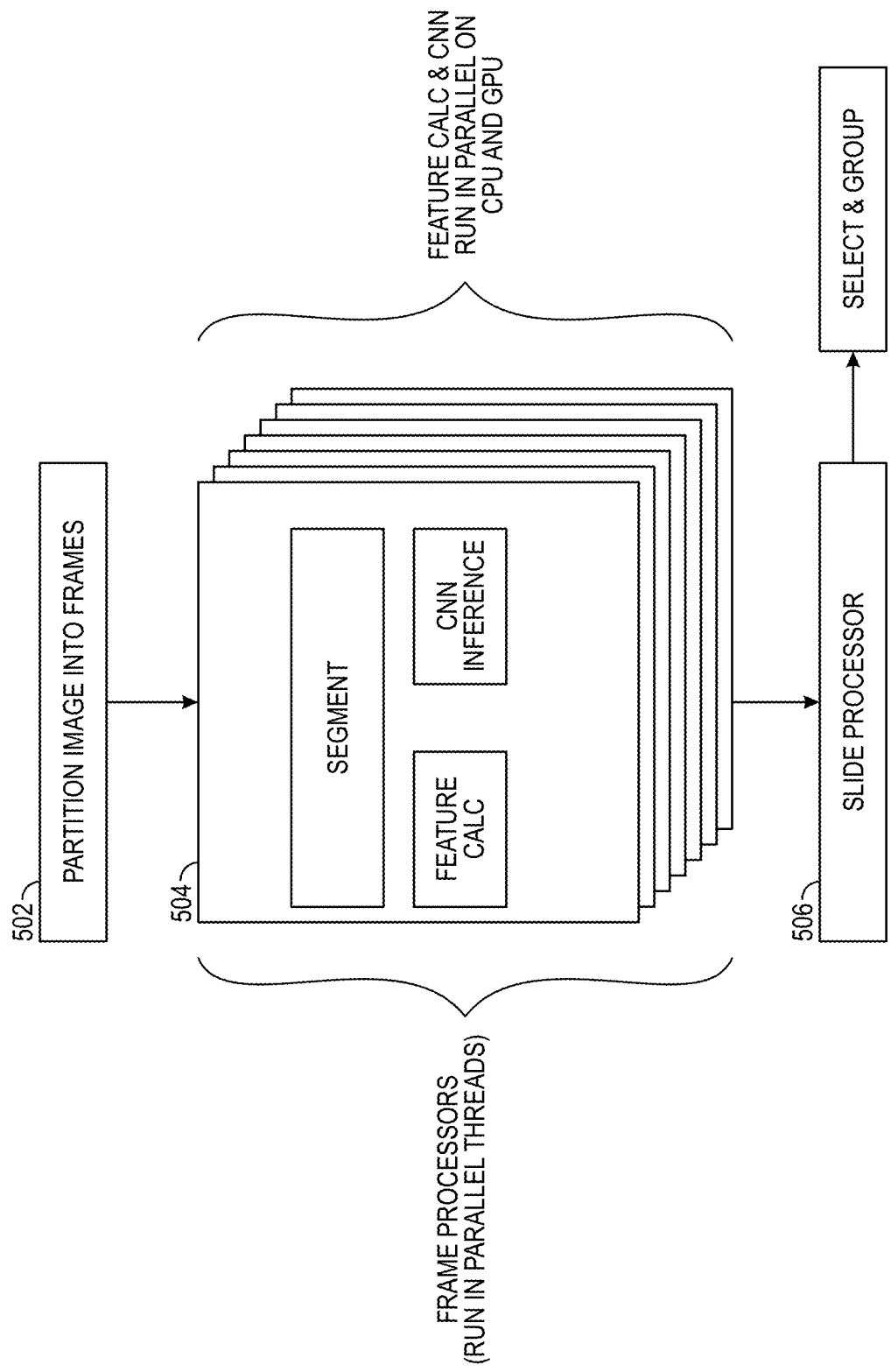
FIG. 62 illustrates a graphical representation of an image analysis algorithm for digital cytology, according to one embodiment.

FIG. 62 depicts a graphical representation of the image analysis algorithm 500 for digital cytology. At step 502, the digital image 302 is partitioned into frames. At step 504, the frames are processed by frame processors which are run in parallel threads. The frame processors segment the frames, such as by using a watershed method, applied to the G channel of RGB. In addition, the frame processors calculate features (characteristics) of the objects and perform a Convolutional Neural Network (CNN) inference (e.g., using modified MobileNet with 192×192 window, color) run in parallel on a CPU and GPU (graphics processing unit) of the imager computer 105. At step 506, the slide is processed and at step 508 the OOI are selected and grouped based on the determined characteristics.

The automated digital imaging system 100 may include a machine learning diagnosis module configured to utilize machine learning to characterize and/or diagnose objects on a digital image 302. The machine learning diagnosis module may be installed and run on the imager computer 105, the review station computer 111, or other suitable computer system. The machine learning diagnosis module performs a process which characterizes objects on a digital image 302 and may also diagnose a patient based on the characterization. For example, as depicted in one exemplary process, the process comprises creating a training set of characterized/diagnosed objects. The training set is created by imaging a large number of specimen slides 102, such as hundreds, thousands, tens of thousands, etc., of slides 102, to obtain digital images 302 of each specimen slide 102. Then, OOI are identified on each of the digital slides 102, as described herein. The OOI are independently classified as to type by a plurality of clinicians (e.g., cytotechnologists and/or pathologists for cytological specimens), such as three, four, five, or more clinicians. For instance, the objects may be classified as HSIL, LSIL, normal, abnormal, diseased, healthy, pre-cancerous, cancerous, etc. "HSIL" is an acronym for high grade squamous intraepithelial lesion, and "LSIL" means low grade squamous intraepithelial lesion. A lesion is an area of abnormal tissue, and high grade versus low grade refers to the likelihood that it will progress to cancer. Next, the machine learning diagnosis module determines a plurality of characteristics for each of the OOI, such as by using the image analysis algorithm, described herein, or similar algorithm. For example, for digital images 302 of cytological samples, the characteristics may include cell size, nucleus to cytoplasm area ratio, nuclear corrected integrated optical density, cytoplasmic vacuolization, darkness, etc., which can be used to classify cells as being pre-cancerous, cancerous, normal, and/or abnormal.

The machine learning diagnosis module then uses a pattern recognition algorithm to determine a characterization/diagnosis relationship between the characteristics identified by the image analysis algorithm and the characterization/diagnosis determined by the clinicians. The characterization/diagnosis relationship may be an algorithm, a function, and equation, or other suitable relationship.

The machine learning diagnosis module may then characterize/diagnose objects on new specimen slides 102 using the characterization/diagnosis relationship. The imaging station 103 generates a digital image 302 of the slide 102. The image analysis algorithm is used to identify OOI on the digital image 302. The machine learning diagnosis module then determines a plurality of characteristics for each of the OOI, such as by using the image analysis algorithm. Finally, the image analysis algorithm uses the characterization/diagnosis relationship to characterize/diagnose each of the OOI. The characterization/diagnosis for each OOI is also added to the SDS 304.

The machine learning diagnosis module can continue to learn and optimize the characterization/diagnosis relationship by adding digital images 302 from new specimen slides 102 to the training set, and then performing the process for generating the characterization/diagnosis relationship using the pattern recognition algorithm.

The imager computer 105 may also include a slide statistics module for identifying slide statistics, such as number of objects (e.g., number of cells) on the slide, number of boundaries, etc. The imager computer 105 may utilize a process similar to determining the OOI to determine the slide statistics. Similar to determining OOI, the imager computer scans the digital image 302 and identifies individual objects, clustered objects, and boundaries, to count the number of objects, clustered objects and boundaries. The slide statistics are added to the SDS 304.

The imaging subsystem 103 completes this process until it has taken images and processed the images for all of the slides 102 in each of the slide carriers 118 loaded into the imager 104. After the imaging is completed, the slide carriers 118 are removed from the slide carrier deck 128. The slide 102 may then be removed from the slide carriers 118, and physically stored according to lab procedures, or discarded if no longer needed.

As described above, the processed digital images, including their respective SDSs are transmitted to, and stored in, the workflow subsystem 106. The workflow subsystem 106 stores the digital images in the Active Storage where they can be accessed by the review stations 108. The workflow subsystem 106 includes a workflow subsystem administration application 248 (see FIG. 1) which is configured to manage the workflow of reviewing the digital images by a reviewer, such as a cytotechnologist and/or cytopathologist. For example, upon reviewer logging into a review station 108, the workflow subsystem 106 may send a worklist of cases comprising the digital images for the reviewer to the review station 108. The review station 108 displays the worklist to the reviewer. The reviewer may then manage the worklist, select a case to work on, review digital images in the selected case, complete a case, and/or track completed cases and in-progress cases.

Upon selecting a case to review, the review station 108 accesses the selected case from the workflow subsystem 106, and the workflow subsystem transmits the digital image(s) and the SDS to the review station 108. The review station 108 displays the digital image(s) on various review screens. The user interface for the review station 108 allows the reviewer to select different digital images(s) (e.g., a case may include multiple digital images, or a case may include a single digital image). The review screen displays the selected digital image and also displays images of the OOI. The OOI may be displayed as thumbnails so that multiple OOI can be displayed on the review screen at once and allowing the reviewer to select the OOI to view a full-size display of the OOI. Once the reviewer has reviewed the digital image(s) for the case, the review station 108 displays a completion screen which allows the reviewer to disposition the case, such as marking the case as "complete," or "review by second reviewer" (e.g., a cytopathologist), or "complete later" (in the case that the reviewer has not yet completed the full review of the case.

Once a case has been completed, including a second review (e.g., by a cytopathologist) if required, the case is entered into a laboratory information system (LIS) 250 (see FIG. 1). The workflow subsystem 106 may have an LIS communication interface 252 to send the completed case to the LIS, or it may be entered manually into the LIS. A clinician may then access the results of the case via the LIS 250.

With reference to FIGS. 34-62, embodiments of systems and methods for displaying the digital images generated by the automated digital imaging system 100 will be described in further detail. The digital display systems and methods allow reviewers of biological specimens, such as cells, tissue and other subject matter, to more efficiently and accurately review digital images of specimens and identify, characterize and/or diagnose attributes within the specimens. As such, the digital display systems and methods provide specific improvements in the way computers operate and impart specific functionality to the display system for biological specimens which solve various problems in the computerization of digital microscopy of biological specimens.

Figure 34:
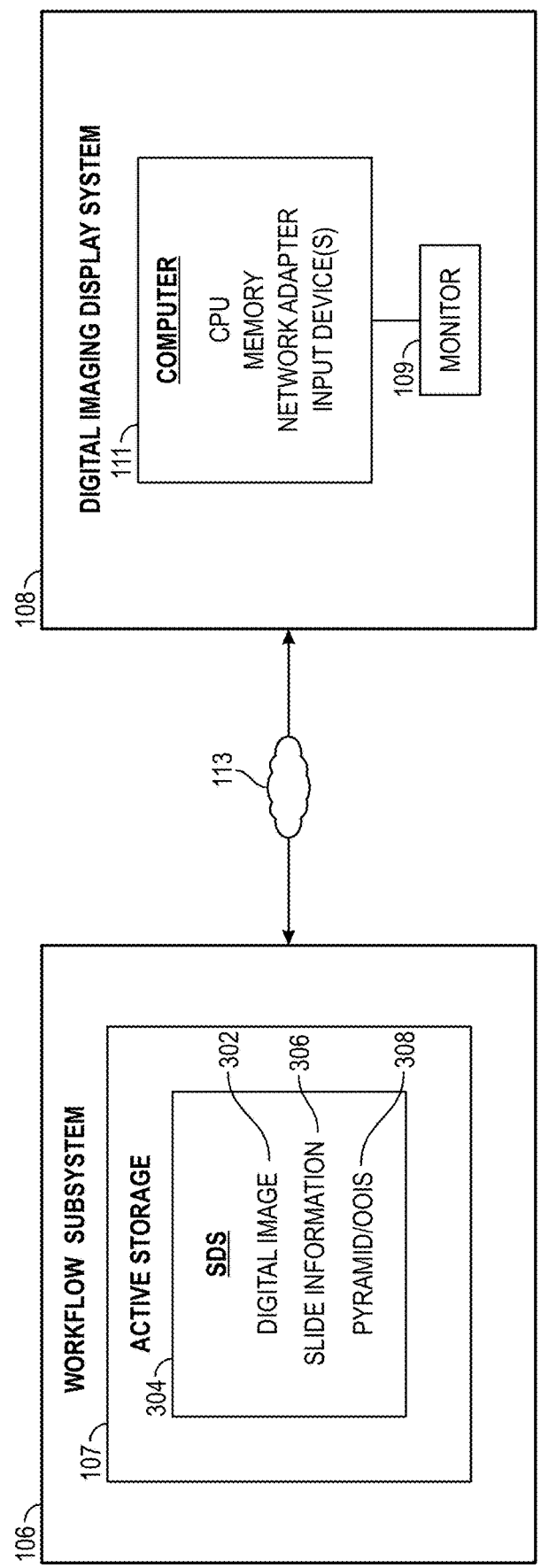
FIG. 34 is a block diagram of the workflow subsystem and digital imaging display system (review station) of the automated digital imaging system of FIG. 1, according to one embodiment.

Referring to FIG. 34, the workflow subsystem 106 and digital imaging display system 108 (also referred to as "review station 108") of the digital imaging system 100 are shown in further detail. As described above, the imager computer 105 uses an image processing algorithm (e.g., a software application 135 installed on the imager 104 and/or on the workflow subsystem 106) which analyzes the digital image of a slide specimen 119 and identifies objects of interest (OOI) 308 (see FIG. 36). The identified OOI 308 can then be used to assist the user (e.g., a cytotechnologist or cytopathologist) in quickly and accurately reviewing the digital image of the slide specimen 119.

As described above, the workflow server 106 is a computer server functioning primarily as a large disk storage system for storing and managing the digital images and associated slide data which are stored in the SDS 304 data record for each slide 102. The workflow server 106 may also include software for image processing and data management, and may also provide networking functionality. The SDS 304 includes the stitched digital image 302, the slide information 306 captured by the imager 104 for each slide 102, and the OOI location data 308. Each SDS 304 is processed by the imager computer 305 to generate an optimized, added, data set (the 'pyramid') to be used for image viewing at the digital display system 108. As described herein, the pyramid data (subset of the SDS) is designed to allow faster slide data access for recorded OOI. The pyramid data may also include information that improves the display of whole specimen digital images 302 by providing coordinates and display information for panning and zooming to areas of the digital images 302 (especially in non-gynecology slides) that do not have OOI. The pyramid data is also added to the SDS. Once image processing and pyramid generation is complete, the compressed SDS 304 is sent to the workflow subsystem 106, and moved to an Active Storage partition 107 on the NAS disk array dedicated for active data only (see FIG. 1).

The digital display systems 108 are workstations including computers 111 and monitors 109 for accessing the digital images from the workflow server and displaying the digital images for diagnostic review of the images (OOI 308 and/or whole specimen images 302). As depicted in FIG. 1, the imager subsystems 103 are in data communication with the workflow subsystem 106 via a communication network which may include one or more of a local area network (LAN, e.g., Ethernet), wide area network (WAN), the internet (e.g., virtual private network (VPN)), or other suitable network. Similarly, the review stations 108 are in data communication with the workflow subsystem 106 via a communication network 113 which may include one or more of a local area network (LAN, e.g., Ethernet), wide area network (WAN), the internet (e.g., virtual private network (VPN)), or other suitable network.

The digital imaging display systems 108 are configured to access the SDS 304 for each slide 102 from the workflow subsystem in order to allow a reviewer (e.g., a cytotechnologist and/or cytopathologist) to review the digital images of the slides 102 on the monitor 109. Referring to FIG. 34, each digital imaging display system 108 includes a computer 111, and a computer monitor 109. The computer 111 may be any suitable computer having a microprocessor (CPU), memory, a storage device, and a network adapter. The computer 111 may also have a graphics processing unit (GPU) for improving the speed in handling the large digital image files. The digital imaging display system 108 may also include input device(s) such as a keyboard, mouse, touchpad, etc. The monitor 109 may be a touchscreen monitor such that the touchscreen is an input device. As described herein, the digital imaging display system 108 is in data communication with the workflow subsystem 106 via a communication network 113.

The monitor 109 may be a specially configured color monitor for displaying the digital images 302 of the specimen slides 102. For example, the monitor 109 may have a specified resolution and/or color calibration for the display of specimen slides 102 for use in pathology or other specified application. For instance, in cytopathology, color is used to identify different types of cells, and certain types of colored stains and/or reagents are used to prepare a specimen for review by a reviewer which mark the specimens. For example, U.S. Pat. No. 6,661,501 describes various stains and methods of producing the stains, methods of staining cells for cytological or histological analysis to contrast the nuclear portion of the cell from the cytoplasmic portion, and systems and methods for illuminating a cytological sample, which are suitable for preparing a cytological specimen for use on the digital imaging system 100. The effects of the stains and/or reagents must be detectable on the digital images when displayed on the monitor 109 in order for the reviewer to properly review the slide 102. In other words, the digital imaging system 100 may be configured such that the digital image of a slide 102 viewed on the monitor 109 looks the same, or as substantially the same, as its appearance on the actual slide 102 using a microscope based system to view the slide 102.

Figure 35:
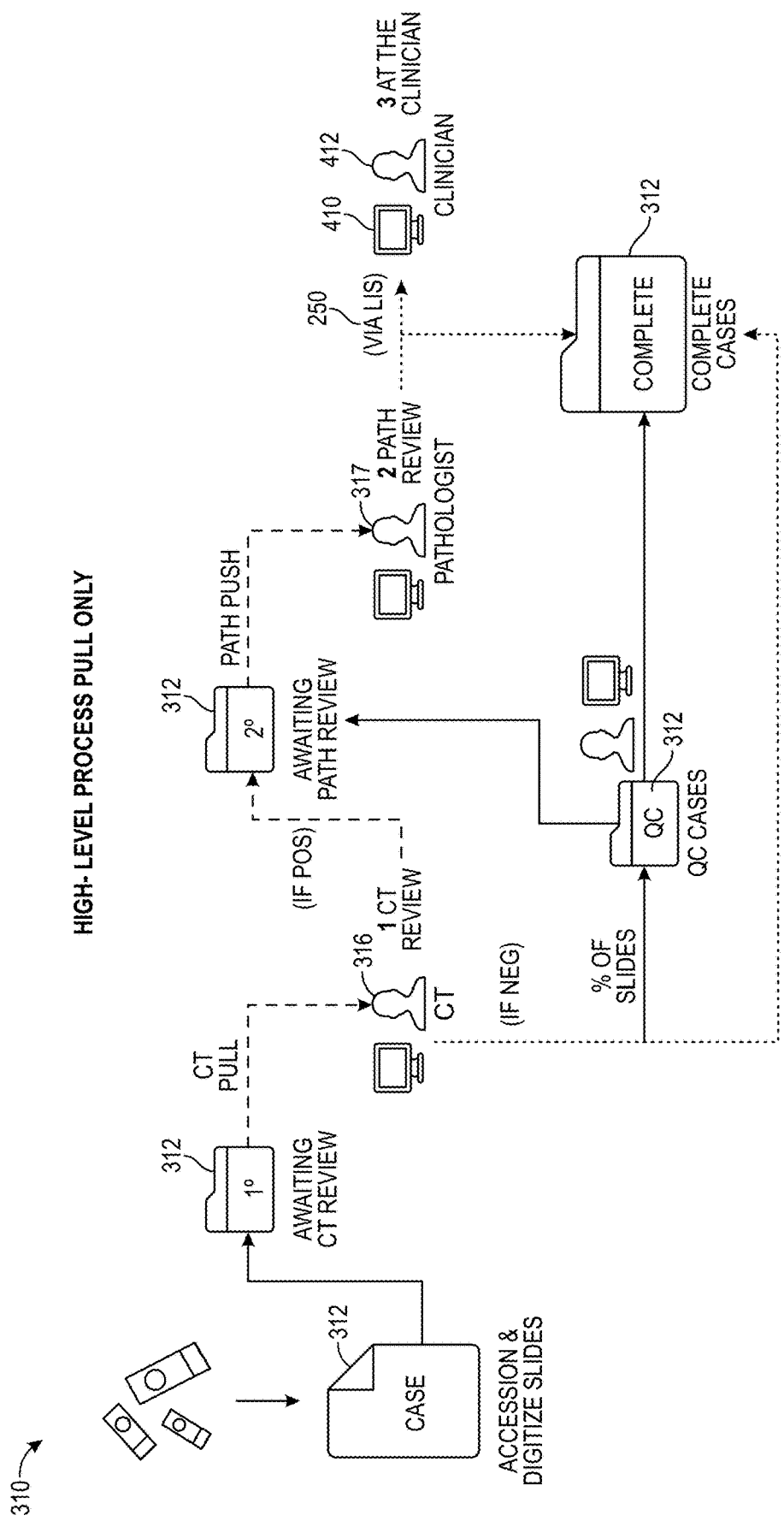
FIG. 35 is a diagram showing a workflow scenario for reviewing digital images of specimen slides, according to one embodiment.

Referring to FIG. 35, an exemplary workflow path 310 for reviewing digital images 302 of specimen slides 102 using the digital imaging display system 108 is shown. A reviewer accesses a case 312 from a plurality of cases 312 stored in a case management system (a component of the workflow subsystem administration module 314 of the workflow subsystem 106). Each case 312 includes, or is associated with, one or more SDSs 304, each having one or more digital images 302. A first reviewer 316 (e.g., a cytotechnologist) pulls up the case 312 on a digital imaging display system 108.

Figure 36:
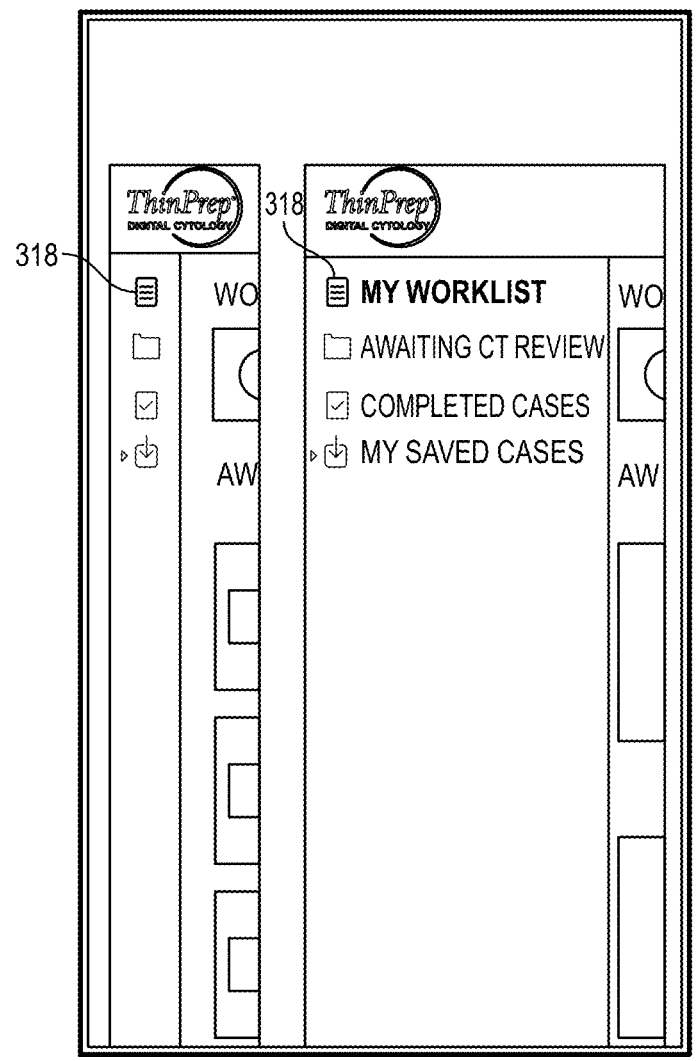
FIG. 36 is a partial view of a worklist screen displayed by the digital imaging display system during a review process, according to one embodiment.
Figure 37:
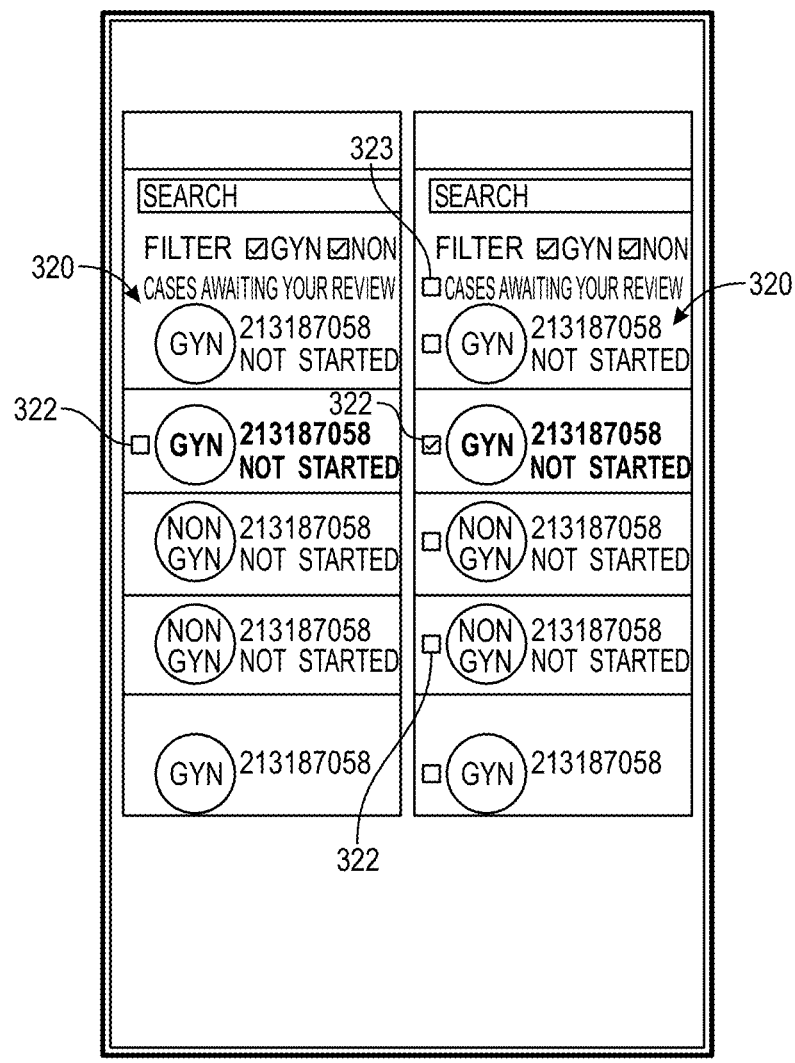
FIG. 37 is a partial view of a worklist screen displayed by the digital imaging display station selection boxes for selecting cases to review, according to one embodiment.

As shown in FIGS. 36-44, the display system 108 may display a worklist of cases 312 to be reviewed from which the first reviewer 316 may select to review. As shown in FIG. 36, the display system 108 generates and displays a navigation menu 318 on the monitor 109 of the display system 108. FIG. 36 shows that the navigation menu 318 can be collapsed to provide more space on the monitor 109 to display other information. Upon selecting any one of the selections in the navigation menu 318, the display system 108 will display a list 320 of cases 312 within that menu selection. As shown in FIG. 37, the list 320 includes check boxes 322 from which the reviewer 316 can select to review next. The list 320 also includes a "check all" box which selects all of the cases 312 in the list 320.

Figure 38:
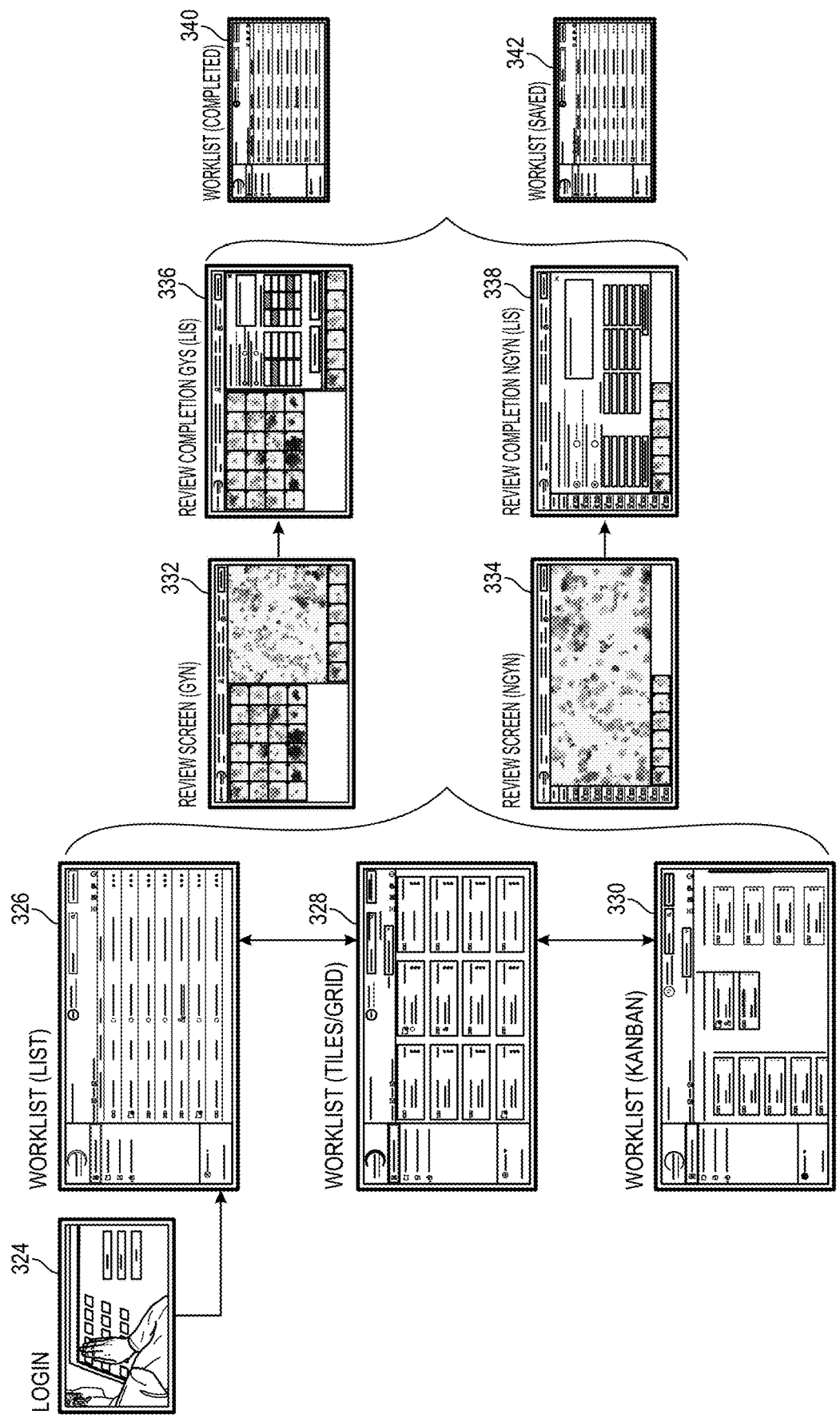
FIG. 38 is an overview showing the screens displayed by the digital imaging display station selection boxes for selecting cases to review, according to one embodiment.

FIG. 38 shows an overview of the different screens displayed by the display system 108 during use of the display system 108, including different screen options, and different screen layouts depending on the type of case 312. At the far left of FIG. 38, the display system 108 displays a login screen 324. After a user has logged in, the display system 108 displays one of the worklist screens 326, 328 or 330. The different worklist screens 326, 328, 330 have different display formats. The worklist screen 326 displays the worklist in a simplified list format having different columns for different information for each listed case 312, as shown in more detail in FIG. 40. The worklist screen 328 displays the worklist in a tile/grid format which has a 2-dimensional array of the tiles, as shown in more detail in FIG. 41. The worklist screen 330 displays the worklist in a Kanban format in which the cases 312 are displayed as tiles in separate columns depending on the status of each case, as shown in more detail in FIG. 42. After a user has selected a case 312 from one of the worklist screens, the display system 108 displays the selected case in a review screen 332 for a gynecology case (GYN) or a review screen 334 for a non-gynecology case (NGYN). A gynecology case typically includes only a single slide 102, so the review screen 332 is formatted for displaying a screen for reviewing digital images of a single slide 102. In contrast, a non-gynecology case typically includes multiple slides 102, and therefore, the review screen 334 is formatted for simultaneously displaying a screen for reviewing digital images of multiple slides 102. Accordingly, references to GYN cases throughout the description and drawings may be considered to refer to cases having single slides 102, and NGYN may be considered to refer to cases having multiple slides 102.

Still referring to FIG. 38, after a user has completed review of the review screen 332, 334, the display system 108 displays a review completion screen 336 or 338, depending on whether it is a GYN or NGYN case. After a user is finished with the review completion screen 336, 338, the display system 108 displays a worklist completed screen 340 or worklist saved screen 342. The worklist competed screen 340 displays a list of cases 312 completed by the user, and the worklist saved screen 342 displays a list of cases 312 which are in progress, meaning cases which have been started but are not yet completed.

Figure 39:
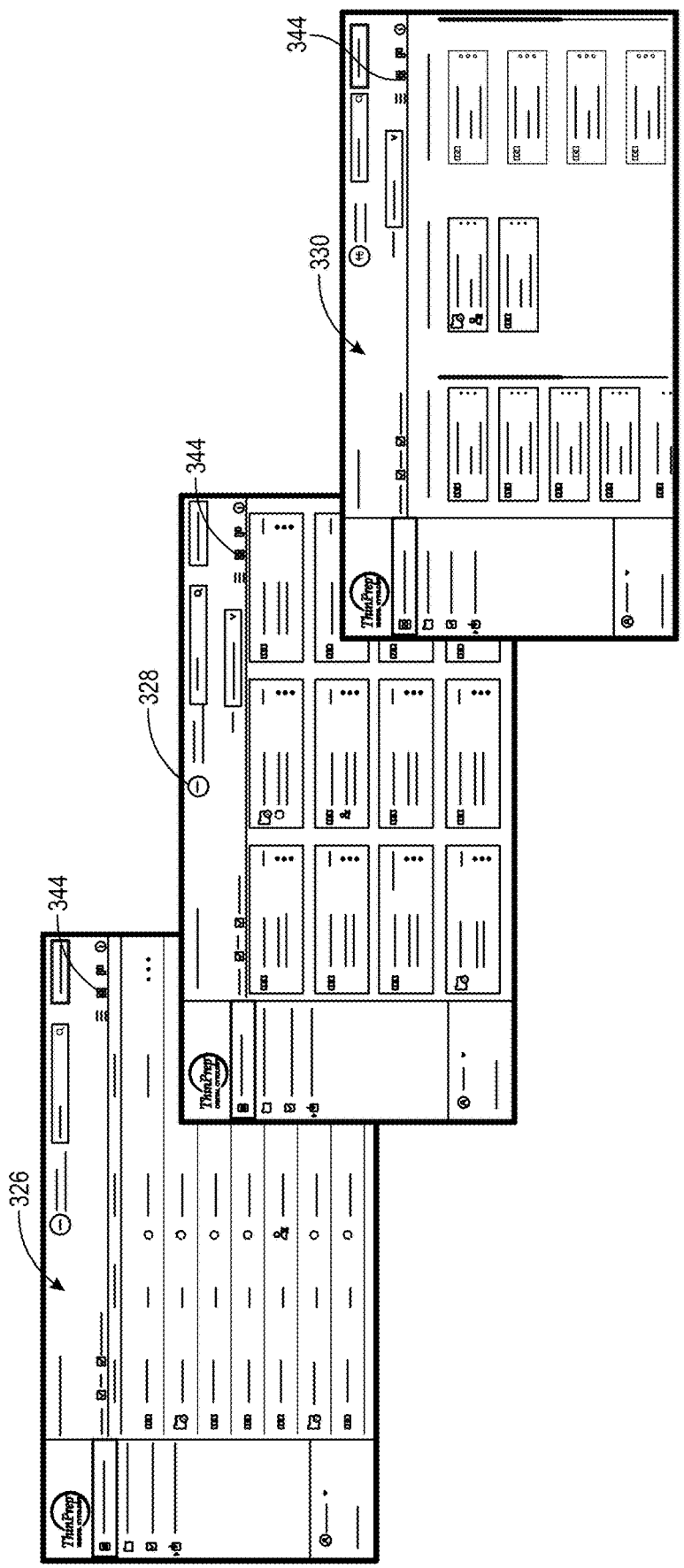
FIG. 39 depicts the ability of the digital imaging display station to toggle between different worklist screens, according to one embodiment.

FIG. 39 illustrates that the display system 108 may be configured to toggle between the different worklist screens 326, 328, 330. For example, the worklist screen 326, 328, 330 can include a worklist screen command 344 which the user can select with a cursor or other input command using an input device to instruct the display system 108 display the desired worklist screen.

Turning to FIG. 40, the worklist screen 326 is shown in detail. The worklist screen 326 shows the worklist of cases 312 for the user in a simplified listing with each case 312 in a respective row, and information about each case in different columns for the respective row. The "My Worklist" title includes a case count 351 showing the number of cases 312 in the worklist screen 326. The worklist screen 326 includes the following information columns for each case 312: slide count indicator, accession number, case type, status and deadline. The slide count indicator shows whether a case 312 has a single slide, indicated by a slide icon 352, or a plurality of slides, indicated by a file folder icon 354 showing number of slides in the case 312. The worklist screen 326 also includes a filter function 346 which causes the display system 108 to filter the cases 312 in the displayed list. The worklist screen 326 also displays a completed review counter 348 indicating the number of reviews completed by the user for the day. The worklist screen 326 also has a search box 350 which allows a user to enter a search query, in which case the display system 108 performs a search of the cases 312 for the search query. The display system 108 may be configured to search the worklist of the user, the entire database of cases 312 in the Active Storage 107, or other desired database of cases 312.

Figure 41:
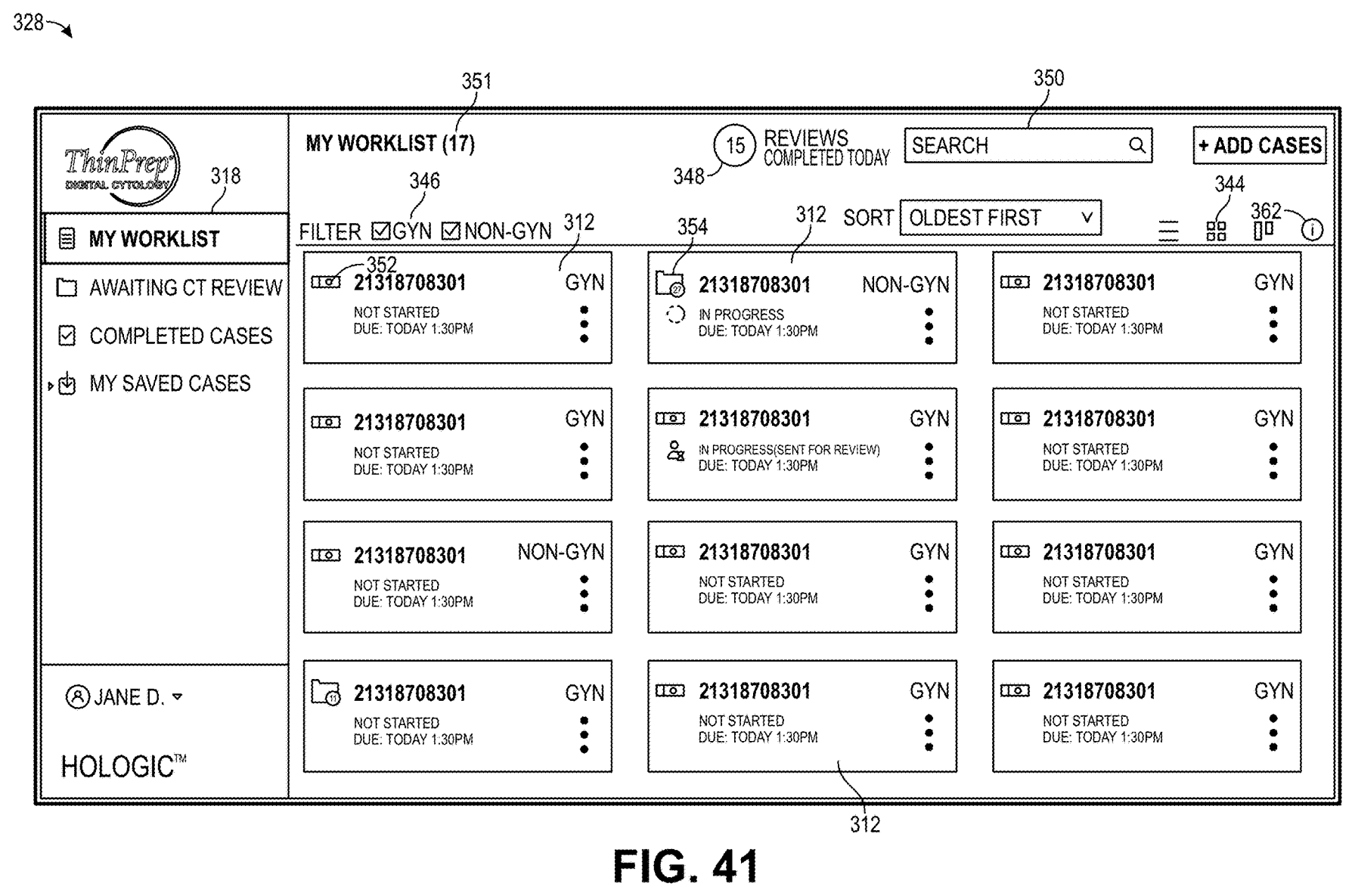

FIG. 41 shows the worklist screen 328 in more detail. The worklist screen 328 shows the worklist of cases 312 for the user in a tile/grid format. Each tile includes the same or similar information as the columns in the worklist screen 326 of FIG. 40, including slide count indicator, accession number, case type, status and deadline. The worklist screen 328 also includes the case count 351, filter function 346, completed review counter 348, and search box 350, the same as the worklist screen 326.

Figure 42:
FIG. 42 shows a worklist screen having a tiles/grid format in sorted columns displayed by the digital imaging display system, according to one embodiment.

FIG. 42 shows the worklist screen 330 in more detail. The worklist 330 shows the worklist of cases 312 for the user in Kanban format in which the cases 312 are displayed as tiles in separate columns depending on the status of each case. The tiles are substantially the same as the tiles in the worklist screen 326. The tiles are arranged in three columns, an awaiting primary review column 356, a review in progress column 358 and a primary review complete column 360. Each tile includes the same or similar information as the columns in the worklist screen 326, including slide count indicator, accession number, case type, status and deadline. The cases 312 in the primary review complete column 360 are shown in reduced contrast (e.g., greyed out) from the cases 312 in the awaiting primary review column 356, a review in progress column 358 to reduce distraction from the tasks to be competed while still allowing the user to see their progress. The worklist screen 330 also includes the case count 351, filter function 346, completed review counter 348, and search box 350, the same as the worklist screens 326, 328.

Figure 43:
FIG. 43 shows a worklist screen having a details panel displayed by the digital imaging display system, according to one embodiment.
Figure 45:
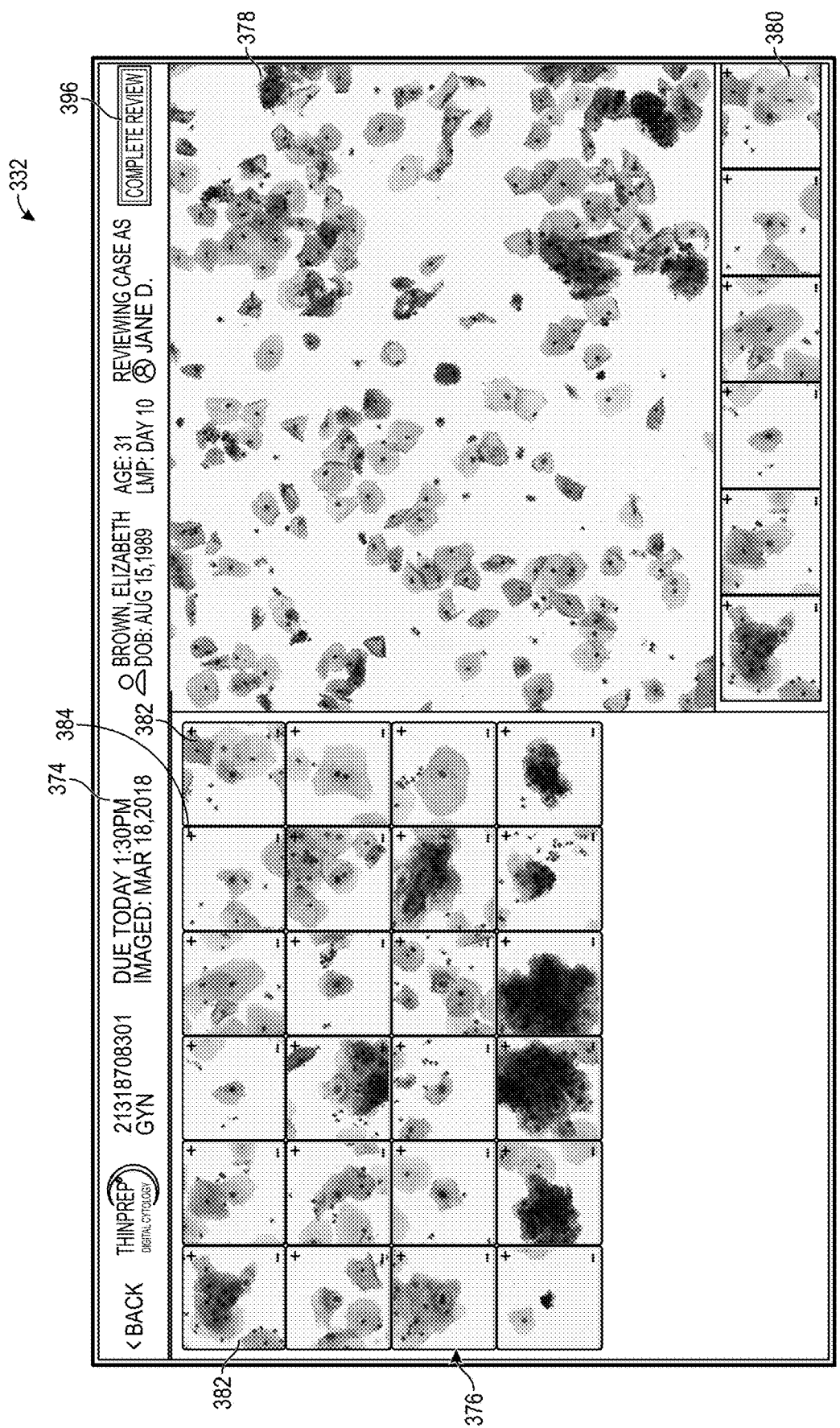
FIG. 45 shows a review screen for a GYN ("gynecology") case (single slide case) displayed by the digital imaging display system, according to one embodiment.

FIG. 43 depicts a details panel 361 that can be displayed by the display system 108 in any of the worklist screens 326, 328, 330. Although this feature is only shown for the worklist screen 326, it can be similarly used in the worklist screens 328 and 330. The worklist screen 326 includes a details button 362. When as user selects one of the cases 312 in the worklist, such as by clicking on the cases 312, the display system 108 highlights the case in the list as shown in FIG. 45. Then, when the user clicks on the details button 362, the display system 108 displays the details panel 360, which includes additional details for the selected case 312, including for example, a progress indicator 364, date of imaging 366, name of reviewer assigned the case 312, and case history 368. The width of the details panel 360 may be adjusted to make it wider or narrower, which also makes the main list narrower or wider, respectively.

FIG. 44 illustrates the use of a graphical status indicator 370 to indicate the status of the cases 312 in any of the worklist screens 326, 328, 330. The graphical status indicator 370 in FIG. 44 for a worklist screen 326 is a colored line along the left side of each row having a certain status, for example, a status of "in progress." Tiles of the worklist screens 328, 330 may similarly include a colored line or colored border to provide a convenient, easy to see, status indicator.

Referring back to FIG. 35, once the reviewer 316 chooses a case 312 from the worklist screen 326, 328, 330 to review, the reviewer 316 selects the case 312 from worklist screen 326, 328, 330. Upon receiving the selection of the case 312, the display system 108 accesses the SDS 304 for the selected case 312 from the Active Storage 107 of the workflow subsystem 106 and loads the case 312 on the display system 108. Upon loading the SDS 304 for the selected case 312, the display system 108 displays a review screen for the case 312. The review screen may differ depending on whether the selected case 312 is a GYN case or a NGYN case.

FIG. 45 shows an exemplary GYN review screen 332. The GYN review screen 332 has a case identifying panel 374 across the top of the screen. The case identifying panel 374 includes the accession number, type of case (e.g., GYN or NGYN), review deadline, imaging date, patient information (e.g., name, birthdate, age, etc.), and reviewer identification. The GYN review screen 332 has an OOI panel 376, a main image panel 378, and a reviewer selected image panel 380.

The display system 108 displays the digital image 302 for the selected case 312 in the main image panel 378. The user can zoom and pan around the digital image 302 in the main image panel 378 using commands displayed on the GYN review screen 332, and/or selectable commands using an input device of the display system 108. The display system 108 also displays the areas of the OOI images 382 when selected as described below.

The display system 108 may have a scan entire digital image function in which the system scans and displays the entire digital image 302 in the main image panel 378. The scan entire digital image function may be a selectable function having a selectable button on the review screen 332. The scan entire digital image function may allow a user to set the zoom level at which the digital image 302 is automatically scanned, such as using the zoom commands or selectable commands displayed on the review screen 332. The scan entire digital image function scans and displays the entire digital image 302 in the main image panel 378 at the selected zoom level. The scan pattern may be a serpentine pattern similar to the scan pattern for imaging a slide 102, or a row by row scan in the same direction (e.g., left to right), or a column by column scan or other suitable scan pattern. The scan entire digital image function may also include user selectable commands allowing the user to stop (i.e., pause) and start the scanning, set the stop time, set the speed of the scanning, and/or set the number of areas of the slide at which to stop (e.g., 2000 most important areas, 20 most important areas, etc.). The scan entire digital image function may also have a user selectable option to stop at every object (e.g., each cell or other object) on the digital image 302. The stop at every object option may allow the user to stop for the set stop time, or until the user selects a selectable option to continue scanning.

The OOI panel 376 includes a plurality of OOI images 382 of the areas of the digital image 302 corresponding to the OOI location data 308 for each OOI in the SDS 304. The OOI images 382 are reduced size images (zoomed out) of the digital image 302. When a user selects one of the OOI images 382, the area of the digital image 302 for the selected OOI image 382 is displayed in the main image panel 378 at a zoomed in size (i.e., enlarged compared to the OOI image 382. The user can zoom and pan around the area of the selected OOI image 382 in the same manner as described for the digital image 302 since the main image panel 378 is still displaying the digital image 302, although it has been zoomed and moved to initially display the area of the OOI image 382. The OOI images may also include a show similar command 384 on the OOI image 382, such as a "+ sign". When a user selects the show similar command 384 for a selected OOI image 382, the display system 108 displays additional OOI images 382 which have a characteristic that is similar to the selected OOI image 382. For instance, the display system 108 may show 3 to 6 additional OOI images 382 which are included in the SDS as being similar to the selected OOI image 382. The additional OOI images 382 include an object, such as a cell, which shares one or more characteristics with an object in the selected OOI image 382. The one or more additional OOI images 382 may be obtained from the same whole specimen digital image 302 or from a library of image containing previously classified objects that share one or more characteristics with an object in the selected OOI image 382.

The reviewer selected image panel 380 is an area of the GYN review screen 332 in which the reviewer 316 can place one or more OOI images 382 or other images which the reviewer adds as an OOI or any other image/location on the digital image 302 which the reviewer selects as being of particular interest. For instance, the OOI images 382 may be selected for review by a second reviewer 317, such as a pathologist.

Figure 46:
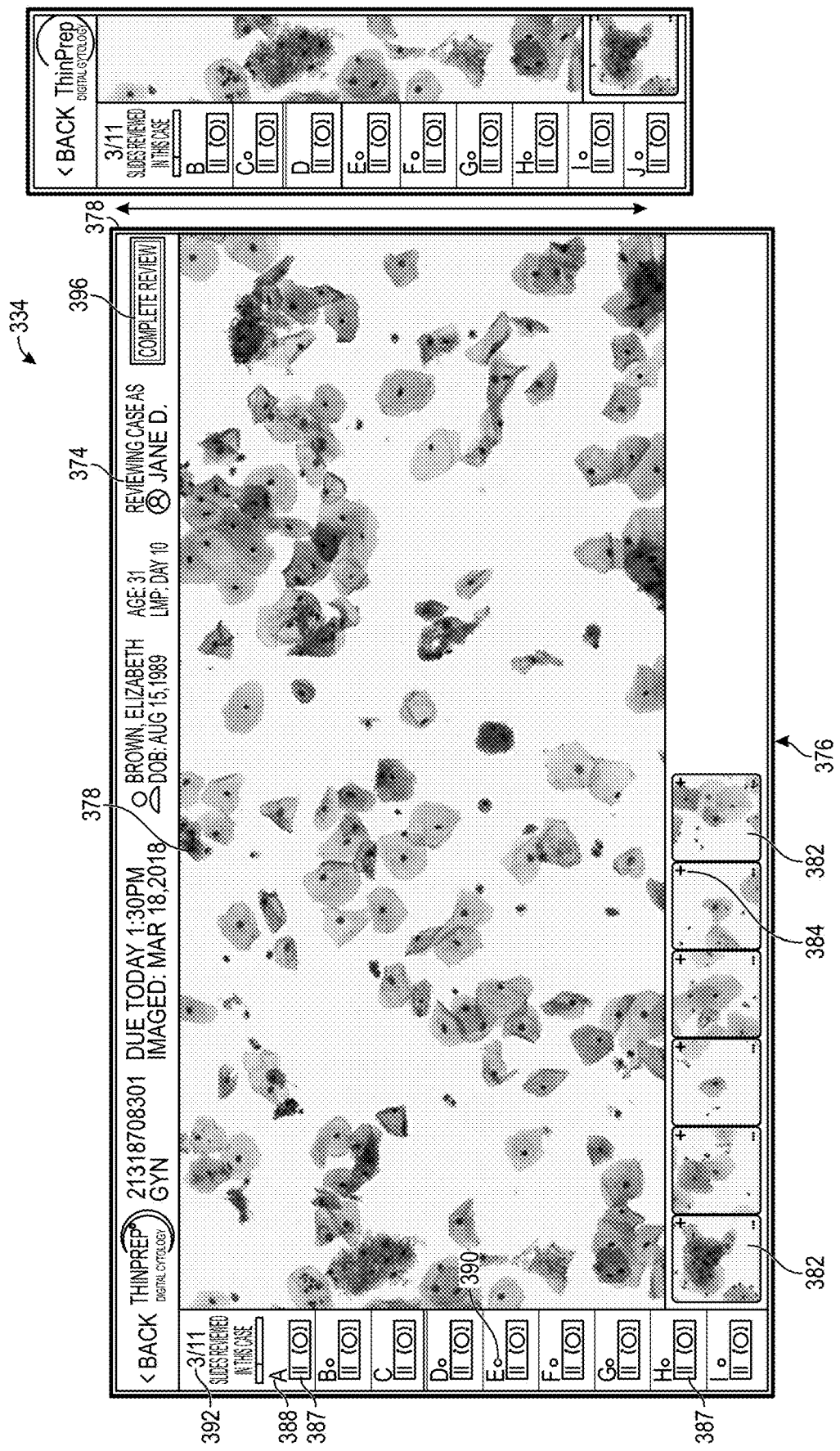
FIG. 46 shows a review screen for an NGYN ("non-gynecology") case (multiple slide case) displayed by the digital imaging display system, according to one embodiment.

FIG. 46 shows an exemplary NGYN review screen 334. As explained herein, the main difference between a GYN case and an NGYN case 312 is that the GYN case includes a digital image 302 for a single slide 102, while a NGYN case 312 includes a digital image 302 for each of multiple slides associated with the case. The NGYN review screen 334 has many of the same features as the GYN review screen 332, such as a main image panel 378 and a reviewer selected image panel 380.

In addition, the NGYN review screen 334 has a slide list 388 showing list of each of the slides 102 for which the NGYN case 312 has a digital image 302. Each slide 102 in the NGYN case 312 is represented by a slide icon 387 in the slide list 388 with an identifier such as a letter or number. When a reviewer selects a slide 102 in the slide list 388, the display system 108 displays the digital image 302 for the selected slide 102 in the main image panel 378. The selected slide 102 may be highlighted in the slide list 388 to indicate that it is the currently displayed slide 102. The display system 108 allows the reviewer to interact with the digital image 302 in the same manner as with a GYN case 312, as described above. The reviewer may select each of the slides 102 in the slide list 388, and the display system 108 repeats the display process for each of the slides 102. The NGYN review screen 334 may also include a slide count 392 which indicates the number of slides in the NGYN case 312 reviewed and the total number of slides in the NGYN case 312.

Figure 47:
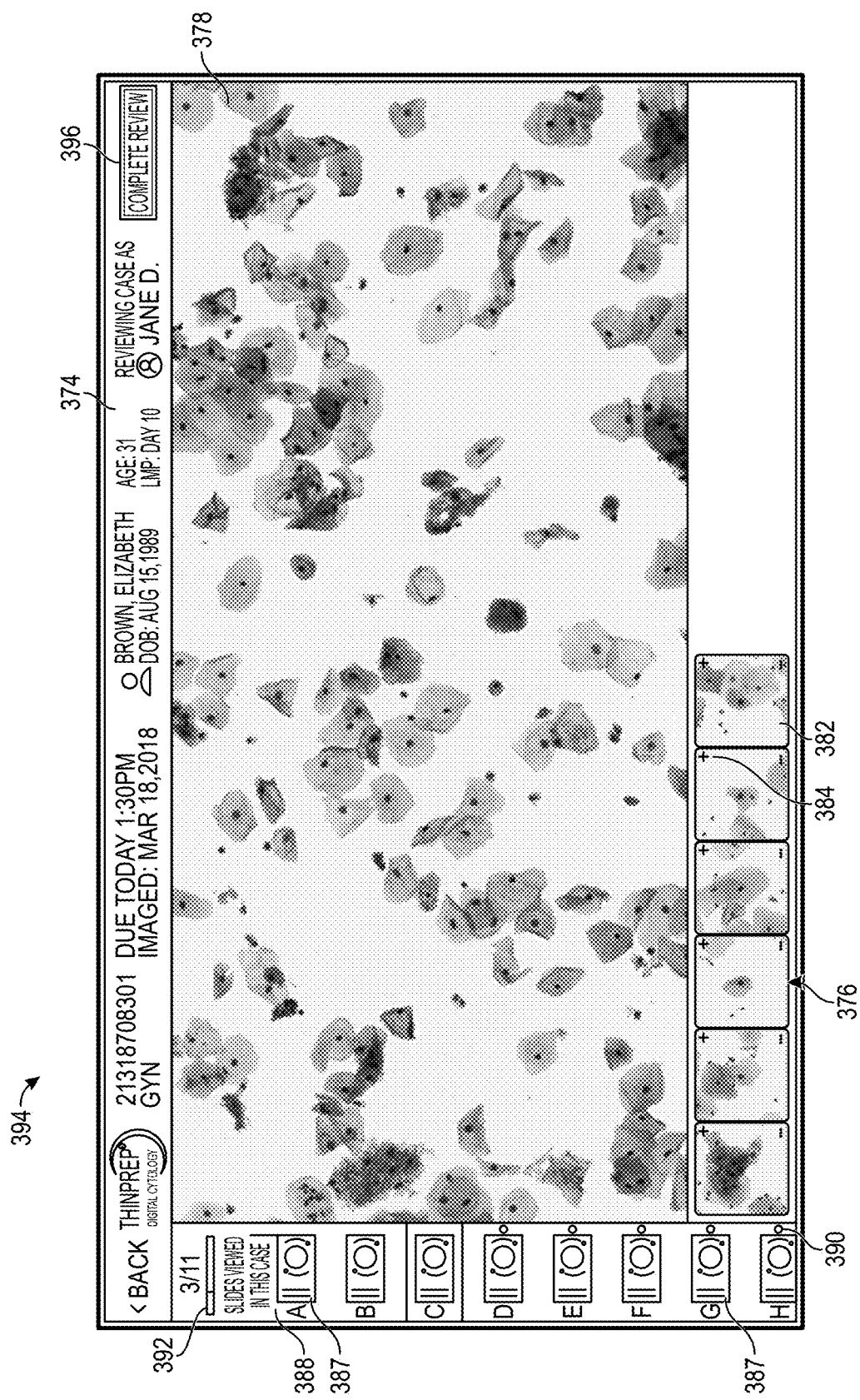
FIG. 47 shows another review screen for an NGYN case (multiple slide case) displayed by the digital imaging display system, according to one embodiment.

FIG. 47 shows another example of an NGYN review screen 394 which is the same as the NGYN review screen 334, except that the slide list 388 is wider and the slide icons 387 are larger in order to better show each of the individual slides 102.

Any of the review screens, including the GYN review screen 332 and the NGYN review screen 334, 394, may also display other data from the SDS of the digital image 302 being displayed on the review screen. The review screen may display the determined characteristics for one or more of the OOI. The review screen may include a selectable option (similar to the "+ sign" described above) in each of the OOI images 382 which when selected shows the determined characteristics for the OOI image 382. The determined characteristics may be displayed in a pop-up window. The review screen may also display the machine learning characterization/diagnosis associated with an OOI image 382. The review screen may include a selectable option in each of the OOI images 382 which can be selected to show the characterization/diagnosis for the OOI image 382, such as in a pop-up window. The review screen may also display the slide statistics from the SDS 304. The display of the slide statistics may be in response to a selectable option which displays the slide statistics in a pop-up window, or the slide statistics may be automatically displayed in the case identifying panel 374, or elsewhere on the review screen.

FIGS. 58-61 show review screens having additional functionality, such as adding comments to the OOI images 382 and/or digital images 302, sharing a screen, and bookmarking OOI images 382 and/or digital images 302. It is to be understood that any one or more of these additional functions and graphical user interfaces may be included in any of the review screens shown in the figures and described herein.

Figure 58:
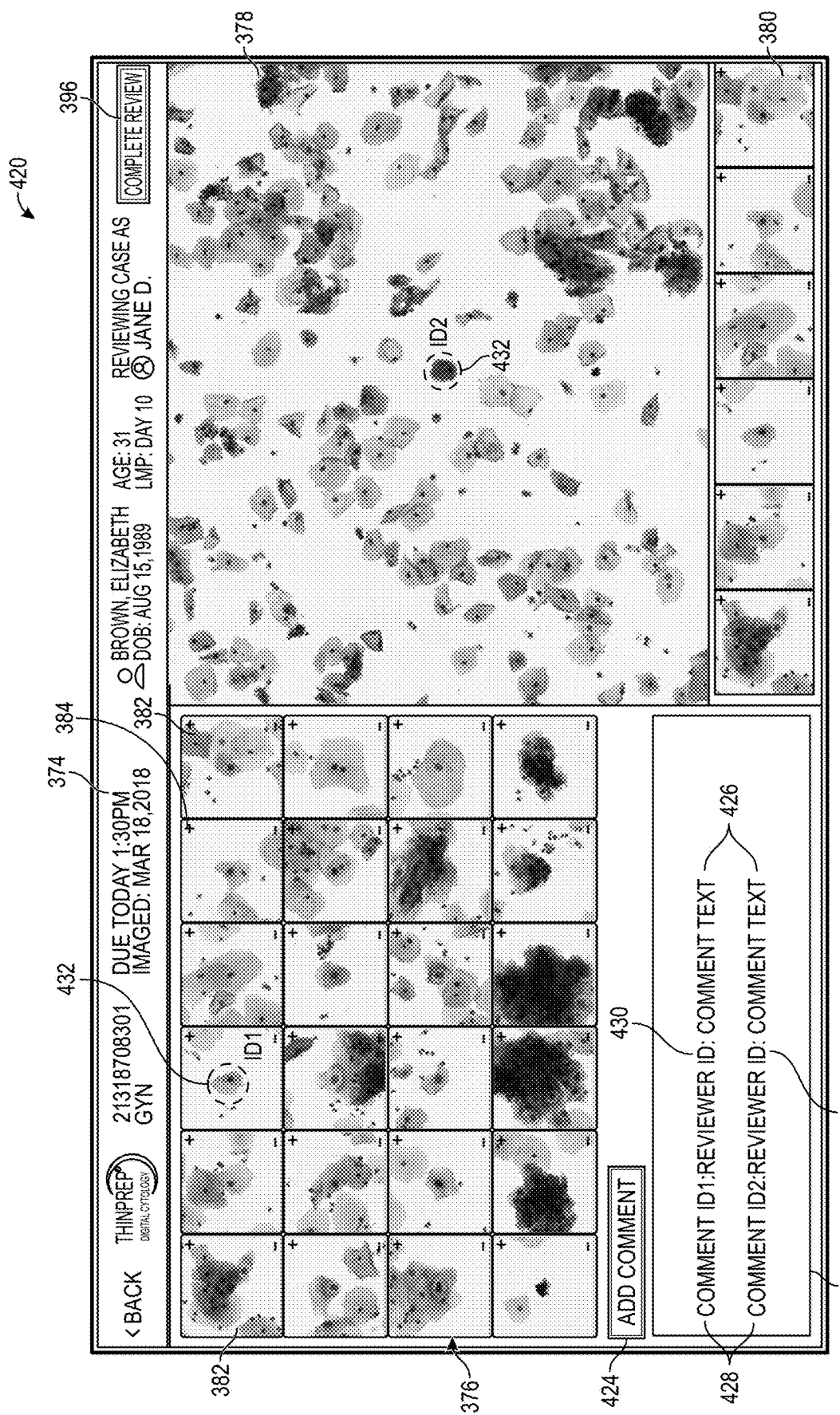
FIG. 58 shows another review screen configured to allow the reviewer to add comments and/or to mark/draw on the images, according to one embodiment.

FIG. 58 illustrates an exemplary GYN review screen 420 which is configured to allow the reviewer to add comments and/or to mark/draw on the OOI images 382 and/or the digital image 102. The review screen 420 is similar to the review screen 332 of FIG. 45 and has most of the same features. As shown in FIG. 58, the review screen 420 includes a comment panel 422. The review screen 420 has an add comment command 424. When the reviewer selects the add comment command 424, the review screen 420 allows the reviewer to make a selection of a comment area 432 of an OOI image 382 in the OOI panel 376 or on an OOI image 382 or digital image 302 displayed in the main image panel 378. The reviewer may then add a text comment 426 in the comment panel 422. In this way, the reviewer can make comments directed to specific object(s) on an OOI image 382 or digital image 302. The comment panel 422 displays a comment ID 428 (e.g., a number or letter), a reviewer ID 430 (e.g., the name of the review or other identifier for the reviewer), and the comment text 426. The reviewer can add additional comments by selecting the add comment command 424 and repeating the process. The comments, including the comment text 426, comment area 432, comment ID 428, and reviewer ID 430 are stored in the SDS 304 for the respective slide 102. The comment panel 422 allows other reviewers to review the comments of previous reviewer(s) and to add additional comments using the same process. The comments of other reviewers have different comment ID's 428 and/or reviewer ID's 430. The reviewer can add overall slide level comments by skipping the comment area selection and simply including a text comment 426 within the comment panel 422. Alternatively, the review screen 420 may include a separate overall slide level comment panel similar to the comment panel 422.

Figure 59:
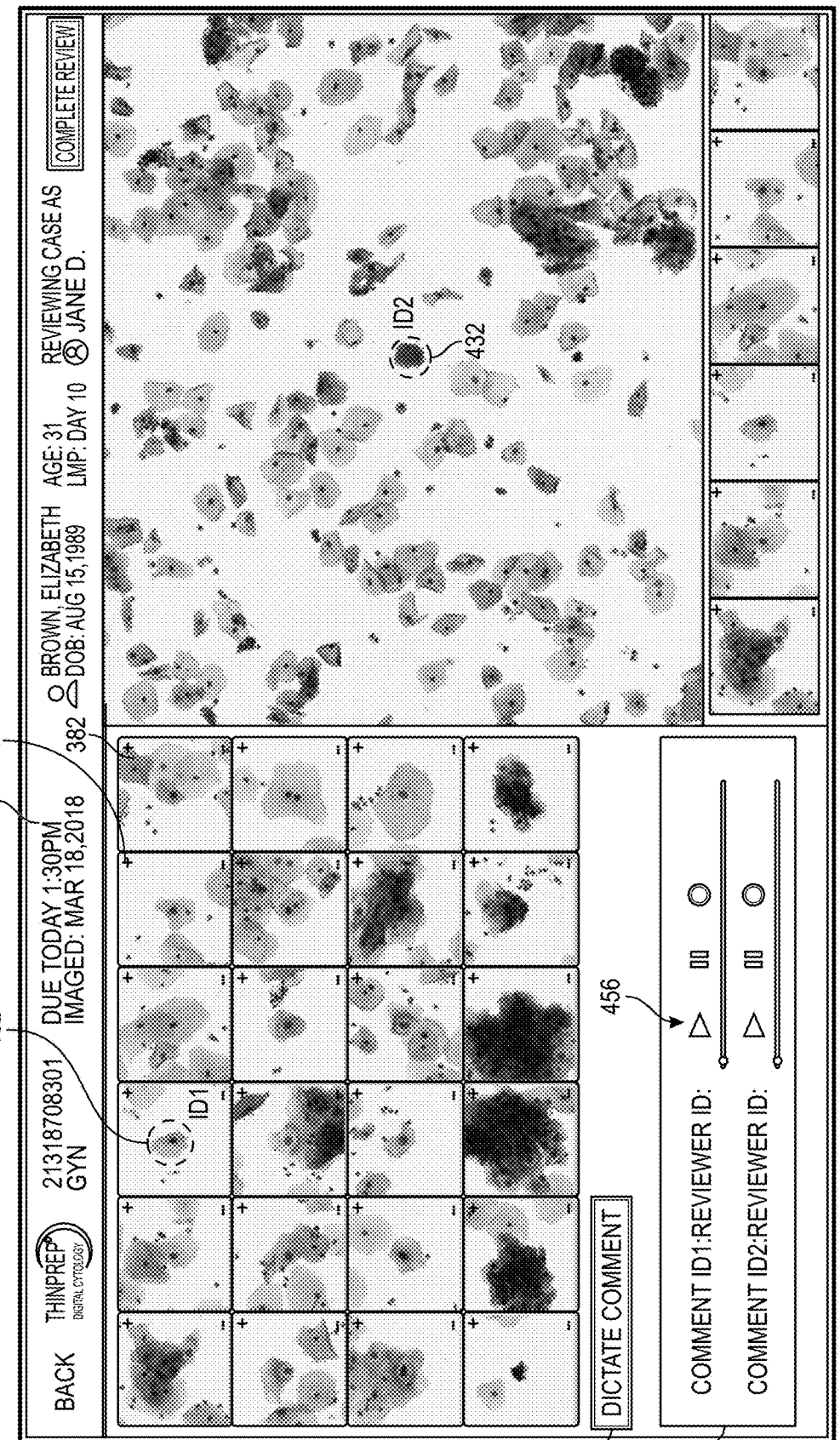
FIG. 59 shows another review screen configured to allow the reviewer to add recorded audio comments to a case for a digital image, according to one embodiment.

FIG. 59 shows an exemplary GYN review screen 450 which is configured to allow the reviewer to add recorded audio comments (e.g., a dictated comment) to a case 312 for a digital image 102 and/or to mark/draw on the OOI images 382 and/or the digital image 102. The review screen 450 is similar to the review screen 332 of FIG. 45 and has most of the same features. As shown in FIG. 59, the review screen 450 includes a dictate comment command 452. When the reviewer selects the dictate comment command 452, the review screen 450 allows the reviewer to record a dictated comment. For instance, the review screen 450 displays a dictate comment window 454. The dictate comment window 454 includes a dictation control bar 456. The dictation control bar 456 has a record button 458, a play button 458, a pause button 460, and a navigation slide 462. The record button 458 starts recording an audio comment. The play button 458 plays the audio comment. The pause button 460 pauses either recording or playback. The navigation slide 462 allows the reviewer to go forward and backward within a recorded comment. The dictate comment command 452 may also allow the reviewer to mark a comment area 432, similar to the review screen 420. Hence, the reviewer can make comments directed to specific object(s) on an OOI image 382 or digital image 302. The dictate comment window 454 displays a comment ID 428 (e.g., a number or letter), a reviewer ID 430 (e.g., the name of the review or other identifier for the reviewer), and the dictation control bar 456, for each audio comment. The reviewer can add additional dictated comments by selecting the dictate comment command 452 and repeating the process. The audio comments, including the recorded audio, comment area 432, comment ID 428, and reviewer ID 430 are stored in the SDS 304 for the respective slide 102. The dictate comment window 454 allows other reviewers to play the audio comments of previous reviewer(s) and to add additional audio comments using the same process. The comments of other reviewers have different comment ID's 428 and reviewer ID's 430.

Figure 60:
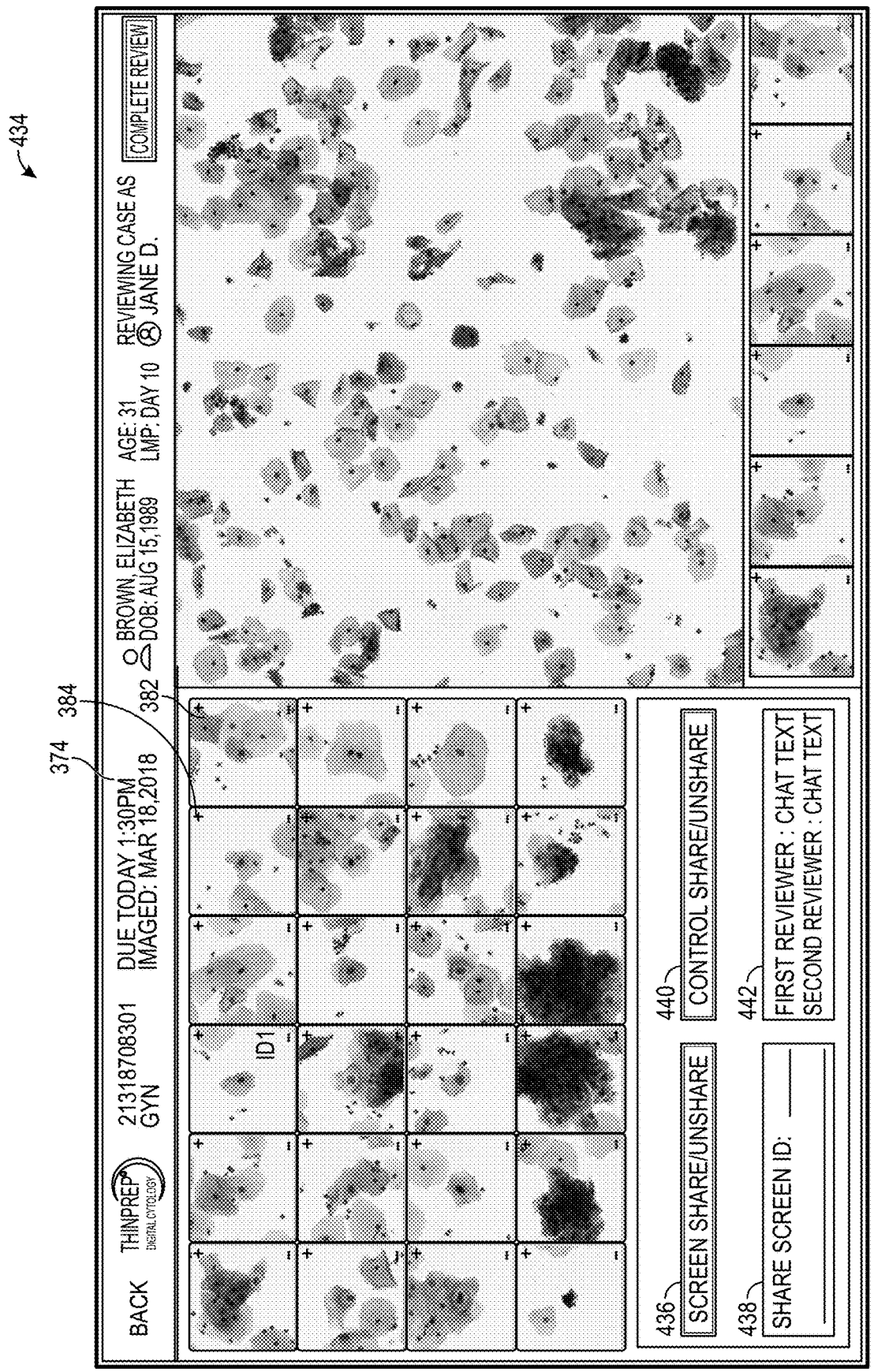
FIG. 60 shows another review screen configured to allow a first reviewer to share the first reviewer's screen with a second reviewer on a different display system 108, and to allow the first reviewer to give control to the second reviewer to control the review screen 434 on the first reviewer's screen, according to one embodiment.

FIG. 60 shows an exemplary GYN review screen 434 which is configured to allow a first reviewer to share the first reviewer's screen with a second reviewer on a different display system 108, and to allow the first reviewer to give control to the second reviewer to control the review screen 434 on the first reviewer's screen. In other words, the second reviewer's display system 108 displays the same review screen 434 being displayed on the first reviewer's display system 108, and the second reviewer controls the review screen 434 on the first reviewer's screen using the second reviewer's display system 108. The review screen 434 has a share screen command 436. When the first reviewer selects the share screen command 436, the review screen 434 displays a share screen window 438, such as a pop-up window. The share screen window 438 requests a share screen ID of the second reviewer. The first reviewer enters a share screen ID of the second reviewer (e.g., a name, number, code, etc.) and hits enter to transmit the share screen ID to the workflow subsystem 106. The workflow subsystem 106 verifies the share screen ID, and then shares the review screen 434 from the first reviewer's display system 108 with the second reviewer's display system 108. The review screen 434 also has a share control command 440 which allows the first reviewer to pass control of the review screen 434 to the second reviewer. The share screen command 436 may be a toggle command which allows the first reviewer to share and unshare the review screen 434 by selecting the command 436. Similarly, the share control command 440 may be a toggle command which allows the first reviewer to share and unshare control of the review screen 434. Selection of the share screen command 436 may also enable a chat window 442, which can be displayed in any open space on the review screen 434, or in a movable pop-up window. The chat window 442 allows the first reviewer and second reviewer to text chat in the chat window 442. In addition, the review screen 434, via the workflow subsystem can enable an audio or audio/video communication connection between the first reviewer and the second reviewer allowing audio or audio/video communication between the reviewers. In addition, the review screen 434 can be configured to allow additional reviewers to share the review screen 434 of the first reviewer by repeating the share command for the additional reviewers.

Figure 61:
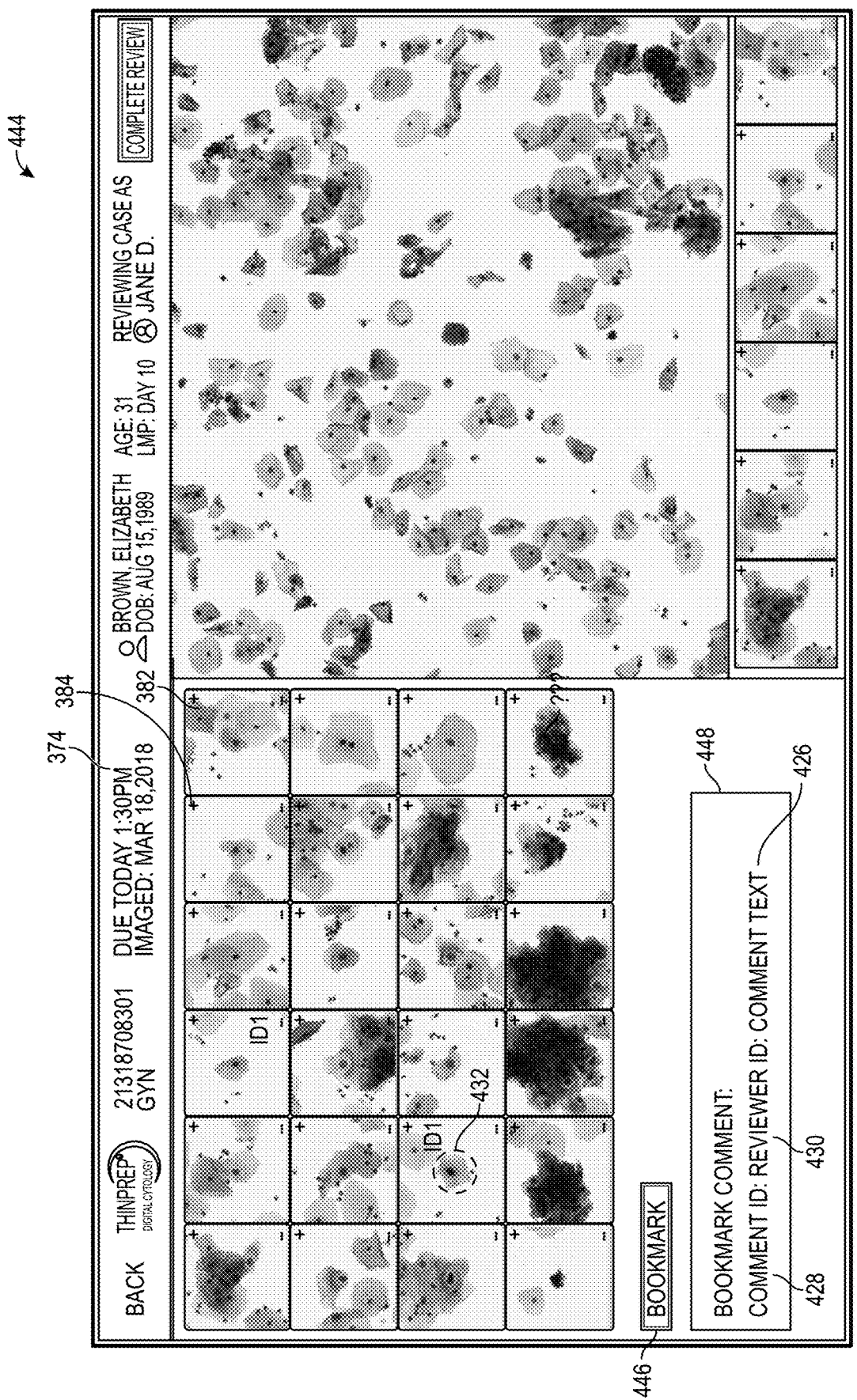
FIG. 61 shows another review screen configured to allow the reviewer to bookmark a case for a digital image, according to one embodiment.

FIG. 61 shows an exemplary GYN review screen 444 which is configured to allow the reviewer to bookmark the case 312 for the digital image 302, for example, to create a reference library of interesting cases 312 and digital images 302. The review screen 444 is similar to the review screen 332 of FIG. 45 and has most of the same features. As shown in FIG. 61, the review screen 444 has a bookmark command 446. When the reviewer selects the bookmark command 446, the review screen 444 displays a bookmark comment window 448 which allows the reviewer to enter a comment. For instance, the reviewer may enter comment text 426 as to why the reviewer bookmarked the case 312 as being of interest. The bookmark command 446 may also allow the reviewer to mark a comment area 432, similar to the review screen 420. The bookmark comment window may include a comment ID 428 and reviewer ID 430, also similar to the review screen 420. In addition, a bookmark record is also recorded in the SDS 304 for the digital image 302, including the comment text 426, comment ID 428, reviewer ID, and comment area 432. The workflow subsystem 106 earmarks the bookmarked case 312 for a reference library, such as a reference library of interesting cases.

After a reviewer has selected and reviewed a slide 102 in the slide list 388, the display system 108 provides a visual indicator 390 indicating that the respective slide 102 has been reviewed. For example, the slide list 388 shown in FIG. 48 includes a dot 390 above each slide icon 387 in the slide list 388. The dot 390 indicates whether the respective slide 102 has been reviewed by the reviewer.

Figure 57:
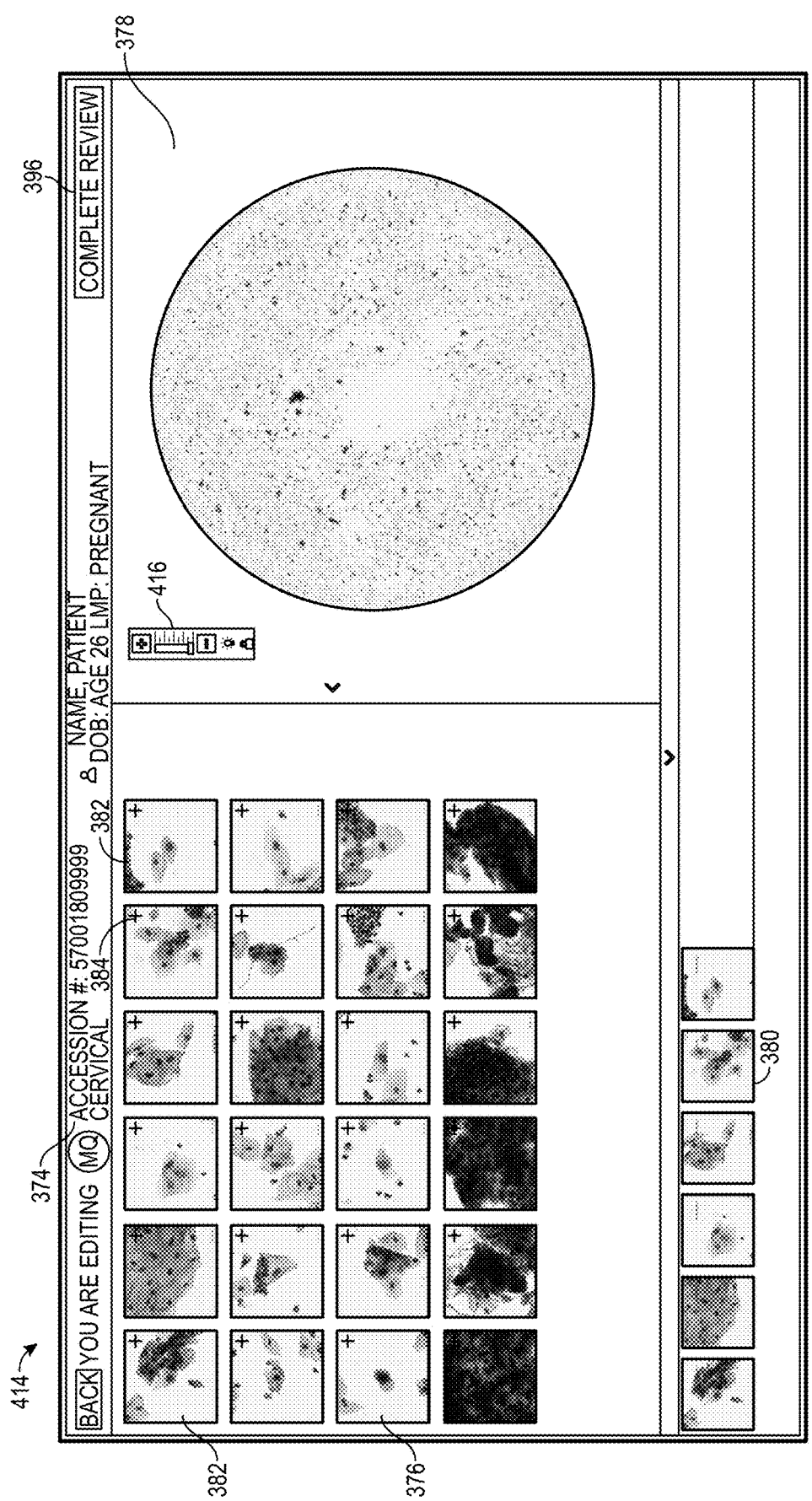
FIG. 57 shows another review screen displaying a digital image of an entire specimen area as displayed by the digital imaging display system, according to one embodiment.

FIG. 57 shows still another example of a review screen 414 which is similar to the review screen 332 of FIG. 45 and has most of the same features. The main difference is that review screen 414 shows the whole specimen area of the digital image 302 in the main image panel 378. In other words, the image in the main image panel 378 is fully zoomed out to show the entire digital image 302. The review screen 414 also has a zoom slider 416 which adjusts the zoom of the image in the main image panel 378. Any of the other review screens 332, 334, and 394 may also display the entire digital image 302 fully zoomed out in the main image panel 378 and may also include the zoom slider 416.

Figure 48:
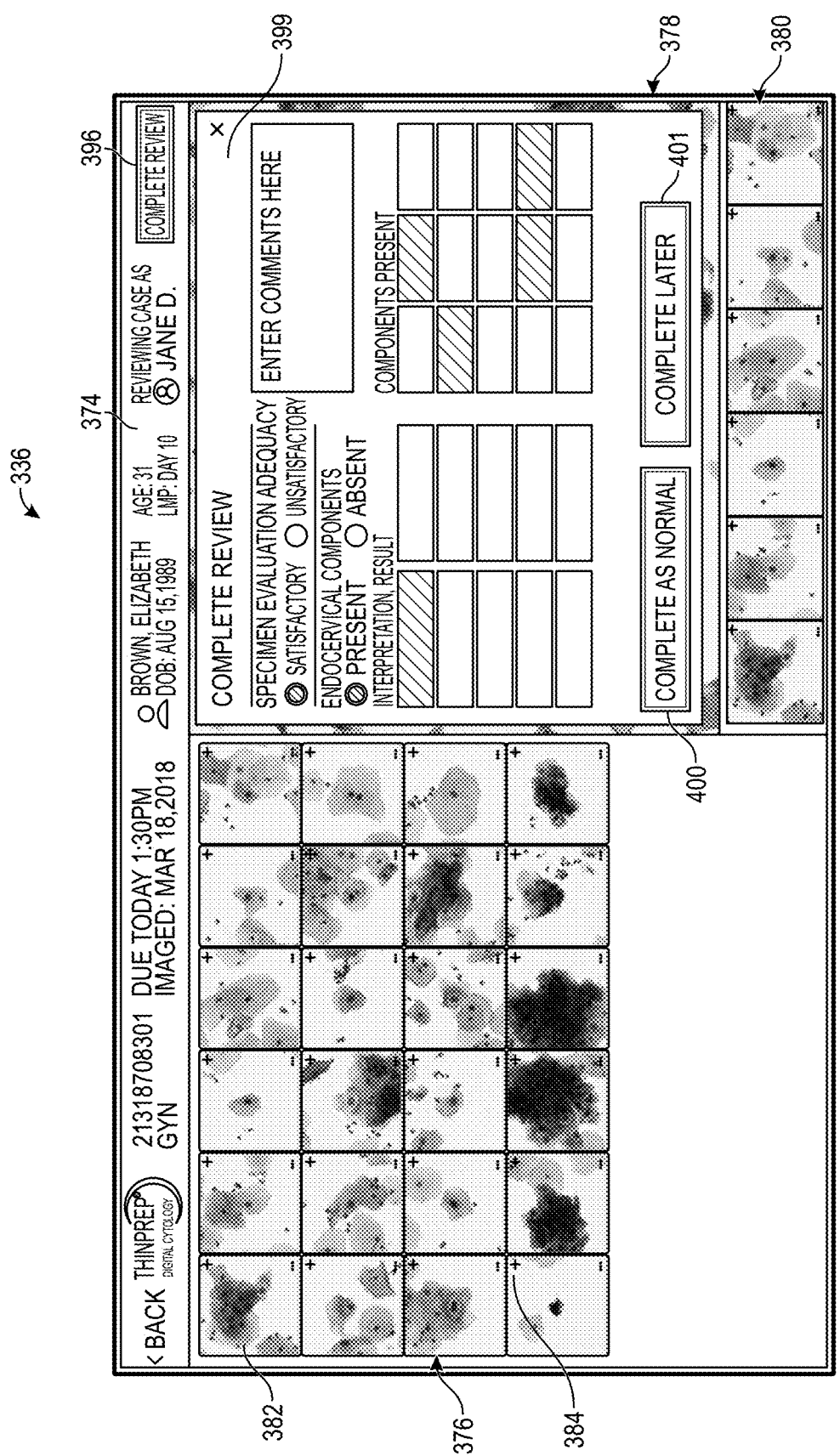
FIG. 48 shows a completion screen for a normal GYN case (single slide case) displayed by the digital imaging display system, according to one embodiment.

After a reviewer 316 has reviewed a case 312, the reviewer 316 selects the complete review command 396 on the review screen 332, 334, 394 (see FIGS. 45-47). Upon receiving the complete review command 396, the display system 108 displays a completion screen. FIG. 48 shows an example of a completion screen 336 for a GYN case 312 in the event that the reviewer 316 determines, as a result of the review. that the specimen is normal. The completion screen 336 may include the same features as the GYN review screen 332, and a completion frame 399 displayed over the main image panel 378. The reviewer 316 selects the complete as normal command 400. Upon receiving the complete as normal command, the display system 108 sends a complete as normal signal to the workflow subsystem 106 to update the case 312 determined to be normal. As shown in the workflow diagram of FIG. 35, the selected case 312 is then flagged to be filed as a completed case, or to be routed to quality control. A percentage of reviewed cases completed as normal by the first reviewer 316 are sent to quality control to be reviewed by another reviewer as a quality control check. The quality control check may determine if a reviewer 316 has incorrectly completed one or more cases 312 as normal.

The completion frame 399 also includes a complete later command 401 in case the reviewer 316 does not complete the review of the selected case 312. Upon receiving the complete later command 401, the display system 108 marks the case 312 as in progress and leaves the case in the reviewer's worklist as an in progress case.

Figure 49:
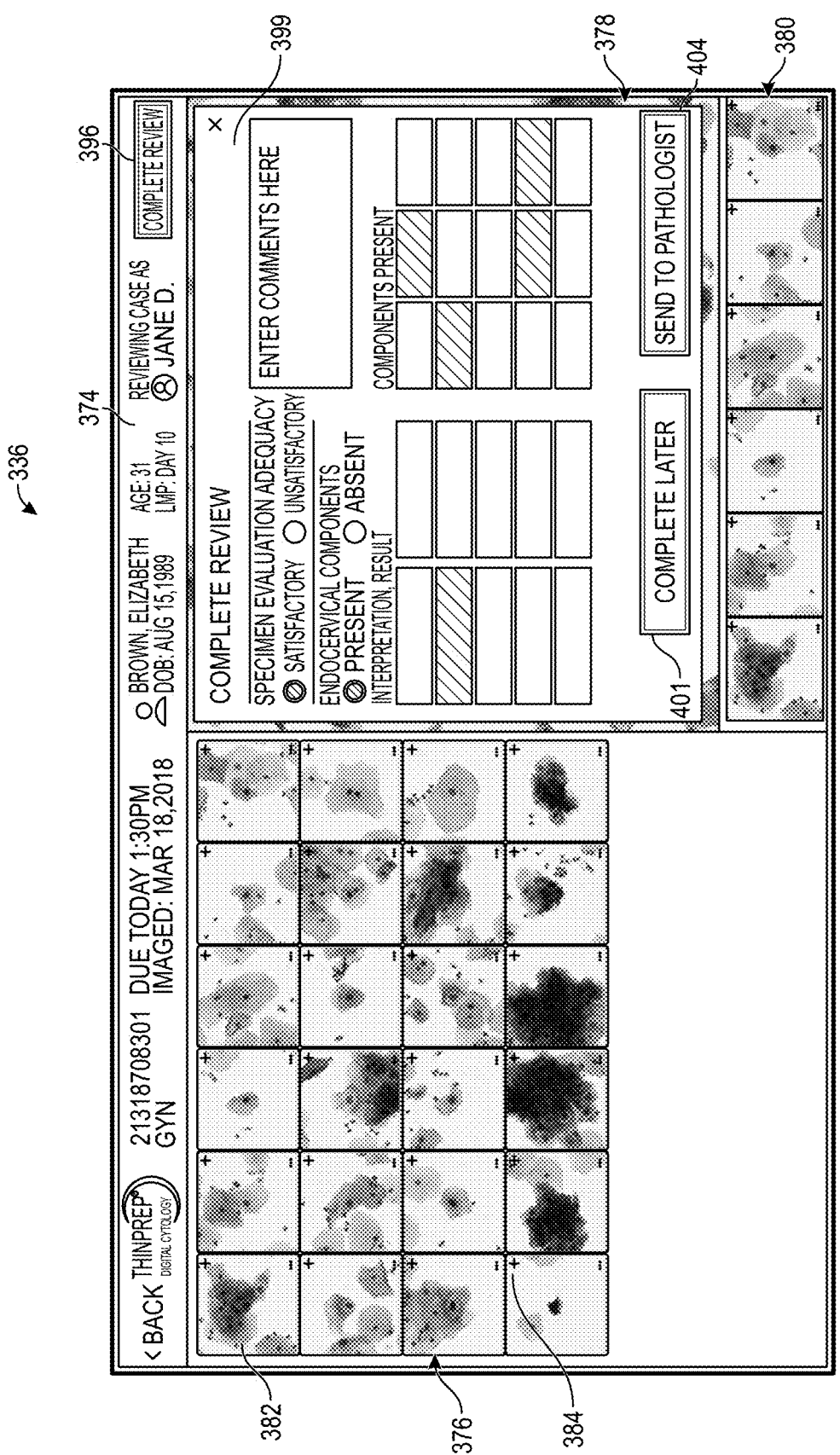
FIG. 49 shows a completion screen for an abnormal GYN case (single slide case) displayed by the digital imaging display system, according to one embodiment.

FIG. 49 shows an example of a completion screen 336 for a GYN case 312 in the event that the reviewer 316 determines, as a result of the review, that the specimen is abnormal. The completion screen 336 may include the same features as the GYN review screen 332, and the completion frame 399 displayed over the main image panel 378. In the case of determining the specimen slide 102 has an abnormality, the first reviewer 316 selects the send to pathologist command 404. The case 312 is then scheduled for review by a pathologist 317 by the workflow subsystem 106, as shown in the workflow diagrams of FIGS. 35 and 52-54. As shown in FIG. 35, the pathologist may then log into the display system 108 and the display system 108 displays the worklist screen(s), review screen(s) and completion screen(s), allowing the pathologist to select, review and disposition a case in basically the same manner as the first reviewer 316.

Figure 50:
FIG. 50 shows a worklist screen after completion of a case displayed by the digital imaging display system, according to one embodiment.
Figure 51:
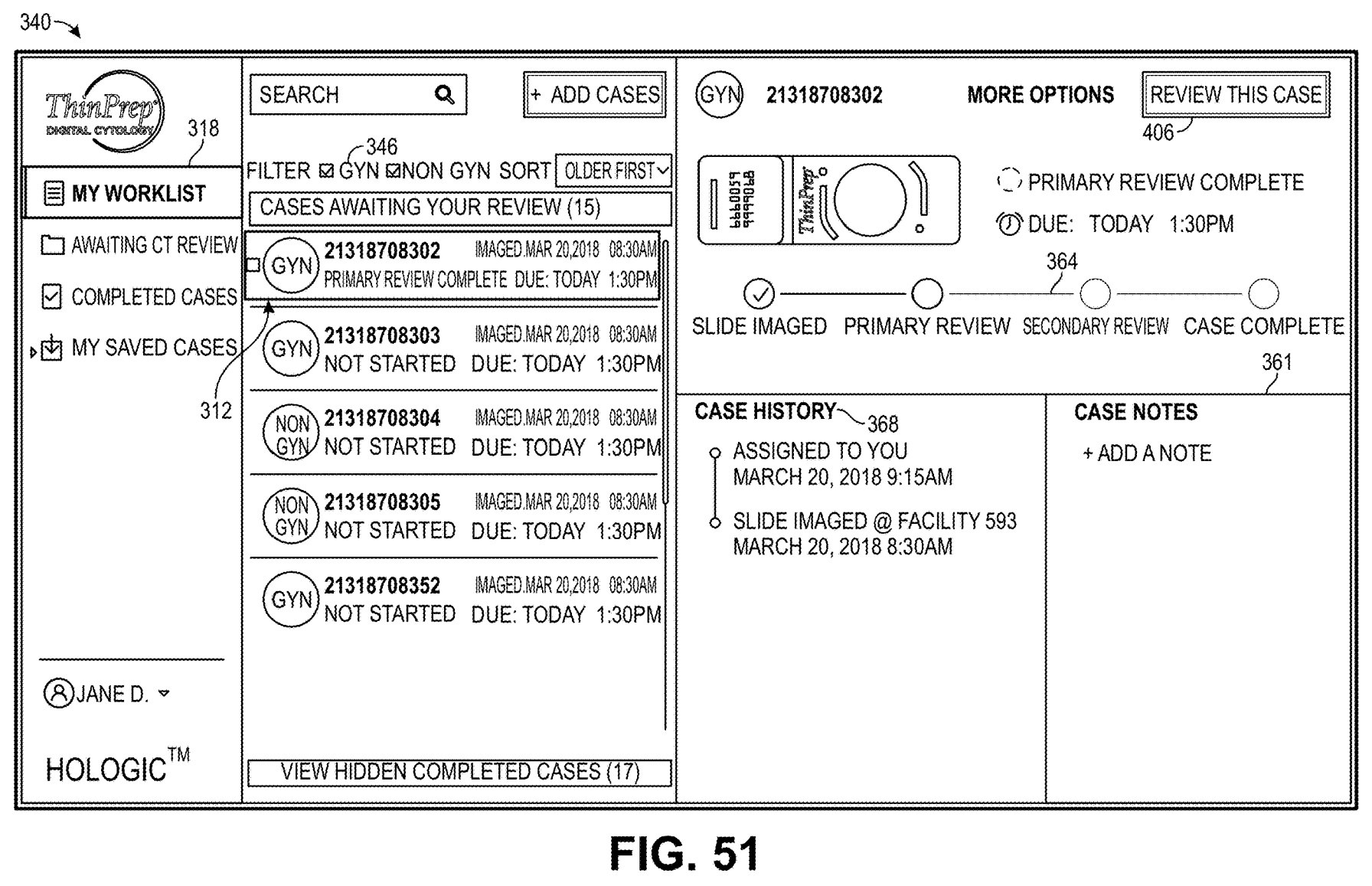
Figure 52:
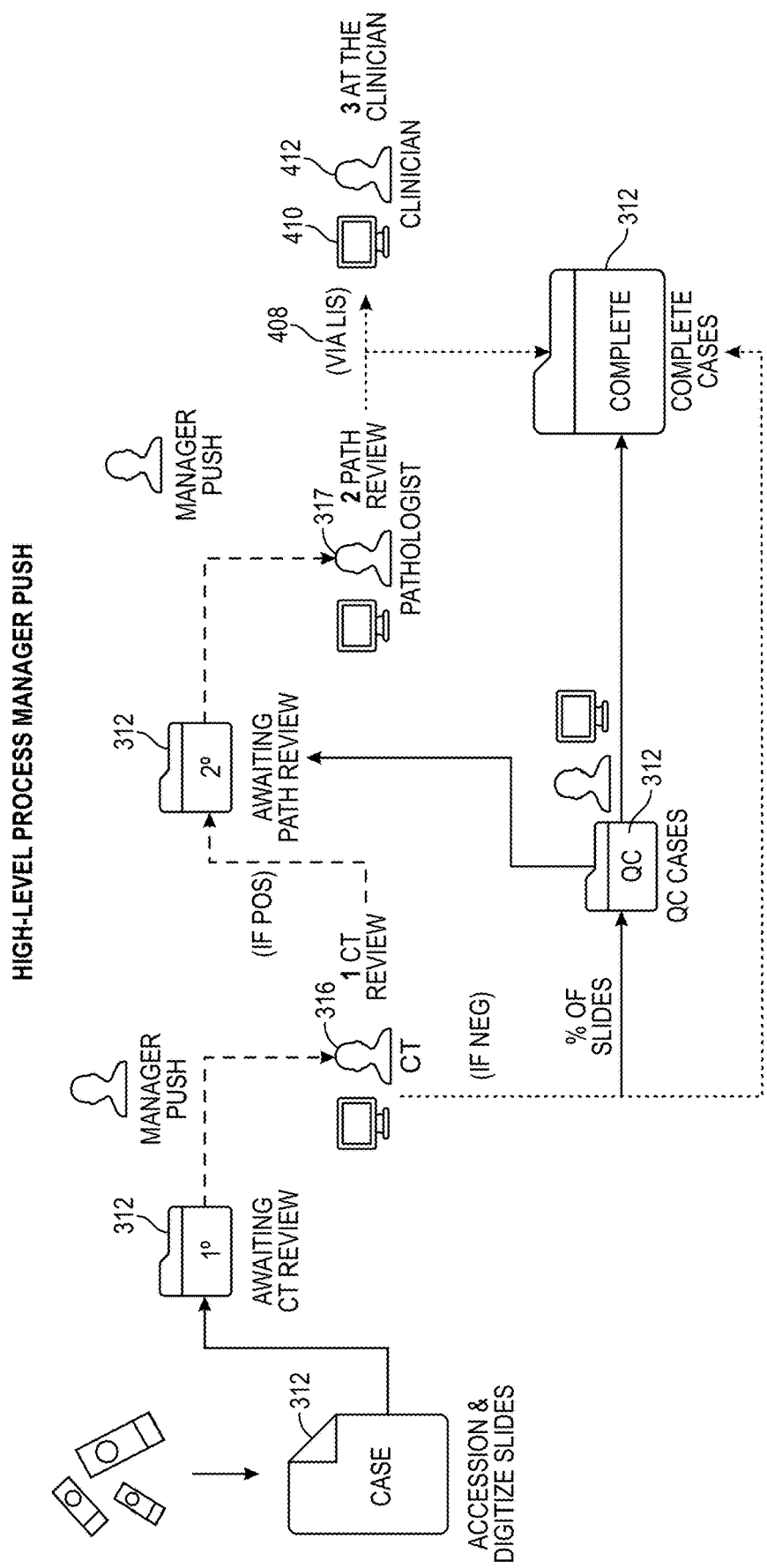
FIG. 52 is a diagram showing another workflow scenario for reviewing digital images of specimen slides, according to one embodiment.
Figure 53:
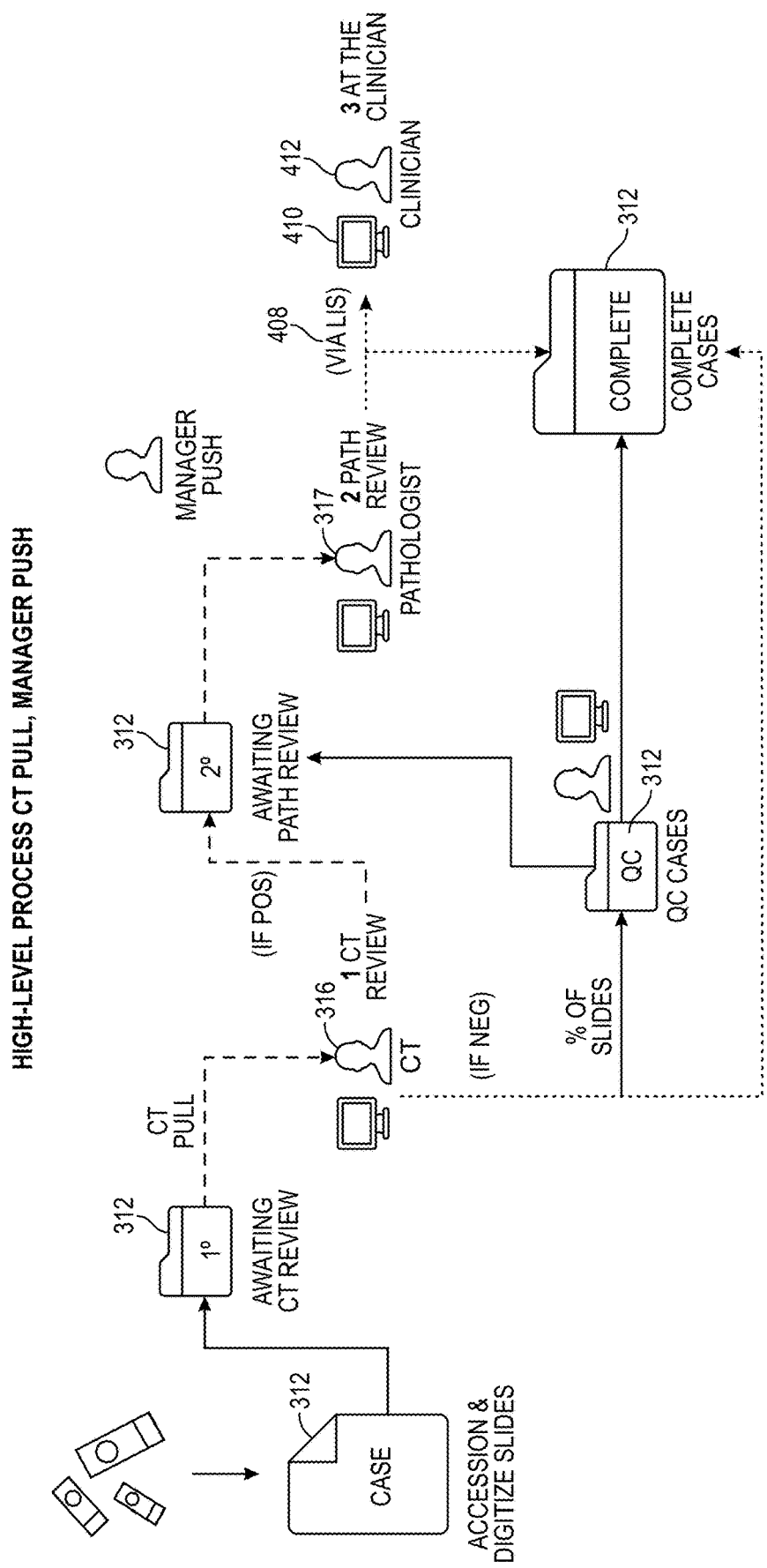
FIG. 53 is a diagram showing still another workflow scenario for reviewing digital images of specimen slides, according to one embodiment.
Figure 54:
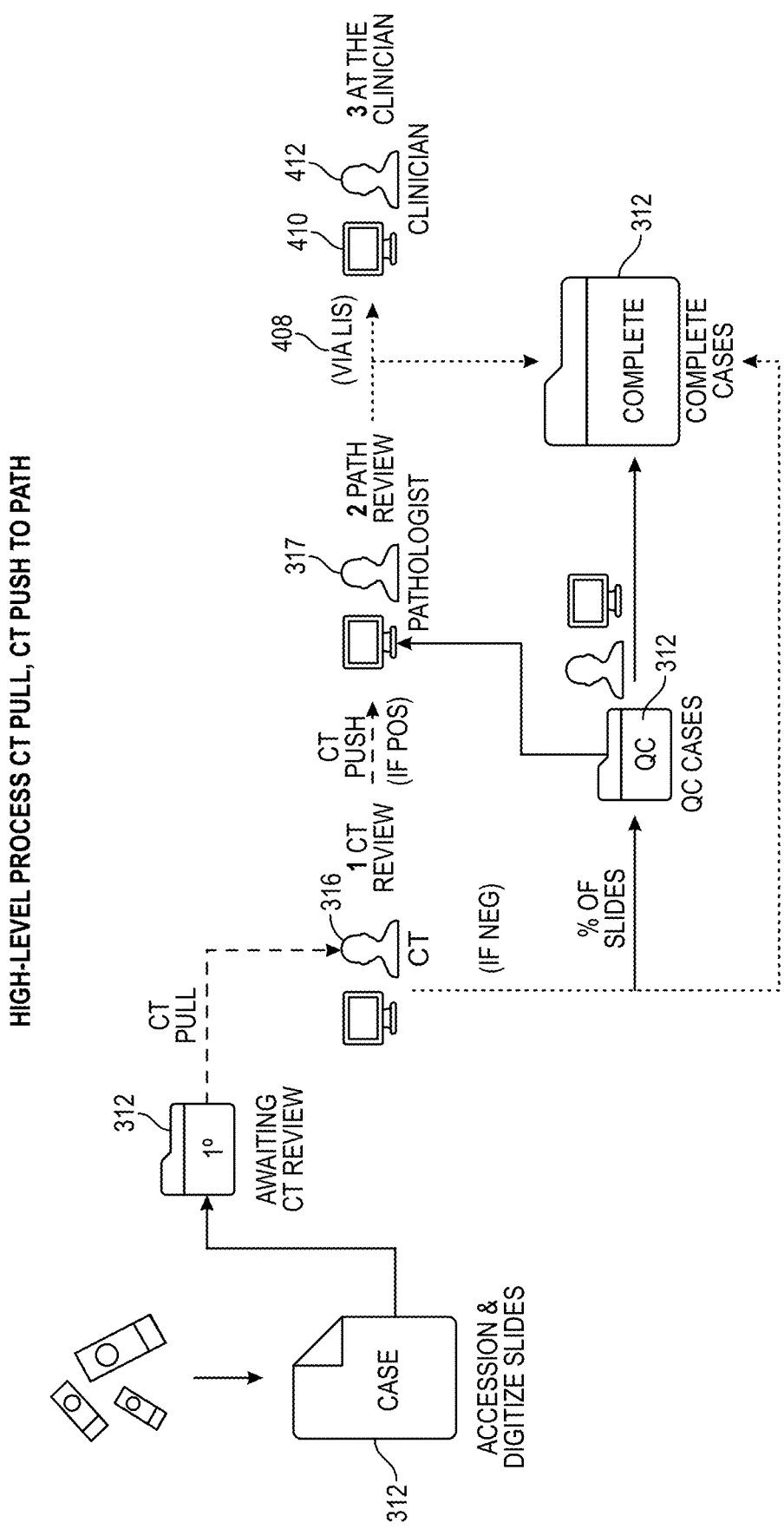
FIG. 54 is a diagram showing yet another workflow scenario for reviewing digital images of specimen slides, according to one embodiment.

After the reviewer has finished reviewing a case, the reviewer can go back to the worklist screen. FIG. 50 shows an example of a worklist screen 340 showing the details panel 361 for a case 312 completed by the first reviewer 316 as abnormal and assigned to a pathologist for pathologist review. By default, the completed cases 312 remain in the reviewer's worklist until the reviewer selects to hide the completed cases 312. The worklist screen 340 of FIG. 50 displays a hide case command 406 to hide a selected completed case from the worklist screen 340. The default can be modified to use rules to automatically hide completed cases. FIG. 51 shows the worklist screen 340 in which the completed cases 312 have been hidden.

Figure 63:
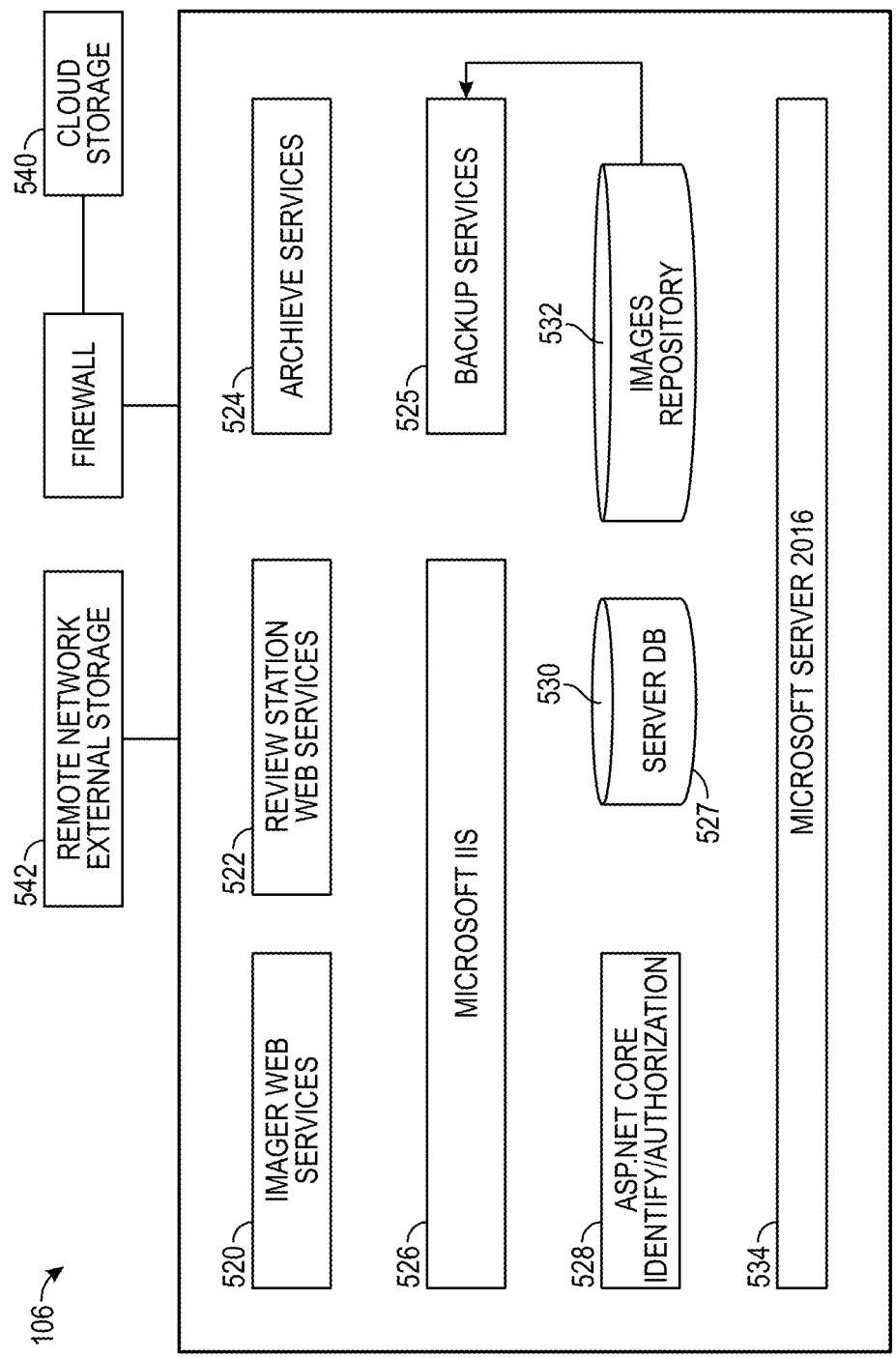
FIG. 63 illustrates a block diagram of an exemplary workflow server having backup and archive capabilities, according to one embodiment.

The comments, review results, and status of each case 312 is stored in a slide data file in the workflow server 106 (e.g., a database server 530, FIG. 63). The slide data file may include the digital image 302, SDS 304, slide information 306, and/or pyramid/OOI 308, or it may be a different data file.

As shown in FIG. 35, the disposition of each case 312 may then be entered into a laboratory information system (LIS) 408 which can be accessed by a clinician 412 on a clinician computer 410 in data communication with the LIS 408.

Figure 55:
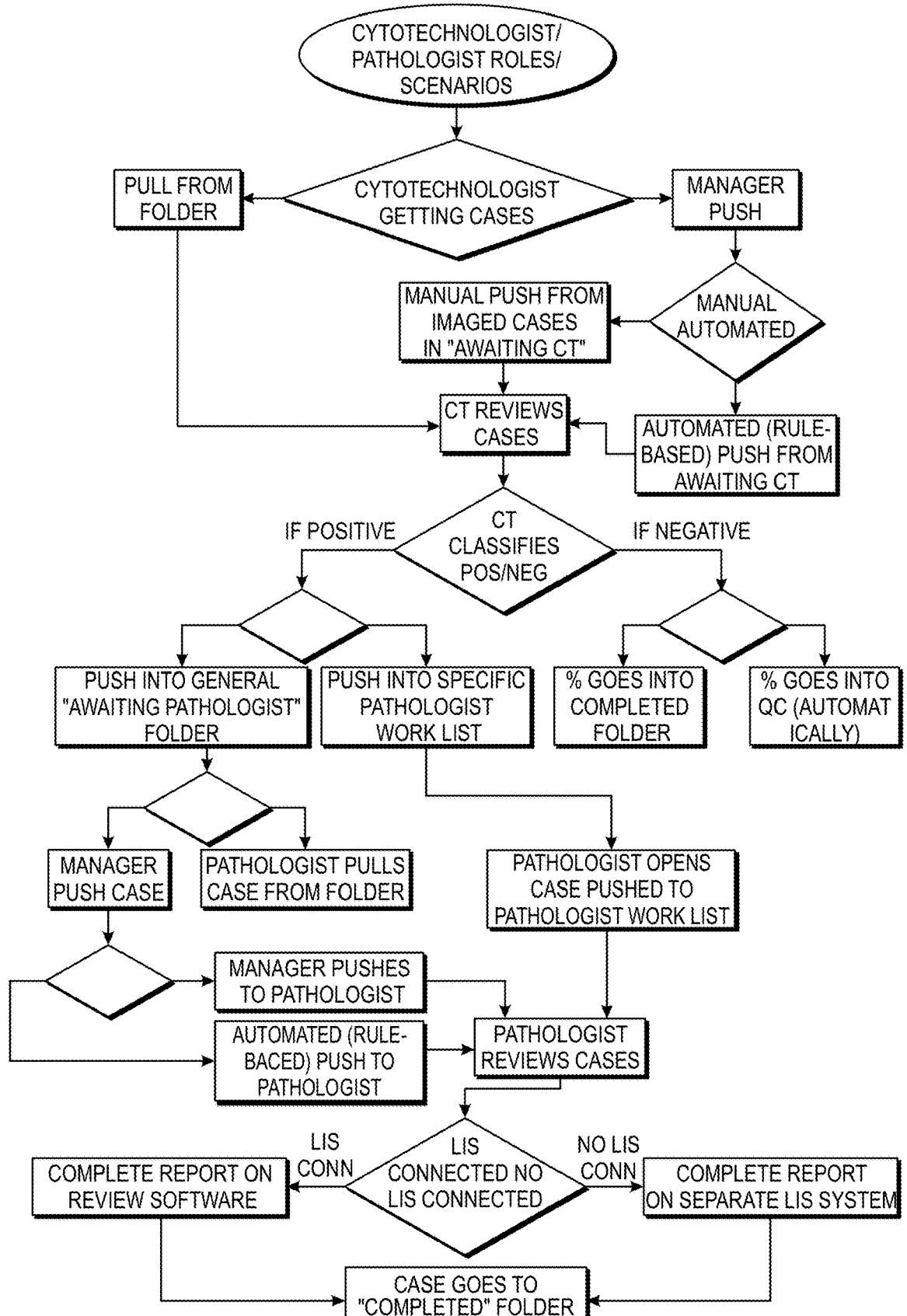
FIG. 55 provides an overview of the roles and scenarios for the workflows depicted in FIGS. 35 and 52-54, according to one embodiment.
Figure 56A:
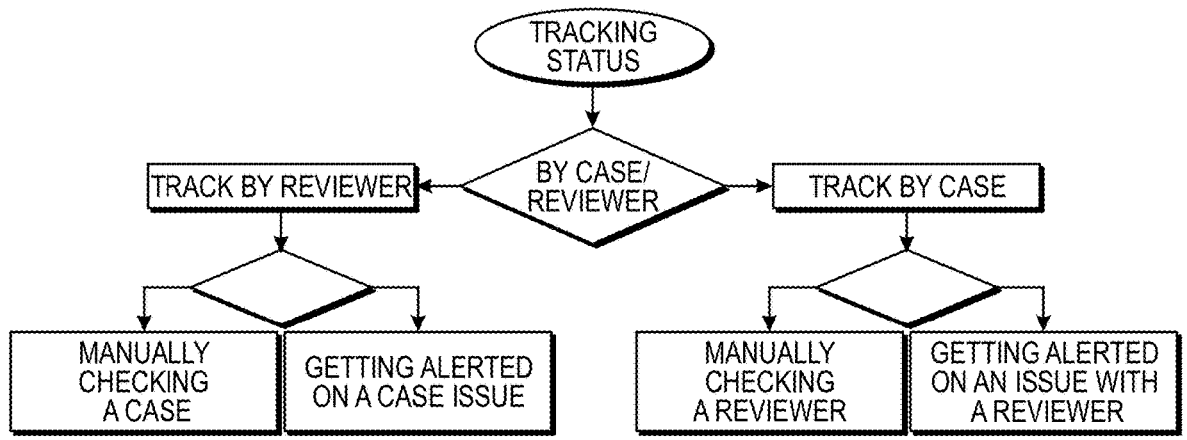
FIGS. 56A-56C are graphics describing various manager/administration roles and scenarios for the workflows depicted in FIGS. 35 and 52-54.
Figure 56B:
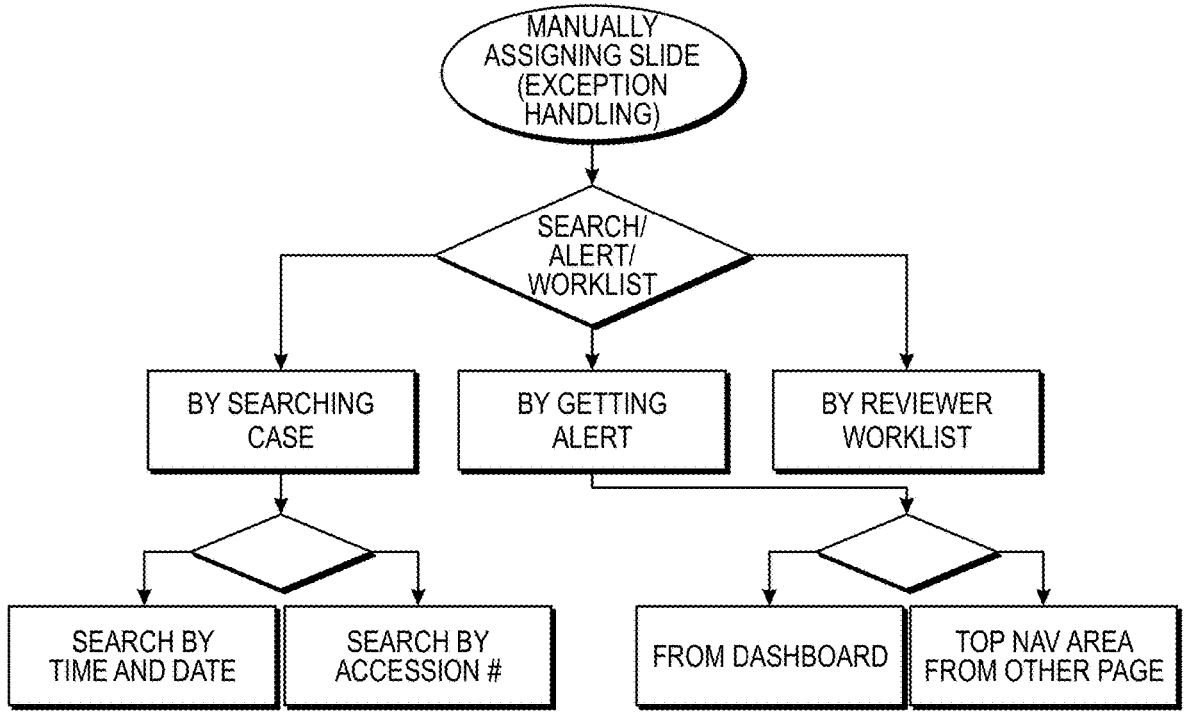
Figure 56C:
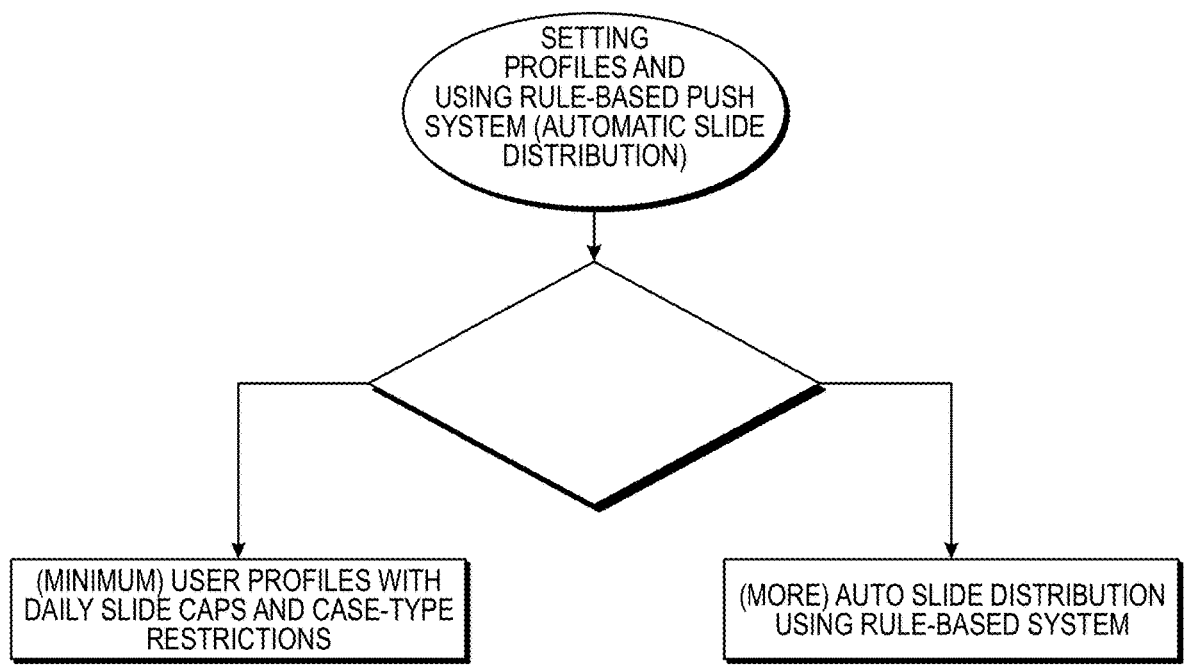

FIGS. 35 and 52-56 show several variations of the workflow for the review of cases 312 by a first reviewer 316 (e.g., cytotechnologist) and a second reviewer 317 (e.g., a pathologist) using the digital imaging display system 108 and workflow subsystem 106. In the workflows depicted in FIGS. 35 and 52-54, the terms "PULL" an "PUSH" describe whether a reviewer pulls a case 312 from among imaged cases awaiting review, or whether a case is pushed to the reviewer by a manager or automated process (e.g., rule-based algorithm, using rules such as type of case, case results, etc.) to the reviewer. FIG. 55 includes flow charts showing various scenarios for a cytotechnologist and a pathologist in completing the workflows depicted in FIGS. 35 and 52-54. FIG. 56 includes flow charts showing various manager/administration roles and scenarios for the workflows depicted in FIGS. 35 and 52-54.

FIG. 63 illustrates a block diagram of an exemplary workflow server 106 having backup and archive capabilities. The workflow server 106 includes a plurality of software modules for performing various backup and archive services, including an imager web services module 520, a review station web services module 522, an archive services module 524, and a backup services module 525. The workflow server 106 also includes an internet information services server 526 (e.g., MICROSOFT™ IIS), a security software module 528 (e.g., ASP.NET Core Identity/Authorization), a database server 530 having a database 527 of the slide data files (e.g., an SQL database server), an images repository 532 (e.g., on a RAID storage disk), and a server operating system 534 (e.g., Microsoft Server 2016). The imager web services module 520 is configured to be used by the imaging stations 190 to send and retrieve data with the database server 530. The review station web services module 522 hosts the review station application and provides services to send and retrieve data with the database server 530. The database server 530 stores SDSs 304, including the slide information 306, pyramid/OOI 308 and review information. The archive services module 524 performs archiving of the slide data files, digital images 302, and/or SDSs 304. The backup services module 525 performs backups of the database of slide data files, including the digital image files and review information.

The backup module 525 protects against single disk failure and system failures. The backup module 525 may backup the database and slide image files 302 to a network drive 540 (e.g., using WINDOWS™ built-in backup feature), or to cloud storage 542 (e.g., using MICROSOFT AZURE™ Backup Agent). The purpose of a backup is to protect locally stored information from a disaster, such as a disk failure. If the backup is remote, such as a cloud backup, the backup also protects from catastrophic failures caused by disasters such as fires, flood or other local incidents. The backup allows the database and digital image files to be restored as part of a recovery from a system failure.

The archive services module 524 is configured to remove local data in the database server 530 and store it more efficiently for a longer period of time. This may also improve the performance and/or usability of the digital imaging system 100 by reducing its storage requirements. The archived data is stored in external storage, such as a remote network drive 540 or cloud storage 542 (e.g., MICROSOFT AZURE™ cloud storage or AMAZON Web Services™ (AWS) cloud storage). The archive services module 524 is configured to allow a user to specify a policy for selecting which digital image files 302, slide information 306, pyramid/OOI 308 and/or review information to archive. The archive services module 524 may also archive a macro image (a lower resolution version of the digital image file 302, if generated by the system 100). For example, the user may set a policy for archiving data that was last accessed more than a selected time period, such as 30 days, 15 days, 60 days, etc. The archive policy may also include a set time for performing an archive, such as a specified time each day for daily archiving, or time and day of the week for weekly archiving, etc. When the data for a slide 102 is archived, the information in the database 527 is not archived but the database 527 is updated to track which slides 102 have been archived. In one embodiment of the archive services module 524, the pyramid image files (e.g., the OOI 308) for a slide 102 being archived are not archived. The local copies of the archived files and pyramid files are deleted from the database 527 and images repository 532.

Figure 64:
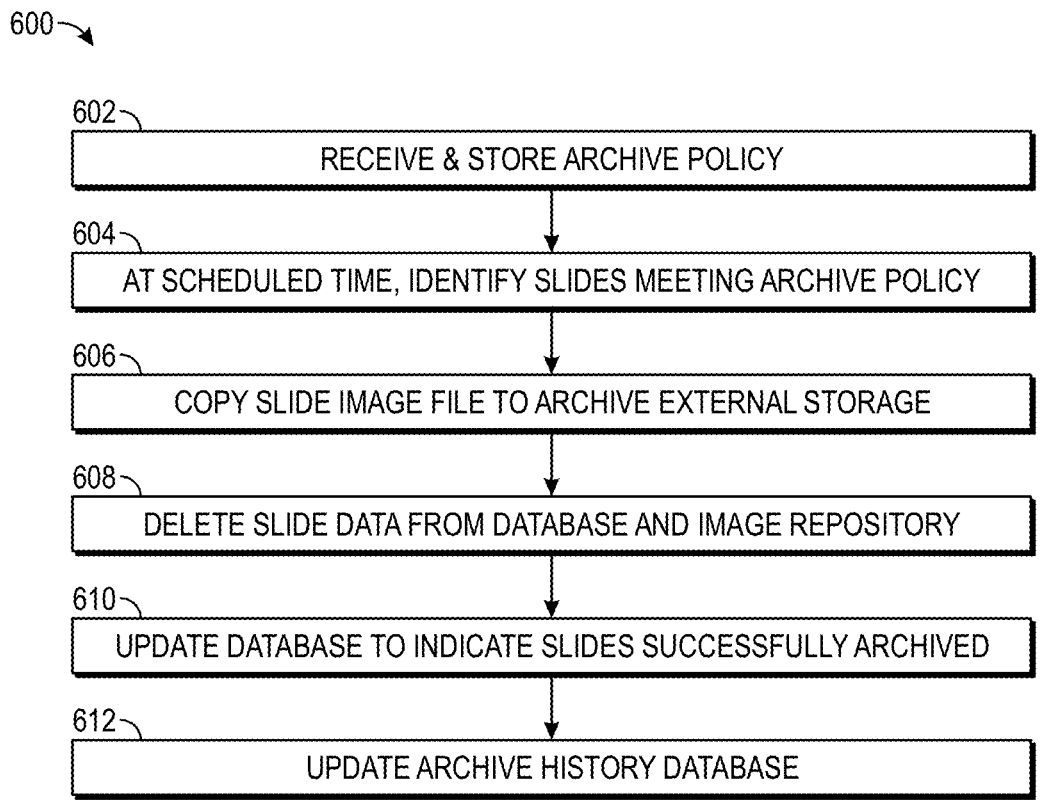
FIG. 64 illustrates a flow chart for a method for archiving slides using an archive services module, according to one embodiment.

Referring to FIG. 64, a flow chart for a method 600 for archiving slides 102 using the archive services module 524 is depicted. At step 602, the archive services module 524 receives and stores an archive policy, including an archive schedule. At step 604, at the scheduled time per the archive schedule, the archive services module 524 identifies slides 102 which meet the archive policy for archiving, and places the slides 102 in an archive database table. At step 606, for each slide 102 in the archive database table, the archive services module 524 copies the slide image file 302 and slide information 306 from the database 527 and image repository 532 to the archive external storage 540, 542. Upon successful copying, at step 608, the slide data for each archived slide is deleted from the database 527 and the image repository 532. At step 610, the database 527 is updated to indicate that each archived slide 102 has been successfully archived. At step 612, an additional archive history database which stores an archive history log may also be updated.

The archive services module 524 is also configured to retrieve archived slide data for an archived slide 102. The archive services module 524 may utilize a retriever web service installed on the workflow server 106. The retriever web service is configured based upon the type of archiving, whether it be a remote network drive or particular cloud storage. A user selects the slides 102 to be retrieved from archive using the retriever web service, and the retriever fetches the archived slide data for the selected slides 102 from the external storage 540, 542, including the slide image file 302, slide information 306, macro image and/or other archived data. Upon successful retrieval of the slide data, the system 100 re-generates the pyramid image data including the OOI 308, as described herein. The archive service module 524 updates the archive database table and/or archive history database regarding the status of the retrieved slides 102. The SDS 304 for each of the retrieved slide 102 may be stored in the database 527 and image repository 532 of the workflow server 106.

Although particular embodiments have been shown and described, it is to be understood that the above description is not intended to limit the scope of these embodiments, and that such disclosure is provided for purposes of explanation and illustration only. Thus, various changes and modifications may be made to the disclosed embodiments without departing from the scope of the following claims. For example, not all of the components described in the embodiments are necessary, and alternative embodiments may include any suitable combinations of the described components, and the general shapes and relative sizes of the components may be modified. Furthermore, while the systems and methods have been described cytological samples, they can be configured and utilized with any types of samples.

What is claimed is:

1. An automated slide imaging system, comprising:
    an imager configured for acquiring images of a specimen affixed to a surface of a slide, the specimen comprising a plurality of objects distributed within a three-dimensional volume, and for generating a whole specimen image from the acquired images, the acquired images include a macro image of the specimen, and a plurality of micro images of the specimen,
    wherein the objects are depicted in focus in the whole specimen image regardless of individual locations of the respective objects within the three-dimensional volume;
    the imager comprising
        a first imaging platform configured for seating the slide, and a first camera configured to acquire the macro image when the slide is seated on the first imaging platform,
        a second imaging platform configured for seating the slide, and a second camera configured to acquire the micro images of a specimen affixed to a slide seated on the second imaging platform.

2. The imaging system of claim 1, the three-dimensional specimen volume has a length, a width and a thickness, the thickness defining a z-axis relative to the slide surface, wherein respective objects of the specimen are located at differing locations along the z-axis.

3. The imaging system of claim 2, wherein the macro image includes one or more fiducial markers located on the slide surface, and wherein the imager is configured to determine a relative location and boundaries of the specimen on the slide surface based at least in part on the one or more fiducial markers.

4. The imaging system of claim 3, wherein the imager is configured to acquire the micro images based at least in part on the relative location and boundaries of the specimen on the slide surface determined from the macro image.

5. The imaging system of claim 4, wherein the imager is configured to acquire the micro images of the specimen at a same z-axis of the three-dimensional specimen volume.

6. The imaging system of claim 1, wherein the imager is configured to automatically move at least one of the second camera and second imaging platform relative to the other for acquiring the micro images.

7. The imaging system of claim 1, wherein an optical axis of the second camera forms a non-orthogonal angle with the second imaging platform.

8. The imaging system of claim 1, the slide having a thickness, wherein the micro images each includes at least a portion of the slide underlying the surface.

9. The imaging system of claim 1, wherein the specimen is covered with a coverslip that is sufficiently transparent to acquire the micro images of the specimen through the coverslip, the coverslip having a thickness, wherein the micro images each includes at least a portion of a depth of the coverslip.

10. The imaging system of claim 1, the slide having a width defining an x-axis, and a length defining a y-axis, wherein the imager is configured to translate the slide along the y-axis relative to the second camera as the second camera acquires the micro images at respective y-axis locations, each micro image including an entire x-axis width of the specimen based on the determined specimen boundaries on the slide surface.

11. The imaging system of claim 1, the imager comprising one or more slide holder receptacles, each slide holder receptacle configured to receive a slide holder comprising a plurality of slots, each slot configured to hold an individual slide, and
a robotic arm assembly configured to
engage and remove the slide from a slot of a slide holder in the slide holder receptacle,
transport and seat the slide on the first imaging platform for acquisition of the macro image,
re-engage and remove the slide from the first imaging platform,
transport and seat the slide on the second imaging platform for acquisition of the micro images, and
re-engage and remove the slide from the second imaging platform.

12. The imaging system of claim 11, wherein the robotic arm assembly is further configured to
transport the slide to a same or a different slide holder from which the slide was removed, and
release the slide into a slot of the respective same or different slide holder.

13. The imaging system of claim 12, wherein the slot of the respective same or different slide holder is the same slot from which the slide was removed by the robotic arm assembly.

14. The imaging system of claim 1, the imager further comprising an image processor configured to generate the whole specimen image from the micro images, wherein the image processor determines a respective best focus image for individual objects in the micro images, and wherein the best focus images of the objects are incorporated into the whole specimen image.

15. The imaging system of claim 14, wherein the image processor is configured to identify objects of interest in the specimen, and to store images of said identified objects of interest with the whole specimen image.

16. The imaging system of claim 1, wherein the macro image of the specimen includes an image of a bar code on the slide surface, and wherein the imager is configured to obtain information regarding the specimen from the bar code.

17. The imaging system of claim 1, wherein the specimen is a cytological cellular specimen and the objects are cells.

18. The imaging system of claim 1, wherein the specimen is a pathologic tissue specimen and the objects are tissue structures.

19. The imaging system of claim 1, further comprising a review station including a display monitor, a user interface, and a processor operatively coupled with the respective display monitor and user interface, wherein the processor is configured to display the whole specimen image on the display monitor along with separate images of individual objects within the specimen image.

* * * * *